US012791843B2

(12) United States Patent
Furubayashi

(10) Patent No.: US 12,791,843 B2
(45) Date of Patent: Nov. 10, 2026

(54) ZOOM LENS, PROJECTION TYPE DISPLAY DEVICE, AND IMAGING APPARATUS

(71) Applicant: FUJIFILM Corporation, Tokyo (JP)

(72) Inventor: Taku Furubayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 362 days.

(21) Appl. No.: 18/413,023

(22) Filed: Jan. 15, 2024

(65) Prior Publication Data

US 2024/0248289 A1 Jul. 25, 2024

(30) Foreign Application Priority Data

Jan. 20, 2023 (JP) ................................ 2023-007657

(51) Int. Cl.
*G02B 13/16* (2006.01)
*G02B 15/14* (2006.01)

(52) U.S. Cl.
CPC ........... *G02B 15/146* (2019.08); *G02B 13/16* (2013.01)

(58) Field of Classification Search
CPC ...... G02B 15/146; G02B 13/16; G02B 13/18; G02B 15/142
See application file for complete search history.

(56) References Cited

U.S. PATENT DOCUMENTS

2004/0021953 A1* 2/2004 Betensky ............. G02B 27/646 359/691
2005/0002115 A1* 1/2005 Mihara .......... G02B 15/144113 359/686
2008/0198451 A1* 8/2008 Gohman ................ G02B 7/102 359/432
2014/0313589 A1* 10/2014 Winterot .............. G02B 15/146 359/663
2019/0129285 A1* 5/2019 Masui ................ G02B 13/0095
2019/0137853 A1* 5/2019 Takehana ................. G02B 7/04
2019/0155004 A1 5/2019 Amano
2022/0283412 A1* 9/2022 Zhao ........................ G03B 5/00
2023/0236393 A1* 7/2023 Ivanov ................... G03B 30/00 348/369
2023/0305275 A1* 9/2023 Matsuo .................. G02B 13/16
2023/0367191 A1* 11/2023 Yanagisawa ........... G03B 21/28
2024/0045185 A1* 2/2024 Imaoka .................. G02B 13/04

FOREIGN PATENT DOCUMENTS

JP 2019-095789 A 6/2019

* cited by examiner

*Primary Examiner* — Bumsuk Won
*Assistant Examiner* — John C Sipes
(74) *Attorney, Agent, or Firm* — Studebaker Brackett PLLC

(57) ABSTRACT

The zoom lens consists of, in order from a magnification side to a reduction side along an optical path, a first optical system that includes at least one lens and a second optical system that includes a plurality of lenses. The first optical system includes an intermediate image, which is formed at a position conjugate to a magnification side image formation plane, inside the first optical system, and includes a reduction side movable lens group, which moves during zooming, at a position closest to the reduction side. The second optical system remains stationary with respect to the magnification side image formation plane during zooming. A lens adjacent to the magnification side of the intermediate image moves, a lens adjacent to the reduction side of the intermediate image moves, and the intermediate image moves, during zooming.

18 Claims, 42 Drawing Sheets

EXAMPLE 1

EXAMPLE 1

EXAMPLE 1

EXAMPLE 2

EXAMPLE 2

EXAMPLE 3

EXAMPLE 3

EXAMPLE 3

EXAMPLE 4

EXAMPLE 4

EXAMPLE 5

EXAMPLE 5

EXAMPLE 6

EXAMPLE 6

EXAMPLE 7

EXAMPLE 7

EXAMPLE 7

EXAMPLE 8

EXAMPLE 8

EXAMPLE 9

EXAMPLE 9

ZOOM LENS, PROJECTION TYPE DISPLAY DEVICE, AND IMAGING APPARATUS

CROSS-REFERENCE TO RELATED APPLICATIONS

This application claims priority from Japanese Patent Application No. 2023-007657, filed on Jan. 20, 2023, the entire disclosure of which is incorporated herein by reference.

BACKGROUND

Technical Field

The technique of the present disclosure relates to a zoom lens, a projection type display device, and an imaging apparatus.

Related Art

As a zoom lens applicable to the projection type display device or the imaging apparatus, there is a known image forming optical system described in JP2019-095789A.

SUMMARY

In a zoom lens that forms an intermediate image, it is necessary to maintain favorable optical performance while having a wide angle and a high zoom magnification. The demand level is increasing year by year.

The present disclosure has been made in view of the above circumstances, and has an object to provide a zoom lens that forms an intermediate image, has a wide angle, and maintains favorable optical performance while having a high zoom magnification, a projection type display device comprising the zoom lens, and an imaging apparatus comprising the zoom lens.

According to an aspect of the present disclosure, there is provided a zoom lens consisting of, in order from a magnification side to a reduction side along an optical path: a first optical system that includes at least one lens; and a second optical system that includes a plurality of lenses. The first optical system includes an intermediate image, which is formed at a position conjugate to a magnification side image formation plane, inside the first optical system, the first optical system includes a reduction side movable lens group, which moves during zooming, at a position closest to the reduction side, the second optical system remains stationary with respect to the magnification side image formation plane during zooming, and a lens adjacent to the magnification side of the intermediate image moves, a lens adjacent to the reduction side of the intermediate image moves, and the intermediate image moves, during zooming.

It is preferable that the first optical system consists of a first A optical system and a first B optical system, in order from the magnification side to the reduction side along the optical path, the first A optical system remains stationary with respect to the magnification side image formation plane during zooming, and the first B optical system includes a lens group, which moves during zooming, at a position closest to the magnification side.

It is preferable that the second optical system includes a stop.

It is preferable that the intermediate image is positioned inside a lens group which moves during zooming, and in a case where a group, of which spacing to an adjacent group in an optical axis direction changes during zooming, is one lens group, the zoom lens includes one or more lens groups, which move during zooming, at a position closer to the magnification side than the lens group in which the intermediate image is positioned. In such a case, it is preferable that the zoom lens includes one or more lens groups, which move during zooming, at a position closer to the reduction side than the lens group in which the intermediate image is positioned.

It is preferable that in a case where a group, of which spacing to an adjacent group in an optical axis direction changes during zooming, is one lens group, the first optical system includes three or more lens groups which move during zooming, including the reduction side movable lens group.

It is preferable that a lens surface adjacent to the reduction side of the intermediate image is a surface having a convex shape facing toward the magnification side.

A first optical path deflecting member, which deflects the optical path, may be configured to be disposed in the first A optical system.

Assuming that a minimum distance on an optical axis between a surface adjacent to the magnification side of the first optical path deflecting member and a surface adjacent to the reduction side of the first optical path deflecting member in an entire zoom range is Dbend1, an effective diameter of the surface adjacent to the magnification side of the first optical path deflecting member is E1f, and an effective diameter of the surface adjacent to the reduction side of the first optical path deflecting member is E1r, it is preferable that the zoom lens of the above-mentioned aspect satisfies Conditional Expression (1), which is represented by $$Dbend1 > (E1f + E1r)/4, \quad (1)$$

it is more preferable that the zoom lens satisfies Conditional Expression (1a), which is represented by $$Dbend1 > (E1f + E1r)/2. \quad (1a)$$

It is preferable that the zoom lens comprises a focusing group that moves during focusing, and the focusing group is disposed closer to the magnification side than the first optical path deflecting member.

A second optical path deflecting member, which deflects the optical path, may be configured to be disposed closer to the reduction side than the first optical system.

Assuming that a minimum distance on an optical axis between a surface adjacent to the magnification side of the second optical path deflecting member and a surface adjacent to the reduction side of the second optical path deflecting member in an entire zoom range is Dbend2, an effective diameter of the surface adjacent to the magnification side of the second optical path deflecting member is E2f, and an effective diameter of the surface adjacent to the reduction side of the second optical path deflecting member is E2r, it is preferable that the zoom lens of the above-mentioned aspect satisfies Conditional Expression (2), which is represented by $$Dbend2 > (E2f + E2r)/4, \quad (2)$$

it is more preferable that the zoom lens satisfies Conditional Expression (2a), which is represented by $$Dbend2 > (E2f + E2r)/2. \quad (2a)$$

A first optical path deflecting member, which deflects the optical path, may be configured to be disposed in the first A optical system, and a second optical path deflecting member, which deflects the optical path, may be configured to be disposed closer to the reduction side than the first optical system. In such a case, it is preferable that all lens groups, which move during zooming, are disposed on the optical path between the first optical path deflecting member and the second optical path deflecting member.

It is preferable that the intermediate image is positioned within an air spacing in an entire zoom range.

According to another aspect of the present disclosure, there is provided a projection type display device comprising the zoom lens according to the above-mentioned aspect.

According to still another aspect of the present disclosure, there is provided an imaging apparatus comprising the zoom lens according to the above-mentioned aspect.

In the present specification, it should be noted that the terms "consisting of" and "consists of" mean that the lens may include not only the above-mentioned components but also lenses substantially having no refractive powers, optical elements, which are not lenses, such as a stop, a mask, a filter, a cover glass, a plane mirror, and a prism, and mechanism parts such as a lens flange, a lens barrel, an imaging element, and a camera shaking correction mechanism.

The "lens group" in the present specification may include optical elements other than the lens such as a stop, a mask, a filter, a cover glass, a plane mirror, and a prism in addition to the lens. Each of "reduction side movable lens group", "lens group", and "focusing group", in the present specification is not limited to a configuration consisting of a plurality of lenses, but may have a configuration consisting of only one lens.

A compound aspherical lens (in which a lens (for example, a spherical lens) and an aspherical film formed on the lens are integrally formed and function as one aspherical lens as a whole) is not regarded as cemented lenses, but the compound aspherical lens is regarded as one lens. The sign of the refractive power, and the surface shape of the lens including the aspherical surface will be used in terms of the paraxial region unless otherwise specified. Unless otherwise specified, the "distance on the optical axis" used in Conditional Expression is considered as a geometrical distance.

The "d line", "C line", and "F line" described in the present specification are bright lines, the wavelength of the d line is 587.56 nm (nanometers), the wavelength of the C line is 656.27 nm (nanometers), and the wavelength of the F line is 486.13 nm (nanometers).

According to the present disclosure, it is possible to provide a zoom lens that forms an intermediate image, has a wide angle, and maintains favorable optical performance while having a high zoom magnification, a projection type display device comprising the zoom lens, and an imaging apparatus comprising the zoom lens.

DESCRIPTION OF EMBODIMENTS

Hereinafter, embodiments of the present disclosure will be described with reference to the accompanying drawings.

Figure 1:
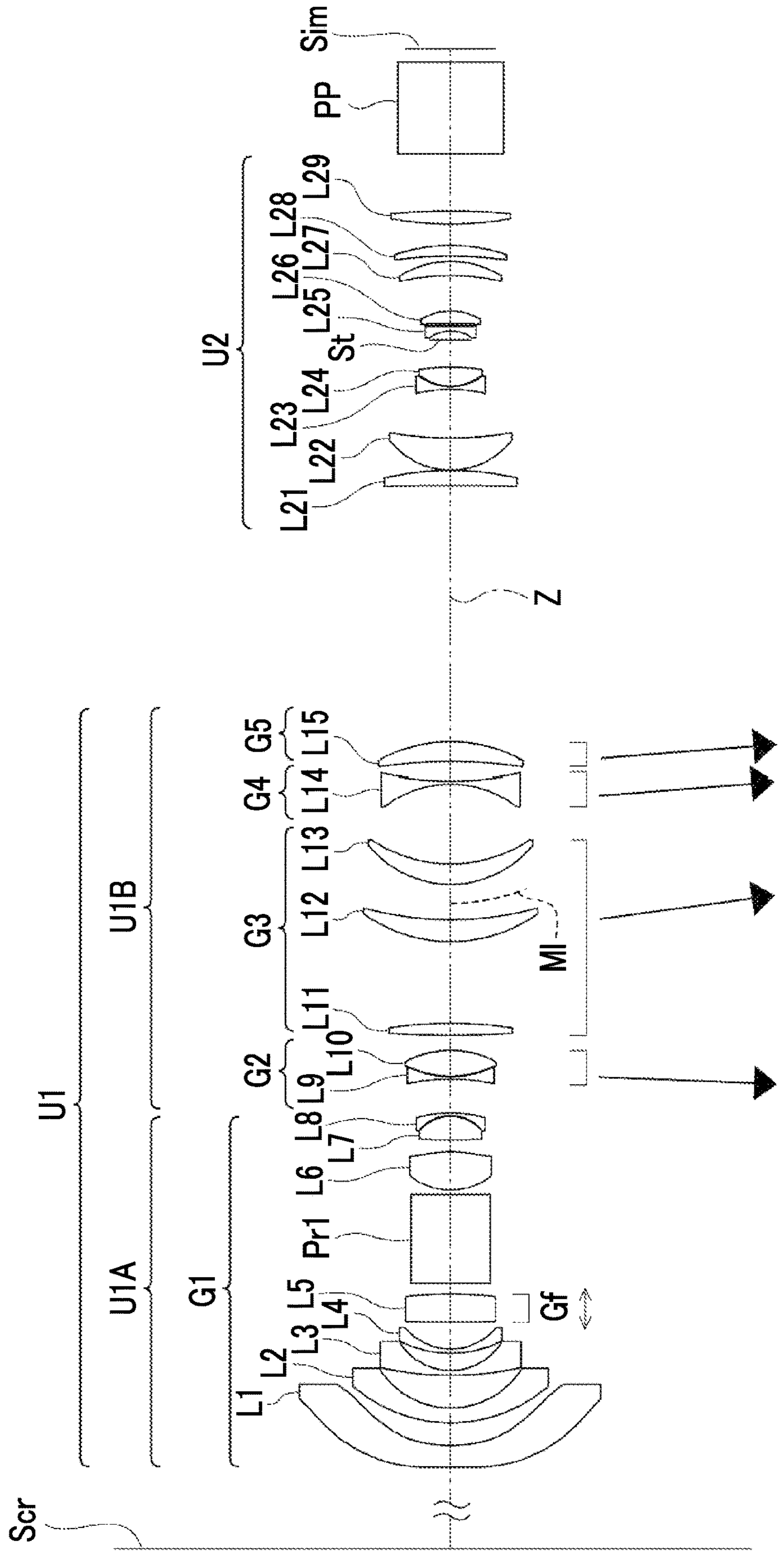
FIG. 1 is a cross-sectional view showing a configuration and rough movement directions of a zoom lens according to an embodiment, the zoom lens corresponding to a zoom lens of Example 1.
Figure 2:
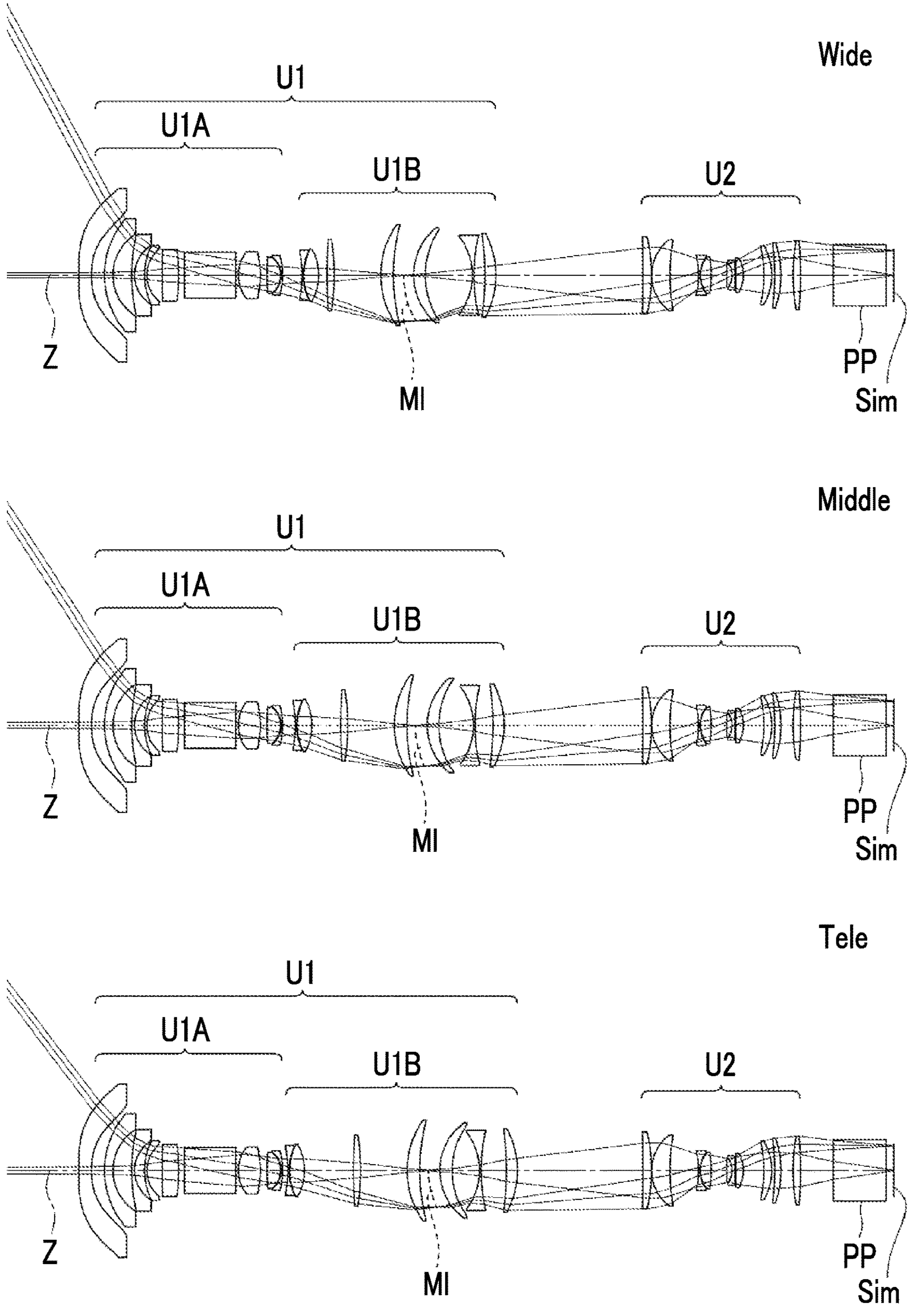
FIG. 2 is a cross-sectional view showing a configuration and luminous flux of the zoom lens of Example 1 in each zoom state.

FIG. 1 shows a cross-sectional view of a configuration of a zoom lens according to an embodiment of the present disclosure at a wide angle end. FIG. 2 shows a cross-sectional view of the configuration and luminous flux of this zoom lens of FIG. 1 in each zoom state. FIG. 2 shows, as the luminous flux, on-axis luminous flux and luminous flux with the maximum angle of view. In FIG. 2, the upper part labeled "Wide" shows the wide angle end state, the middle part labeled "Middle" shows the middle focal length state, and the lower part labeled "Tele" shows the telephoto end state. The examples shown in FIGS. 1 and 2 correspond to a zoom lens of Example 1 to be described later. In FIG. 1 and FIG. 2, the left side is the magnification side and the right side is the reduction side.

The zoom lens according to the present disclosure may be a projection optical system that is mounted on a projection type display device and forms an image projected on a screen, or may be an imaging optical system that is mounted on an imaging apparatus and forms an image of an object. Hereinafter, the case of using the zoom lens in the application of the projection optical system will be described.

FIG. 1 shows an example in which an optical member PP and an image display surface Sim of a light valve are disposed on the reduction side of the zoom lens on the assumption that the zoom lens is mounted on the projection type display device. The light valve outputs an optical image, and the optical image is displayed as an image on the image display surface Sim. The optical member PP is a member which is regarded as a filter, a cover glass, a color synthesis prism, or the like. The optical member PP has no refractive power, and the optical member PP may be configured to be omitted.

In the projection type display device, luminous flux provided with image information on the image display surface Sim are incident on the zoom lens through the optical member PP, and are projected onto the screen Scr through the zoom lens. In such a case, the image display surface Sim corresponds to the reduction side image formation plane, and the screen Scr corresponds to the magnification side image formation plane. In the present specification, the terms "screen Scr" means an object on which a projected image formed by the zoom lens is projected. The screen Scr may be not only a dedicated screen but also a wall surface of a room, a floor surface, a ceiling surface, an outer wall surface of a building, or the like. FIG. 1 conceptually shows the screen Scr, and the size of the screen Ser in FIG. 1 is not accurate.

In the description of the present specification, the term "magnification side" means the screen side on the optical path, and the "reduction side" means the image display surface Sim side on the optical path. In the present specification, the terms "magnification side" and "reduction side" are determined along the optical path, and this point is the same in a case of the zoom lens forming the deflected optical path. Further, the term "adjacent" in the disposition of the constituent elements means that the constituent elements are adjacent to each other in the arrangement order on the optical path. In the following description, in order to avoid making the description redundant, the phrase "in order from the magnification side to the reduction side along the optical path" may be described as "in order from the magnification side to the reduction side".

The zoom lens according to the present disclosure consists of a first optical system U1 and a second optical system U2 in order from the magnification side to the reduction side along the optical path.

The first optical system U1 includes at least one lens. Further, the first optical system U1 includes an intermediate image MI, which is formed at a position conjugate to the magnification side image formation plane, inside the first optical system U1. The zoom lens according to the present disclosure is configured to have the intermediate image MI as described above. Thereby, it is possible to suppress the size of the lens system while realizing a wide-angle projection optical system. It should be noted that, in FIGS. 1 and 2, only a part below the optical axis Z in the intermediate image MI is schematically indicated by a dotted line. The intermediate image MI in FIGS. 1 and 2 shows a position in the optical axis direction but does not show an accurate shape.

The first optical system U1 includes a reduction side movable lens group, which moves during zooming, at a position closest to the reduction side. The reduction side movable lens group is positioned closest to the reduction side among the lens groups which move during zooming in the zoom lens. That is, all the lens groups, which move during zooming, are disposed in the first optical system U1. With such a configuration, there is an advantage in obtaining a high zoom magnification.

In the present specification, a group, in which spacing between the group and the adjacent group changes in the optical axis direction during zooming, is set as one lens group. During zooming, spacing between adjacent lenses does not change inside one lens group. The term "lens group" in the present specification refers to a part including the at least one lens, which is a constituent part of the zoom lens and is divided by an air spacing that changes during zooming. During zooming, each lens group as a unit moves or remains stationary. The term "lens group" may include a constituent element other than a lens having no refractive power such as a prism and an aperture stop St.

For example, the first optical system U1 of FIG. 1 consists of a first lens group G1, a second lens group G2, a third lens group G3, a fourth lens group G4, and a fifth lens group G5, in order from the magnification side to the reduction side. For example, each lens group in FIG. 1 is configured as described below. The first lens group G1 consists of lenses L1 to L5, a prism Pr1, and lenses L6 to L8 in order from the magnification side to the reduction side. The second lens group G2 consists of lenses L9 to L10 in order from the magnification side to the reduction side. The third lens group G3 consists of lenses L11 to L13 in order from the magnification side to the reduction side. The fourth lens group G4 consists of a lens L14. The fifth lens group G5 consists of a lens L15.

In the example of FIG. 1, the intermediate image MI is formed in the third lens group G3. In the example of FIG. 1, during zooming, the first lens group G1 remains stationary with respect to the magnification side image formation plane, and each of the second lens group G2, the third lens group G3, the fourth lens group G4, and the fifth lens groups G5 moves along the optical axis Z by changing the spacing between the adjacent groups. In FIG. 1, regarding the moving lens group, an arrow under each lens group indicates a rough movement direction of each lens group during zooming from the wide angle end to the telephoto end. In the example of FIG. 1, the fifth lens group G5 corresponds to the reduction side movable lens group.

In the zoom lens according to the present disclosure, as in the example of FIG. 1, the first optical system U1 may consist of, in order from the magnification side to the reduction side along the optical path, a first A optical system U1A which remains stationary with respect to the magnification side image formation plane during zooming, and a first B optical system U1B that includes a lens group, which moves during zooming, at a position closest to the magnification side. By disposing the first A optical system U1A at a position closest to the magnification side of the zoom lens, the position of the lens closest to the magnification side is unchanged during zooming. Therefore, a lens system having favorable installability can be obtained. In the example of FIG. 1, the first A optical system U1A consists of a first lens group G1, and the first B optical system U1B consists of a second lens group G2, a third lens group G3, a fourth lens group G4, and a fifth lens group G5.

For example, the second optical system U2 of FIG. 1 consists of lenses L21 to L24, an aperture stop St, and lenses L25 to L29 in order from the magnification side to the reduction side. It should be noted that the aperture stop St shown in FIG. 1 does not indicate the shape and size, but indicates the position in the optical axis direction.

The second optical system U2 according to the present disclosure remains stationary with respect to the magnification side image formation plane during zooming. A lens which moves during zooming is not disposed near the image display surface Sim. Thus, there is an advantage in achieving reduction in size. In a case where a lens closest to the image display surface Sim is configured to move during zooming, a diameter of the lens is greater than that in a case where the lens remains stationary during zooming.

Further, the second optical system U2 according to the present disclosure includes a plurality of lenses. A plurality of lenses, which remain stationary with respect to a magnification side image formation plane during zooming, are disposed on the reduction side in the zoom lens. Thereby, there is an advantage in guiding luminous flux while suppressing occurrence of various aberrations and achieving reduction in size.

In the zoom lens according to the present disclosure, during zooming, a lens adjacent to the magnification side of the intermediate image MI moves, a lens adjacent to the reduction side of the intermediate image MI moves, and the intermediate image MI moves. According to the configuration, it is easy to prevent the intermediate image MI from being formed in any of the inside of the lens and the surface of the lens. As a result, there is an advantage in obtaining a wider movement range of a lens group which moves during zooming. In a case where the intermediate image MI is formed in the lens or on the lens surface, and in a case where there are scratches or dust in the lens or on the lens surface, a problem arises in that the scratches, dust, and the like may be projected onto the screen Scr. By adopting a configuration in which the intermediate image MI is not formed in the lens as well as on the lens surface, it is possible to prevent scratches, dust, or the like incident on the lens from being projected onto the screen Scr.

In the example of FIG. 1, the intermediate image MI is formed between the lens L12 and the lens L13. In the example of FIG. 1, the lens L12 corresponds to the lens adjacent to the magnification side of the intermediate image MI, and the lens L13 corresponds to the lens adjacent to the reduction side of the intermediate image MI. FIG. 2 shows a state where the lens adjacent to the magnification side of the intermediate image MI, the lens adjacent to the reduction side of the intermediate image MI, and the intermediate image MI move along the optical axis Z during zooming.

It is preferable that the lens surface adjacent to the reduction side of the intermediate image MI is a convex surface facing toward the magnification side. In such a case, it is easy to prevent the intermediate image MI from being formed in any of the inside of the lens or the surface of the lens. Thereby, as described above, it is easy to prevent scratches, dust, or the like present on the lens from being projected onto the screen Scr. It is more preferable that a lens surface adjacent to the reduction side of the intermediate image MI is a surface having a convex shape facing toward the magnification side, and the intermediate image MI has field curvature such that the intermediate image MI is positioned on the reduction side in the peripheral portion with respect to the paraxial region.

It is preferable that the intermediate image MI is positioned within the air spacing in the entire zoom range. In such a case, it is easy to prevent the intermediate image MI from being formed in any of the inside of the lens or the surface of the lens. Thereby, as described above, it is easy to prevent scratches, dust, or the like present on the lens from being projected onto the screen Scr.

It is preferable that the intermediate image MI is positioned inside the lens group which moves during zooming. In such a case, it is preferable that the zoom lens according to the present disclosure includes one or more lens groups which move during zooming, at a position closer to the magnification side than the lens group in which the intermediate image MI is positioned. In such a case, there is an advantage in obtaining a high zoom magnification.

In a case where the intermediate image MI is positioned inside a lens group which moves during zooming, it is preferable that the zoom lens according to the present disclosure includes one or more lens groups which move during zooming, at a position closer to the reduction side than the lens group in which the intermediate image MI is positioned. In such a case, there is an advantage in correcting aberrations during zooming.

The above-mentioned phrase "the intermediate image MI is positioned inside the lens group which moves during zooming" is not limited to the configuration in which the intermediate image MI is positioned between two lenses in the lens group which moves during zooming. The intermediate image MI may be positioned closest to the magnification side in the lens group which moves during zooming, or may be positioned closest to the reduction side in the lens group which moves during zooming.

It is preferable that the first optical system U1 includes three or more lens groups which move during zooming, including the reduction side movable lens group. In such a case, there is an advantage in satisfactorily correcting aberrations while obtaining a high zoom magnification.

It is preferable that the second optical system U2 according to the present disclosure includes an aperture stop St. In such a case, even in a case where the zoom lens is configured to have a high zoom magnification, the F number can be kept constant during zooming.

In the zoom lens according to the present disclosure, a first optical path deflecting member, which deflects the optical path, may be disposed in the first A optical system U1A. By deflecting the optical path, a compact configuration is possible. Therefore, there is an advantage in achieving reduction in size and it is possible to improve installability. By disposing the first optical path deflecting member in the first A optical system U1A which remains stationary during zooming instead of the optical system which moves during zooming, it is easier to dispose the members. As the first optical path deflecting member, for example, it is possible to use a prism having a reflecting surface, a mirror, or the like.

Figure 3:
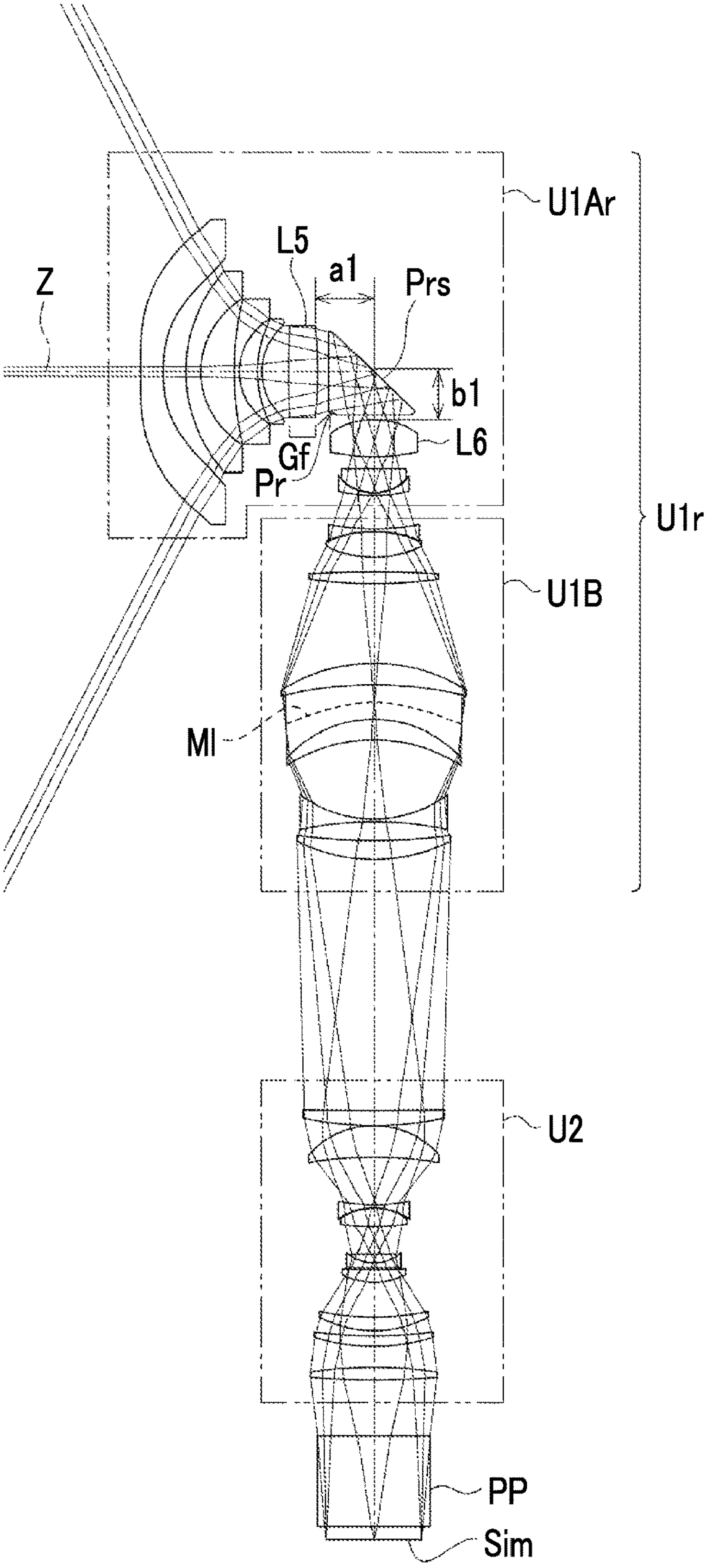
FIG. 3 is a cross-sectional view showing a configuration and luminous flux of a first modification example of the zoom lens of Example 1.

As a first modification example of the zoom lens of FIG. 1, FIG. 3 shows an example of the zoom lens having the first optical path deflecting member. The zoom lens of FIG. 3 consists of a first optical system U1*r* and a second optical system U2 in order from the magnification side to the reduction side along the optical path. The first optical system U1*r* consists of a first A optical system U1Ar and a first B optical system U1B in order from the magnification side to the reduction side along the optical path. The zoom lens of FIG. 3 is different from the zoom lens of FIG. 1 in that the prism Pr1 of FIG. 1 is replaced with a prism Pr having a reflecting surface Prs and the optical path is deflected by the reflecting surface Prs. Other lens configurations are the same as those in the example of FIG. 1. In the example of FIG. 3, the prism Pr disposed in the first A optical system U1Ar corresponds to the first optical path deflecting member. FIG. 3 shows the configuration at the wide angle end, and some of the reference numerals of the lenses are omitted to avoid complication of the drawing.

For example, in a configuration in which a first optical path deflecting member, which deflects the optical path, is disposed in the first A optical system U1Ar as shown in FIG. 3, it is preferable that the zoom lens according to the present disclosure satisfies Conditional Expression (1), and it is more preferable that the zoom lens satisfies Conditional Expression (1a). Here, it is assumed that a minimum distance on an optical axis between a surface adjacent to the magnification side of the first optical path deflecting member and a surface adjacent to the reduction side of the first optical path deflecting member in an entire zoom range is Dbend1. It is assumed that an effective diameter of the surface adjacent to the magnification side of the first optical path deflecting member is E1f. It is assumed that an effective diameter of the surface adjacent to the reduction side of the first optical path deflecting member is E1r. By satisfying Conditional Expression (1), it is easy to ensure a space for deflecting the optical path. Further, by satisfying Conditional Expression (1a), it is easy to ensure a space for deflecting the optical path corresponding to the total angle of view.

$$Dbend1 > (E1f + E1r)/4 \tag{1}$$

$$Dbend1 > (E1f + E1r)/2 \tag{1a}$$

In the example of FIG. 3, a reduction side surface of the lens L5 corresponds to the surface adjacent to the magnification side of the first optical path deflecting member, and a magnification side surface of the lens L6 corresponds to the surface adjacent to the reduction side of the first optical path deflecting member. In FIG. 3, it is assumed that a distance on the optical axis between the reduction side surface of the lens L5 and the reflecting surface Prs is a1, and a distance on the optical axis between the reflecting surface Prs and the magnification side surface of the lens L6 is b1. In the example of FIG. 3, a sum of the distance a1 and the distance b1 corresponds to DbendDbend1 of Conditional Expression (1).

It is preferable that the zoom lens according to the present disclosure includes a focusing group Gf that moves along the optical axis Z during focusing. Further, in a case where the zoom lens according to the present disclosure includes the focusing group Gf, it is preferable that the focusing group Gf is disposed closer to the magnification side than the first optical path deflecting member. In such a case, the focusing group Gf is positioned closer to the magnification side than all the lens groups which move during zooming. Thus, it is possible to prevent interference between the focusing group Gf and the zoom mechanism. As a result, it is easy to move the focusing group Gf. Further, a lens that has a relatively strong positive refractive power is often disposed closer to the reduction side than the first optical path deflecting member in order to reduce an effective diameter of the deflected portion. However, such a lens that has a relatively strong positive refractive power is unsuitable for the focusing group Gf. Therefore, it is preferable that the focusing group Gf is disposed closer to the magnification side than the first optical path deflecting member.

For example, the focusing group Gf in the example of FIG. 1 consists of a lens L5. The reference numeral Gf under the lens L5 in FIG. 1 and the horizontal double-headed arrow indicate that the lens L5 is the focusing group Gf. In the configuration of FIG. 3, the focusing group Gf consists of a lens L5. However, in FIG. 3, the illustration of the double-headed arrow is omitted in order to prevent complication of the drawing.

In the zoom lens according to the present disclosure, the second optical path deflecting member, which deflects the optical path, may be disposed closer to the reduction side than the first optical system U1. By deflecting the optical path, a compact configuration is possible. Therefore, there is an advantage in achieving reduction in size and it is possible to improve installability. The optical system closer to the reduction side than the first optical system U1 remains stationary during zooming. Therefore, by disposing the second optical path deflecting member in the optical system which remains stationary during zooming, it is easier to dispose the members. As the second optical path deflecting member, for example, it is possible to use a prism having a reflecting surface, a mirror, or the like.

Figure 4:
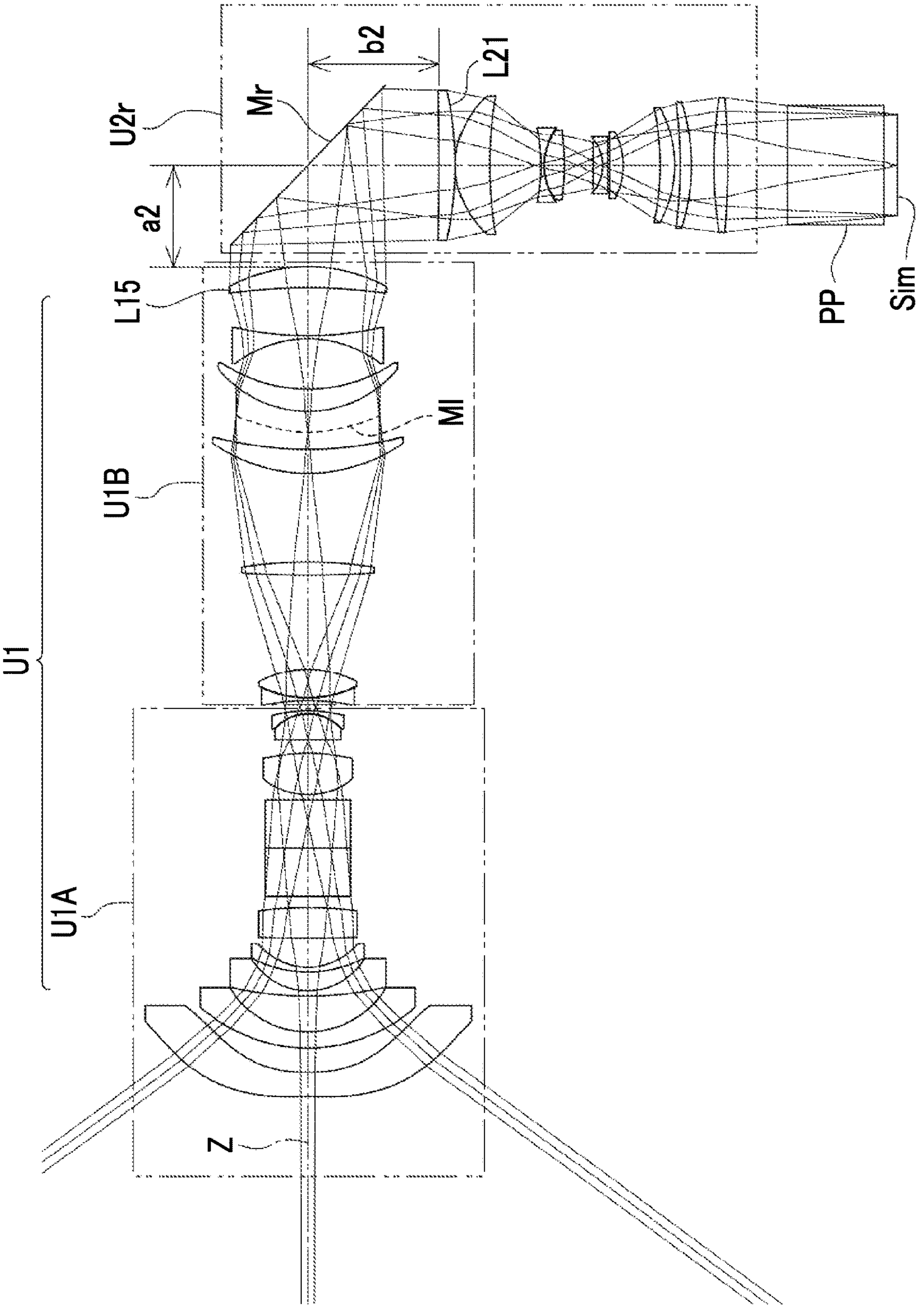
FIG. 4 is a cross-sectional view showing a configuration and luminous flux of a second modification example of the zoom lens of Example 1.

As a second modification example of the zoom lens of FIG. 1, FIG. 4 shows an example of the zoom lens having the second optical path deflecting member. The zoom lens of FIG. 4 consists of a first optical system U1 and a second optical system U2*r* in order from the magnification side to the reduction side along the optical path. The zoom lens of FIG. 4 is different from the zoom lens of FIG. 1 in that a mirror Mr is disposed closest to the magnification side of the second optical system U2*r* and the optical path is deflected by the mirror Mr. The other lens configurations are the same as those in the examples shown in FIG. 1. In the example of FIG. 4, the mirror Mr corresponds to the second optical path deflecting member. FIG. 4 shows the configuration at the telephoto end, and some of the reference numerals of the lenses are omitted to avoid complication of the drawing.

For example, as shown in FIG. 4, in a configuration in which the second optical path deflecting member, which deflects the optical path, is disposed closer to the reduction side than the first optical system U1, it is preferable that the zoom lens according to the present disclosure satisfies Conditional Expression (2), and it is more preferable that the zoom lens satisfies Conditional Expression (2a). Here, it is assumed that a minimum distance on an optical axis between a surface adjacent to the magnification side of the second optical path deflecting member and a surface adjacent to the reduction side of the second optical path deflecting member in an entire zoom range is Dbend2. It is assumed that an effective diameter of the surface adjacent to the magnification side of the second optical path deflecting member is E2f. It is assumed that an effective diameter of the surface adjacent to the reduction side of the second optical path deflecting member is E2r. By satisfying Conditional Expression (2), it is easy to ensure a space for deflecting the optical path. Further, by satisfying Conditional Expression (2a), it is easy to ensure a space for deflecting the optical path that is capable of supporting the total angle of view.

$$Dbend2 > (E2f + E2r)/4 \quad (2)$$

$$Dbend2 > (E2f + E2r)/2 \quad (2a)$$

In the example of FIG. 4, the reduction side surface of the lens L15 corresponds to the surface adjacent to the magnification side of the second optical path deflecting member, and the magnification side surface of the lens L21 corresponds to the surface adjacent to the reduction side of the second optical path deflecting member. In FIG. 4, it is assumed that a distance on the optical axis between the reduction side surface of the lens L15 and the mirror Mr is a2, and a distance on the optical axis between the mirror Mr and the magnification side surface of the lens L21 is b2. In the example of FIG. 4, a sum of the distance a2 and the distance b2 corresponds to Dbend2 of Conditional Expression (2).

FIGS. 3 and 4 show an example in which the zoom lens has only one optical path deflecting member. However, the zoom lens according to the present disclosure may have a plurality of optical path deflecting members. The first optical path deflecting member, which deflects the optical path, may be configured to be disposed in the first A optical system U1A, and a second optical path deflecting member, which deflects the optical path, may be configured to be disposed closer to the reduction side than the first optical system U1. In a case where the zoom lens having the configuration in which the optical path is deflected twice is mounted on the projection type display device, by rotating the deflected portion of the zoom lens even in a state where the housing of the apparatus body is fixed, the lens closest to the magnification side can be positioned in an optional direction. As a result, it is possible to perform projection in various directions.

Figure 5:
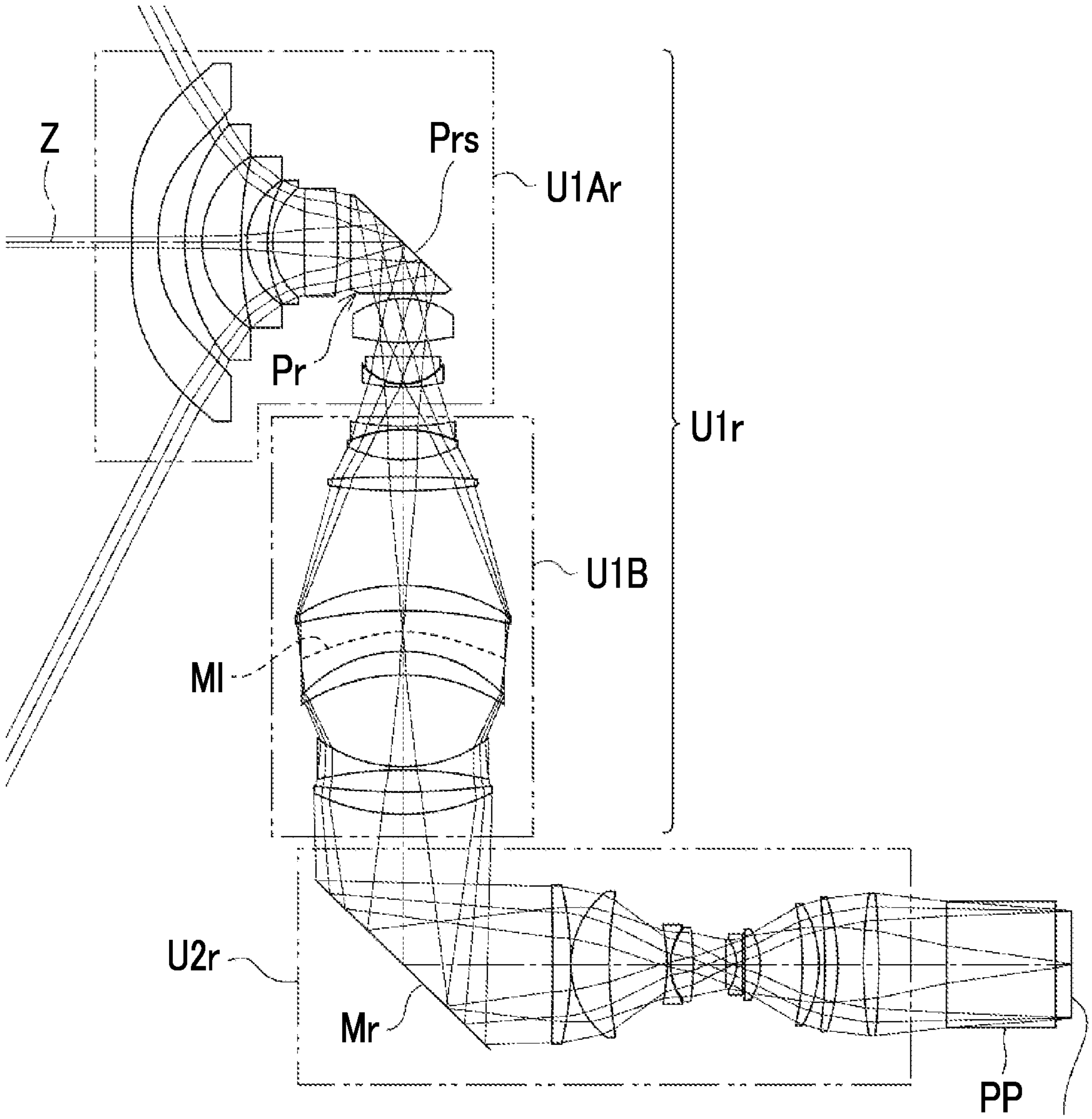
FIG. 5 is a cross-sectional view showing a configuration and luminous flux of a third modification example of the zoom lens of Example 1.

As a third modification example of the zoom lens of FIG. 1, FIG. 5 shows an example of a zoom lens which has two optical path deflecting members and in which the optical path is deflected twice. The zoom lens of FIG. 5 consists of a first optical system U1*r* and a second optical system U2*r* in order from the magnification side to the reduction side along the optical path. The first optical system U1*r* consists of a first A optical system U1Ar and a first B optical system U1B in order from the magnification side to the reduction side along the optical path. The first optical system U1*r* in the example of FIG. 5 is the same as the first optical system U1*r* in FIG. 3, and the second optical system U2*r* in the example of FIG. 5 is the same as the second optical system U2*r* in the example of FIG. 4. In the example of FIG. 5, the prism Pr disposed in the first A optical system U1Ar corresponds to the first optical path deflecting member, and the mirror Mr disposed in the second optical system U2*r* corresponds to the second optical path deflecting member.

For example, as shown in FIG. 5, a first optical path deflecting member, which deflects the optical path, is disposed in the first A optical system U1Ar, and a second optical path deflecting member, which deflects the optical path, is disposed closer to the reduction side than the first optical system U1*r*. In such a case, it is preferable that all the lens groups, which move during zooming, are configured to be disposed on the optical path between the first optical path deflecting member and the second optical path deflecting member. This is due to the circumstances described below. The zoom magnification can be increased as the amount of movement of the lens which moves during zooming increases. However, in a case where the optical path is deflected twice as described above, the amount of movement of the lens closest to the magnification side which moves during zooming decreases. Meanwhile, the zoom magnification can be increased by changing the size of the intermediate image MI. In the zoom lens according to the present disclosure, the lens adjacent to the magnification side of the intermediate image MI and the lens adjacent to the reduction side of the intermediate image MI move during zooming. Therefore, in a case where the above-mentioned configuration is adopted, it is preferable that the intermediate image MI is positioned on the optical path between the first optical path deflecting member and the second optical path deflecting member. By adopting the above-mentioned configuration, the size of the intermediate image MI can be changed during zooming. Therefore, it is possible to obtain a high zoom magnification while deflecting the optical path twice. Further, by adopting the above-mentioned configuration, one lens group, which moves during zooming, can be disposed so as not to be on the optical path deflecting member. Therefore, it is possible to simplify the drive mechanism.

The technique of the present disclosure is not limited to the examples shown in FIGS. 1 to 5. Various modifications can be made without departing from the scope of the technique of the present disclosure. For example, in the technique of the present disclosure, the number of lens groups, which are included in the first B optical system U1B, and the number of lenses, which are included in each lens group, may be different from the number of lenses in the example of FIG. 1.

The deflection angle at which the optical path of the optical path deflecting member is deflected can be arbitrarily set, but may be set to, for example, 90 degrees. By setting the deflection angle to 90 degrees, it is possible to form a structure that is easy to produce. It should be noted that the term "90 degrees" includes an error that is practically allowed in the technical field to which the technique of the present disclosure belongs. The error may be, for example, ±5 degrees.

The above-mentioned preferred configurations and available configurations including the configurations relating to Conditional Expressions may be any combination, and it is preferable to appropriately and selectively adopt the configurations in accordance with necessary specification.

Next, examples and modification examples of the zoom lens according to the present disclosure will be described, with reference to the drawings. It should be noted that the reference numerals noted in the cross-sectional views of the examples and the modification examples are used independently for examples and modification examples in order to avoid complication of description and drawings due to an increase in number of digits of the reference numerals. Therefore, even in a case where common reference numerals are attached in the drawings of different examples and modification examples, components do not necessarily have a common configuration.

Example 1

FIGS. 1 and 2 are cross-sectional views of a configuration of a zoom lens and luminous flux of Example 1, and an illustration method and a configuration thereof are as described above. Therefore, some description is not repeated herein. The zoom lens of Example 1 consists of a first optical system U1 and a second optical system U2 in order from the magnification side to the reduction side. The first optical system U1 consists of a first A optical system U1A and a first B optical system U1B in order from the magnification side to the reduction side. The first A optical system U1A consists of a first lens group G1. The first B optical system U1B consists of, in order from the magnification side to the reduction side, a second lens group G2, a third lens group G3, a fourth lens group G4, and a fifth lens group G5.

During zooming, the first lens group G1 remains stationary with respect to the magnification side image formation plane (corresponding to the screen Scr in FIG. 1), and each of the second lens group G2, the third lens group G3, the fourth lens group G4, and the fifth lens groups G5 moves along the optical axis Z by changing the spacing between the adjacent groups. The intermediate image MI is formed in the third lens group G3. The focusing group Gf consists of a lens L5.

Regarding the zoom lens 1 of Example 1, Tables 1A and 1B show basic lens data, Table 2 shows specifications and variable surface spacings, and Table 3 shows aspherical coefficients thereof. Here, the basic lens data is shown to be divided into two tables, Table 1A and Table 1B, in order to avoid lengthening of one table. Table 1A shows the first optical system U1, and Table 1B shows the second optical system U2 and the optical member PP.

The table of basic lens data will be described as follows. The Sn column shows surface numbers in a case where the surface closest to the magnification side is the first surface and the number is increased one by one toward the reduction side. The R column shows a curvature radius of each surface. The D column shows a surface spacing between each surface and the surface adjacent to the reduction side on the optical axis. The Nd column shows a refractive index of each component at the d line. The column of νd shows an Abbe number of each component based on the d line.

In the table of the basic lens data, the sign of the curvature radius of the convex surface facing toward the magnification side is positive, and the sign of the curvature radius of the convex surface facing toward the reduction side is negative. In Table 1B, in a cell of a surface number of a surface corresponding to the aperture stop St, the surface number and a term of (St) are noted. A value at the bottom cell of D in Table 1B indicates spacing between the image display surface Sim and the surface closest to the reduction side in the table. In the table of basic lens data, the symbol DD[ ] is used for each variable surface spacing during zooming, and the magnification side surface number of the spacing is given in [ ] and is noted in the column of D.

Table 2 shows the zoom magnification Zr, the absolute value of the focal length |f|, the F number FNo., the maximum total angle of view 2ω, and the variable surface spacing, on the basis of the d line. [° ] in the cells of 2ω indicates that the unit thereof is a degree. The values shown in Table 1 are values in a state where a projection distance is 0.9 meters (m). The projection distance is a distance on the optical axis from the magnification side image formation plane to the lens surface closest to the magnification side. In Table 2, the values in the wide angle end state, the middle focal length state, and the telephoto end state are respectively shown in the columns labeled with "Wide", "Middle", and "Tele".

In basic lens data, a reference sign * is attached to surface numbers of aspherical surfaces, and values of the paraxial curvature radius are written into the column of the curvature radius of the aspherical surface. In Table 3, the row of Sn shows surface numbers of the aspherical surfaces, and the rows of KA and Am (m=3, 4, 5, 6, . . . , 20) show numerical values of the aspherical coefficients for each aspherical surface. The "E±n" (n: an integer) in numerical values of the aspherical coefficients of Table 3 indicates "$\times 10^{\pm n}$". KA and Am are the aspherical coefficients in the aspherical surface expression represented by the following expression.

$$Zd = C\times h^2/\{1+(1-KA\times C^2\times h^2)^{1/2}\}+\sum Am\times h^m$$

Here,

Zd is an aspherical surface depth (a length of a perpendicular from a point on an aspherical surface at height h to a plane that is perpendicular to the optical axis Z and that is in contact with the vertex of the aspherical surface), h is a height (a distance from the optical axis Z to the lens surface), C is a reciprocal of the paraxial curvature radius, KA and Am are aspherical coefficients, and Σ in the aspherical surface expression means the sum with respect to m.

In the data of each table, degrees are used as a unit of an angle, and millimeters (mm) are used as a unit of a length, but appropriate different units may be used since the optical system can be used even in a case where the system is enlarged or reduced in proportion. Further, each of the following tables shows numerical values rounded off to predetermined decimal places.

TABLE 1A

Example 1

| Sn | R | D | Nd | νd |
|---|---|---|---|---|
| *1 | −346.5753 | 6.2655 | 1.53638 | 56.09 |
| *2 | 64.9151 | 6.3221 | | |
| 3 | 44.8814 | 4.1753 | 1.65160 | 58.54 |
| 4 | 25.1370 | 9.3014 | | |
| 5 | 96.0896 | 1.4001 | 1.64000 | 60.08 |
| 6 | 18.1608 | 4.9069 | | |
| 7 | 34.3196 | 1.1991 | 1.58913 | 61.13 |
| 8 | 17.8246 | 7.5437 | | |
| 9 | 467.8205 | 7.9999 | 1.80518 | 25.46 |
| 10 | −121.4106 | 3.0072 | | |
| 11 | ∞ | 25.0000 | 1.51680 | 64.20 |
| 12 | ∞ | 1.3958 | | |
| *13 | 21.6628 | 10.7681 | 1.51680 | 64.20 |
| *14 | −40.1588 | 3.4145 | | |
| 15 | 1703.8974 | 6.7780 | 1.55032 | 75.50 |
| 16 | −12.0627 | 0.7994 | 1.87070 | 40.73 |
| 17 | −38.1842 | DD[17] | | |
| 18 | −63.5240 | 0.8005 | 1.88100 | 40.14 |
| 19 | 30.9475 | 7.3963 | 1.49700 | 81.61 |
| 20 | −28.7955 | DD[20] | | |
| 21 | 276.8591 | 3.4351 | 1.84666 | 23.78 |
| 22 | −124.7809 | 23.0098 | | |
| 23 | 46.0531 | 6.2127 | 1.87070 | 40.73 |
| 24 | 102.9101 | 9.9938 | | |
| 25 | 31.9990 | 5.7775 | 2.00100 | 29.13 |
| 26 | 43.1010 | DD[26] | | |
| 27 | −33.1431 | 0.8000 | 1.61997 | 63.88 |
| 28 | 91.8406 | DD[28] | | |

TABLE 1A-continued

Example 1

| Sn | R | D | Nd | νd |
|---|---|---|---|---|
| 29 | −155.6525 | 5.4609 | 1.84666 | 23.78 |
| 30 | −45.7414 | DD[30] | | |

TABLE 1B

Example 1

| Sn | R | D | Nd | νd |
|---|---|---|---|---|
| 31 | −806.9935 | 4.3107 | 1.84666 | 23.78 |
| 32 | −87.2687 | 0.0310 | | |
| 33 | 23.3296 | 9.1097 | 1.59282 | 68.62 |
| 34 | 104.5810 | 13.7541 | | |
| 35 | −49.3123 | 0.8846 | 1.80518 | 25.46 |
| 36 | 16.3236 | 0.0300 | | |
| 37 | 14.7120 | 5.3842 | 1.59282 | 68.62 |
| 38 | −70.6748 | 7.7687 | | |
| 39(St) | ∞ | 2.5342 | | |
| 40 | −10.9463 | 1.4478 | 1.84666 | 23.78 |
| 41 | −975.5669 | 0.5419 | | |
| 42 | −280.9388 | 3.6313 | 1.49700 | 81.61 |
| 43 | −17.9711 | 10.0782 | | |
| 44 | −68.8881 | 3.9013 | 1.87070 | 40.73 |
| 45 | −30.5530 | 1.4987 | | |
| 46 | −120.9691 | 3.0205 | 1.87070 | 40.73 |
| 47 | −53.2156 | 6.0811 | | |
| 48 | 110.4087 | 3.6795 | 1.92286 | 20.88 |
| 49 | −194.9626 | 16.1644 | | |
| 50 | ∞ | 26.0000 | 1.51633 | 64.14 |
| 51 | ∞ | 3.7900 | | |

TABLE 2

Example 1

| | Wide | Middle | Tele |
|---|---|---|---|
| Zr | 1.0 | 1.2 | 1.4 |
| \|f\| | 6.57 | 7.89 | 9.20 |
| FNo. | 2.30 | 2.30 | 2.30 |
| 2ω[°] | 126.8 | 118.0 | 109.4 |
| DD[17] | 9.61 | 6.31 | 2.59 |
| DD[20] | 4.21 | 14.22 | 24.26 |
| DD[26] | 22.58 | 16.41 | 13.06 |
| DD[28] | 5.40 | 8.84 | 12.49 |
| DD[30] | 72.46 | 68.49 | 61.87 |

TABLE 3

Example 1

| Sn | 1 | 2 | 13 | 14 |
|---|---|---|---|---|
| KA | −1.0000000E+00 | −9.9850048E−01 | 1.0000000E+00 | 1.0000000E+00 |
| A3 | −1.3373855E−04 | 2.3282433E−04 | 0.0000000E+00 | 0.0000000E+00 |
| A4 | 5.1631678E−05 | −5.2743292E−05 | 1.3232795E−05 | −2.5413681E−07 |
| A5 | 3.4967246E−07 | 1.5703886E−05 | −1.4097660E−06 | 1.2647484E−05 |
| A6 | −2.2805767E−07 | −9.3858223E−07 | 2.7373131E−07 | −2.9698681E−06 |
| A7 | 1.6232005E−09 | −4.2186662E−08 | 4.4582199E−08 | 2.7240130E−08 |
| A8 | 7.1797098E−10 | 5.2636063E−09 | −1.6311032E−08 | 1.0019794E−07 |
| A9 | −1.9631559E−11 | 3.5636781E−11 | 9.0706253E−10 | −1.1159112E−08 |
| A10 | −8.8329635E−13 | −1.6579788E−11 | 1.7666137E−10 | −1.1727246E−09 |
| A11 | 3.9838174E−14 | 2.4703077E−13 | −1.9047814E−11 | 2.5057944E−10 |
| A12 | 4.1972240E−16 | 2.5824427E−14 | −7.7923598E−13 | 2.6616178E−12 |
| A13 | −3.7883158E−17 | −7.3381026E−16 | 1.3907981E−13 | −2.5638369E−12 |
| A14 | 6.8144168E−20 | −1.9756835E−17 | 1.2833255E−15 | 5.7182600E−14 |
| A15 | 1.9455357E−20 | 8.7634913E−19 | −5.0607607E−16 | 1.3831662E−14 |
| A16 | −1.5865713E−22 | 4.6998762E−21 | 3.9491172E−19 | −5.2927507E−16 |
| A17 | −5.2580327E−24 | −5.0184716E−22 | 9.3105104E−19 | −3.8266802E−17 |

TABLE 3-continued

| Example 1 | | | | |
|---|---|---|---|---|
| Sn | 1 | 2 | 13 | 14 |
| A18 | 6.3473281E−26 | 2.4454963E−24 | −2.7788552E−21 | 1.7954220E−18 |
| A19 | 5.9373371E−28 | 1.1351204E−25 | −6.8847900E−22 | 4.2829236E−20 |
| A20 | −8.7719896E−30 | −1.2323573E−27 | 1.0564607E−24 | −2.2123989E−21 |

Figure 6:
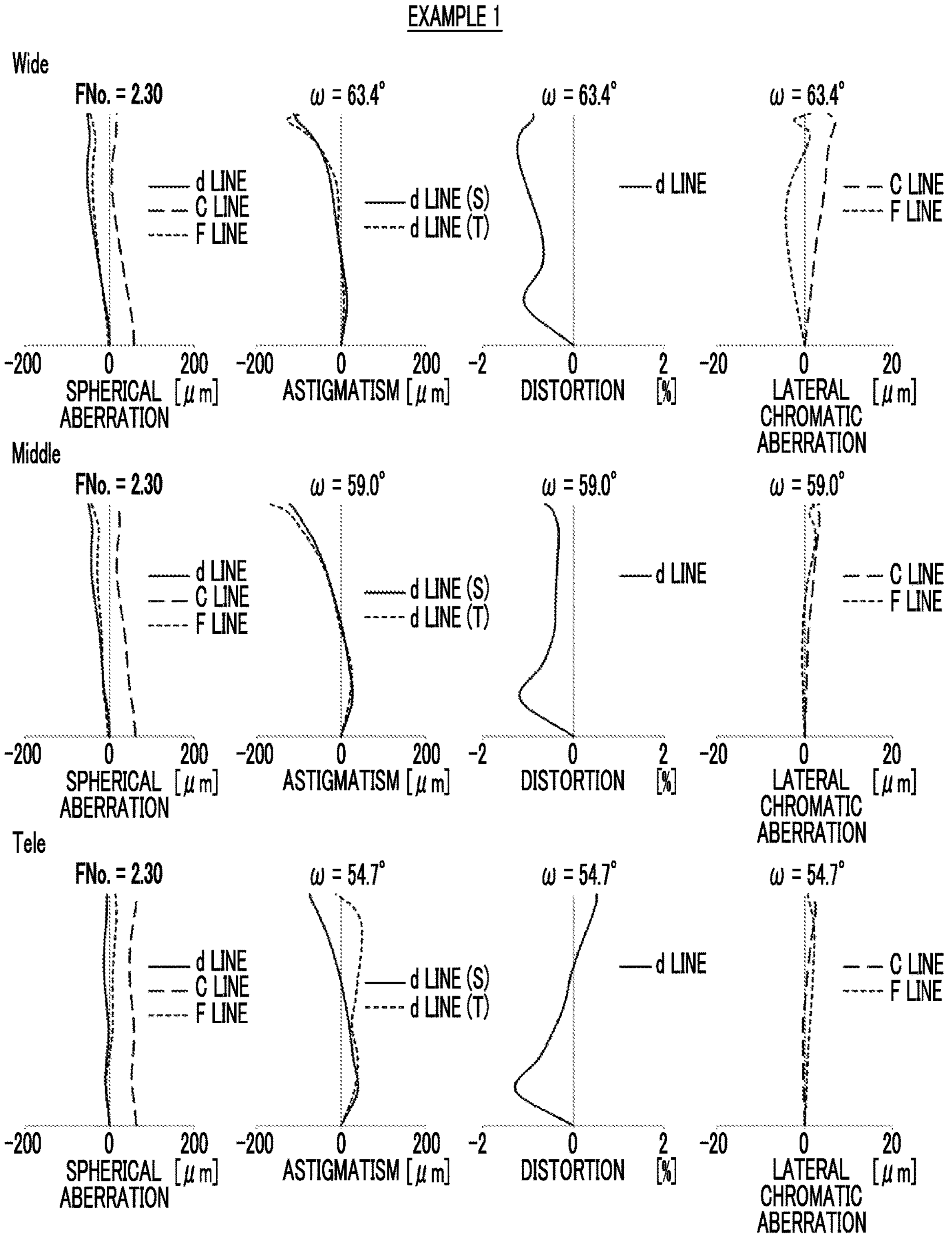
FIG. 6 is a diagram of aberrations in the zoom lens of Example 1.

FIG. 6 shows a diagram of aberrations in the zoom lens of Example 1 in a state where the projection distance is 0.9 meters (m). FIG. 6 shows, in order from the left, spherical aberration, astigmatism, distortion, and lateral chromatic aberration. In FIG. 6, the upper part labeled "Wide" shows aberrations in the wide angle end state, the middle part labeled "Middle" shows aberrations in the middle focal length state, and the lower part labeled "Tele" shows aberrations in the telephoto end state. In the spherical aberration diagram, aberrations at the d line, C line, and F line are indicated by the solid line, the long broken line, and the short broken line, respectively. In the astigmatism diagram, the aberration at the d line in the sagittal direction is indicated by a solid line, and the aberration at the d line in the tangential direction is indicated by the short broken line. In the distortion diagram, aberration at the d line is indicated by the solid line. In the lateral chromatic aberration diagram, aberrations at the C line and the F line are indicated by the long broken line and the short broken line, respectively. In the spherical aberration diagram, the value of the F number is shown after "FNo.=". In other aberration diagrams, the value of the maximum half angle of view is shown after "ω=".

FIGS. 3, 4, and 5 show cross-sectional views of configurations of the first modification example, the second modification example, and the third modification example of the zoom lens of Example 1, respectively. Since the configurations of the examples of FIGS. 3 to 5 are as described above, the repeated description thereof will not be repeated here.

Symbols, meanings, description methods, and illustration methods of the respective data pieces according to Example 1 and the modification example are basically similar to those in the following examples unless otherwise specified. Therefore, in the following description, repeated description will not be given. In the cross-sectional views of the following examples, the screen Scr is not shown. In the cross-sectional views of the following modification examples, the reference numerals of the focusing group Gf and the double-headed arrows are omitted.

Example 2

Figure 7:
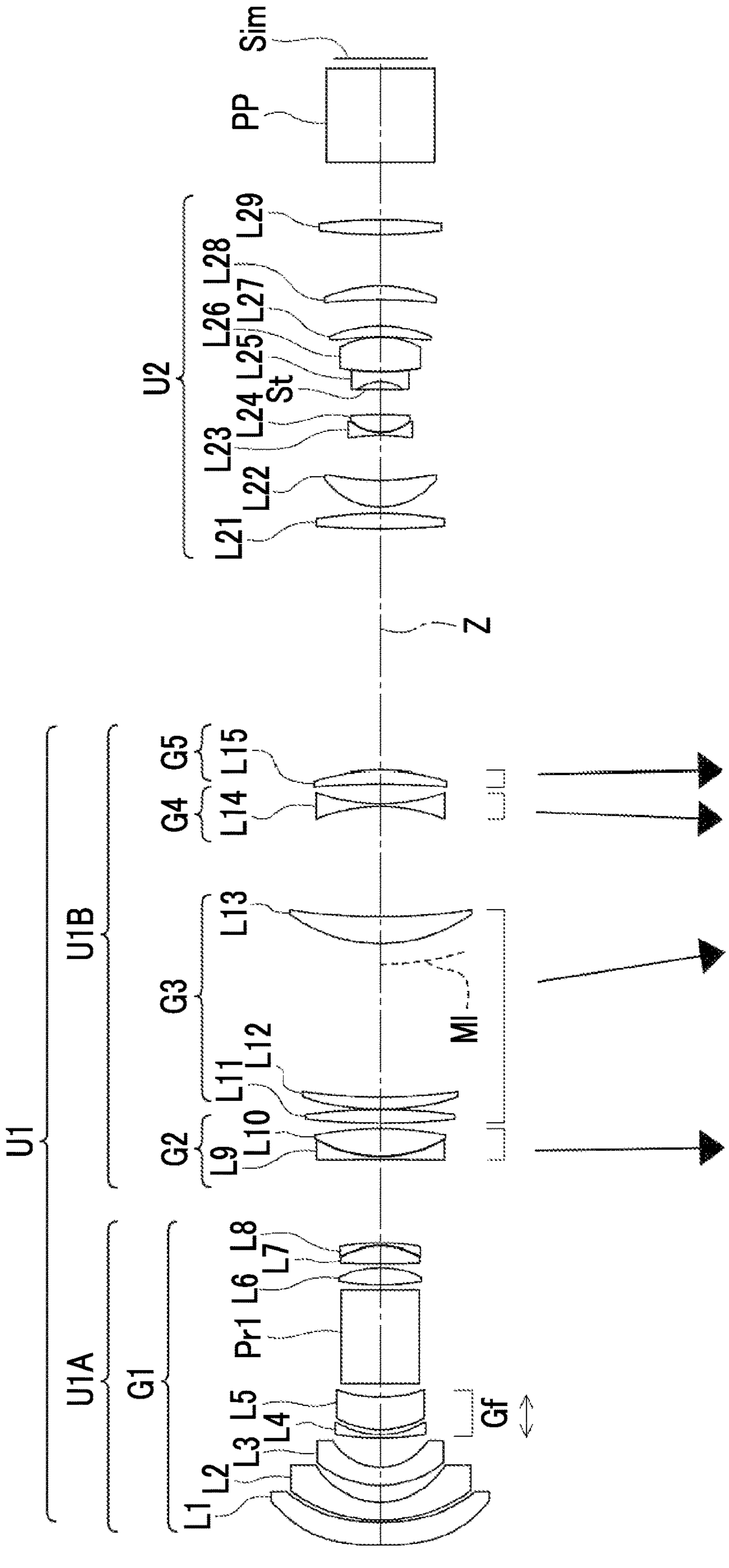
FIG. 7 is a cross-sectional view showing a configuration and rough movement directions of a zoom lens of Example 2.
Figure 8:
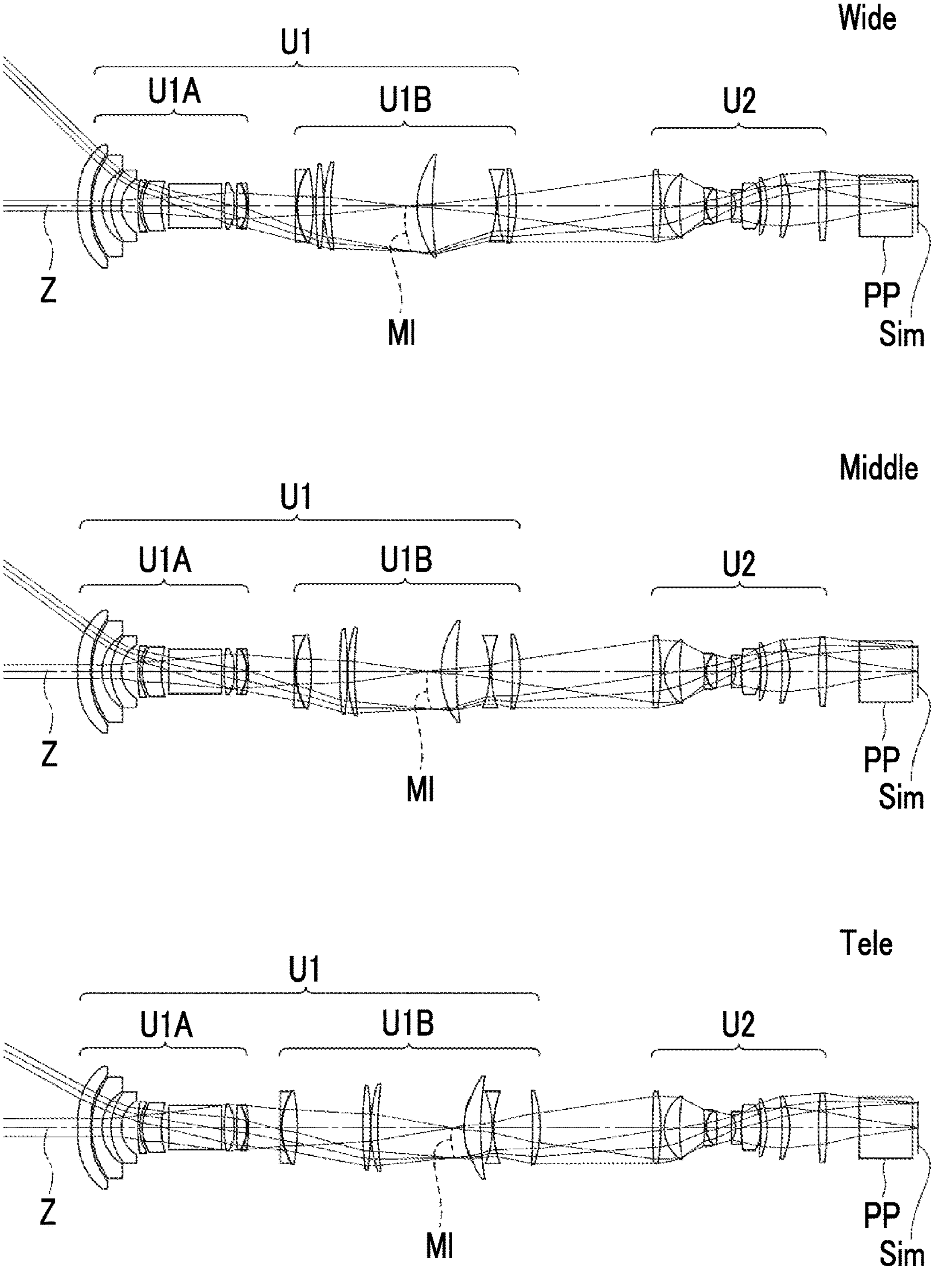
FIG. 8 is a cross-sectional view showing a configuration and luminous flux of the zoom lens of Example 2 in each zoom state.

FIGS. 7 and 8 show cross-sectional views of the configuration and luminous flux of the zoom lens of Example 2. The zoom lens of Example 2 consists of a first optical system U1 and a second optical system U2 in order from the magnification side to the reduction side. The first optical system U1 consists of a first A optical system U1A and a first B optical system U1B in order from the magnification side to the reduction side. The first A optical system U1A consists of a first lens group G1. The first B optical system U1B consists of, in order from the magnification side to the reduction side, a second lens group G2, a third lens group G3, a fourth lens group G4, and a fifth lens group G5.

The first lens group G1 consists of lenses L1 to L5, a prism Pr1, and lenses L6 to L8 in order from the magnification side to the reduction side. The second lens group G2 consists of lenses L9 to L10 in order from the magnification side to the reduction side. The third lens group G3 consists of lenses L11 to L13 in order from the magnification side to the reduction side. The fourth lens group G4 consists of a lens L14. The fifth lens group G5 consists of a lens L15. The second optical system U2 consists of lenses L21 to L24, an aperture stop St, and lenses L25 to L29 in order from the magnification side to the reduction side.

During zooming, the first lens group G1 remains stationary with respect to the magnification side image formation plane, and each of the second lens group G2, the third lens group G3, the fourth lens group G4, and the fifth lens groups G5 moves along the optical axis Z by changing the spacing between the adjacent groups. The intermediate image MI is formed in the third lens group G3. The focusing group Gf consists of a lens L4 and a lens L5.

Figure 10:
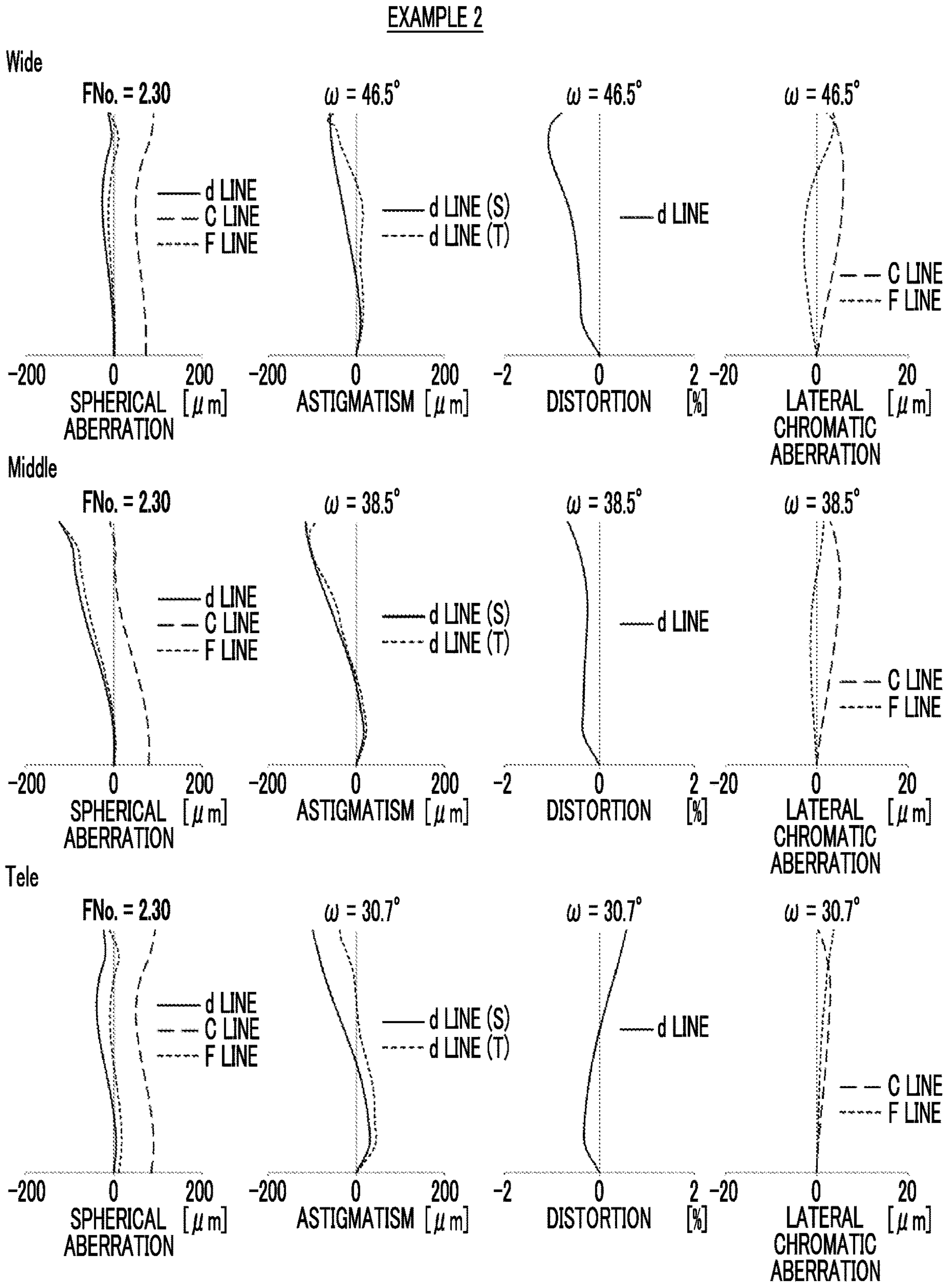
FIG. 10 is a diagram of aberrations in the zoom lens of Example 2.

Regarding the zoom lens of Example 2. Table 4A and 4B show basic lens data. Table 5 shows specifications and variable surface spacings, and Table 6 shows aspherical coefficients thereof. FIG. 10 shows aberration diagrams. The basic lens data and the aberration diagrams are in a state where the projection distance is 1.8 m (meters).

TABLE 4A

| Example 2 | | | | |
|---|---|---|---|---|
| Sn | R | D | Nd | νd |
| *1 | 110.7338 | 6.3822 | 1.53097 | 55.66 |
| *2 | 88.3256 | 0.4991 | | |
| 3 | 44.9717 | 5.0009 | 1.84666 | 23.78 |
| 4 | 22.0707 | 4.5616 | | |
| 5 | 29.3138 | 5.0000 | 1.59282 | 68.62 |
| 6 | 16.2093 | 8.1007 | | |
| 7 | 82.5337 | 0.9991 | 1.59282 | 68.62 |
| 8 | 25.2671 | 1.3638 | | |
| 9 | 26.0962 | 9.0975 | 1.84666 | 23.78 |
| 10 | 43.1664 | 3.6852 | | |
| 11 | ∞ | 26.0000 | 1.51680 | 64.20 |
| 12 | ∞ | 1.3793 | | |
| 13 | 74.5830 | 4.7558 | 1.55032 | 75.50 |
| 14 | −29.1310 | 1.1147 | | |
| 15 | 331.8144 | 4.9113 | 1.55032 | 75.50 |
| 16 | −22.1422 | 0.8003 | 1.87070 | 40.73 |
| 17 | −67.1983 | DD[17] | | |
| 18 | −2678.2102 | 0.8007 | 1.83400 | 37.34 |
| 19 | 37.3972 | 7.7450 | 1.49700 | 81.61 |
| 20 | −99.0672 | DD[20] | | |
| 21 | 197.9326 | 3.7818 | 1.84666 | 23.78 |
| 22 | −182.4507 | 0.0300 | | |
| 23 | 73.6385 | 3.4466 | 1.87070 | 40.73 |
| 24 | 164.2629 | 42.4490 | | |
| 25 | 45.4867 | 7.4527 | 1.87070 | 40.73 |
| 26 | 175.6533 | DD[26] | | |
| 27 | −49.5882 | 0.7991 | 1.61997 | 63.88 |
| 28 | 57.9709 | DD[28] | | |
| 29 | −246.0872 | 3.7209 | 1.84666 | 23.78 |
| 30 | −60.6925 | DD[30] | | |

TABLE 4B

| Example 2 | | | | |
|---|---|---|---|---|
| Sn | R | D | Nd | νd |
| 31 | 244.2630 | 4.1742 | 1.84666 | 23.78 |
| 32 | −114.6801 | 1.5858 | | |
| 33 | 20.4392 | 7.4794 | 1.59282 | 68.62 |
| 34 | 79.6695 | 12.4683 | | |
| 35 | −62.4830 | 0.7991 | 1.80518 | 25.46 |
| 36 | 13.3418 | 0.0309 | | |
| 37 | 12.9971 | 4.8381 | 1.59282 | 68.62 |
| 38 | −148.7768 | 7.1059 | | |
| 39(St) | ∞ | 2.1298 | | |
| 40 | −11.0221 | 2.7741 | 1.84666 | 23.78 |
| 41 | 82.6817 | 0.0309 | | |
| 42 | 82.0931 | 9.5747 | 1.49700 | 81.61 |
| 43 | −24.8985 | 0.0294 | | |
| 44 | −100.5464 | 3.0592 | 1.87070 | 40.73 |
| 45 | −37.5331 | 7.2842 | | |
| 46 | −150.0047 | 3.7909 | 1.87070 | 40.73 |
| 47 | −42.6238 | 14.1881 | | |
| 48 | 152.9536 | 3.9993 | 1.92286 | 20.88 |
| 49 | −158.5388 | 16.0376 | | |
| 50 | ∞ | 26.0000 | 1.51633 | 64.14 |
| 51 | ∞ | 2.7800 | | |

TABLE 5

| Example 2 | | | |
|---|---|---|---|
| | Wide | Middle | Tele |
| Zr | 1.0 | 1.3 | 1.8 |
| \|f\| | 12.54 | 16.56 | 21.93 |
| FNo. | 2.30 | 2.30 | 2.30 |
| 2ω[°] | 93.0 | 77.0 | 61.4 |
| DD[17] | 23.12 | 22.38 | 15.55 |
| DD[20] | 1.50 | 13.90 | 32.15 |
| DD[26] | 30.65 | 15.83 | 5.65 |
| DD[28] | 5.39 | 10.43 | 19.04 |
| DD[30] | 66.83 | 64.95 | 55.10 |

TABLE 6

| Example 2 | | |
|---|---|---|
| Sn | 1 | 2 |
| KA | −1.0000000E+00 | −9.6703949E−01 |
| A3 | −1.8332126E−04 | −1.6316793E−04 |
| A4 | 5.4081350E−05 | 5.0654664E−05 |
| A5 | −3.0235761E−06 | 4.7646304E−07 |
| A6 | −5.4204356E−08 | −8.2979517E−07 |
| A7 | 1.5215589E−08 | 8.1868516E−08 |
| A8 | −7.8780643E−11 | −5.7731446E−10 |
| A9 | −6.1638640E−11 | −3.0958087E−10 |
| A10 | 1.9351782E−12 | 9.9186649E−12 |
| A11 | 9.3819512E−14 | 6.3710794E−13 |
| A12 | −5.1190652E−15 | −3.2083487E−14 |
| A13 | −4.0245672E−17 | −6.3489313E−16 |
| A14 | 5.7747166E−18 | 4.9429764E−17 |
| A15 | −3.4684154E−20 | 2.0532975E−19 |
| A16 | −3.1279563E−21 | −3.9989446E−20 |
| A17 | 3.9667491E−23 | 9.4719523E−23 |
| A18 | 7.1704602E−25 | 1.6215983E−23 |
| A19 | −1.0799035E−26 | −6.1946228E−26 |
| A20 | −3.3301954E−29 | −2.5444028E−27 |

Figure 9:
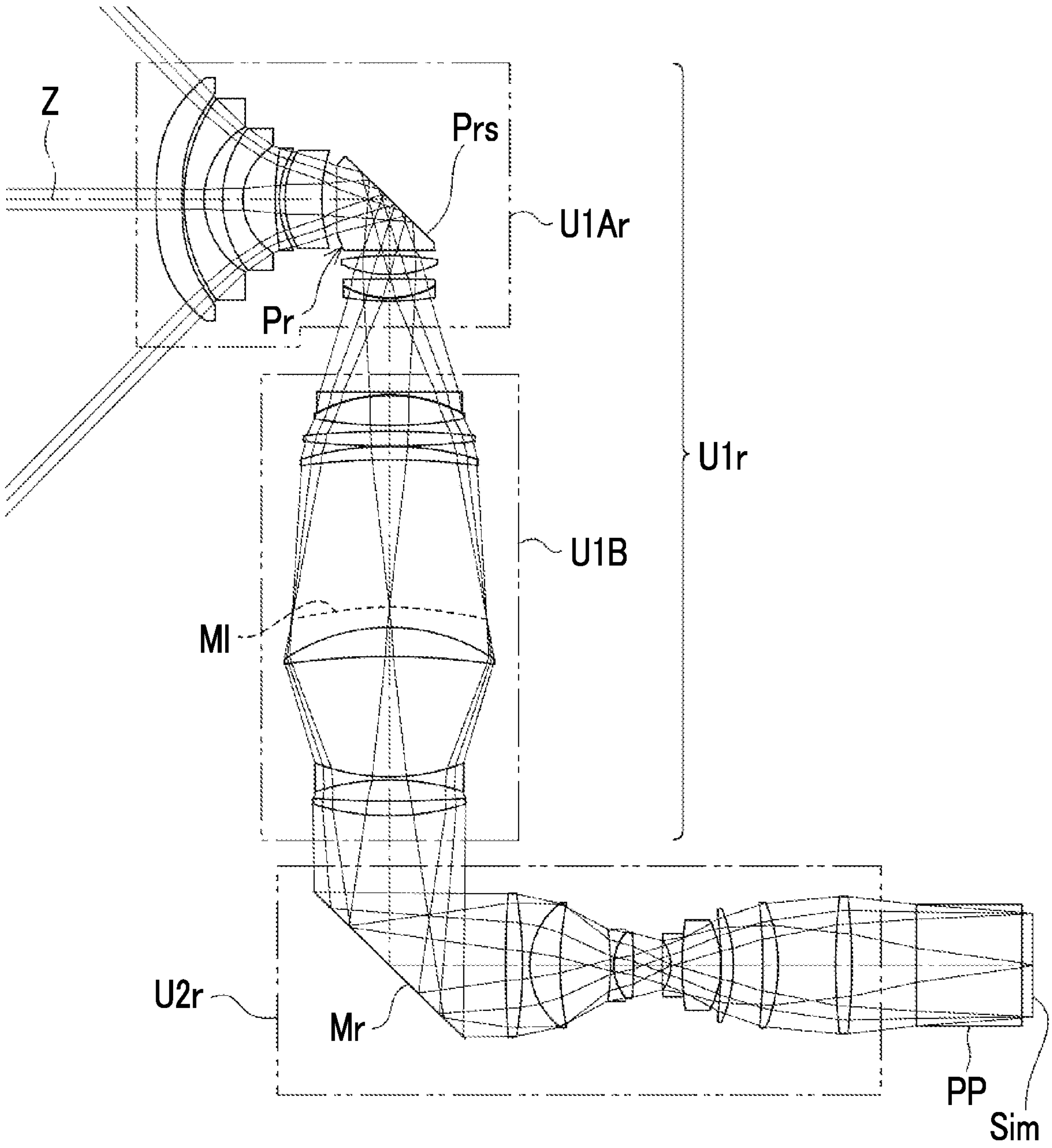
FIG. 9 is a cross-sectional view showing a configuration and luminous flux of a modification example of the zoom lens of Example 2.

FIG. 9 shows a configuration and luminous flux at the wide angle end of the zoom lens according to the modification example of Example 2. The zoom lens of FIG. 9 has two optical path deflecting members, and thus the optical path is deflected twice. The zoom lens of FIG. 9 consists of a first optical system U1*r* and a second optical system U2*r* in order from the magnification side to the reduction side along the optical path. The first optical system U1*r* consists of a first A optical system U1Ar and a first B optical system U1B in order from the magnification side to the reduction side along the optical path. The first A optical system U1Ar of FIG. 9 is different from the first A optical system U1A of Example 2 in that the prism Pr1 of Example 2 is replaced with the prism Pr having the reflecting surface Prs and the optical path is deflected by the reflecting surface Prs. The second optical system U2*r* of FIG. 9 is different from the second optical system U2 of Example 2 in that the mirror Mr is disposed closest to the magnification side of the second optical system U2*r* and the optical path is deflected by the mirror Mr. Other configurations of the zoom lens of FIG. 9 are the same as those of the zoom lens of Example 2.

Example 3

Figure 11:
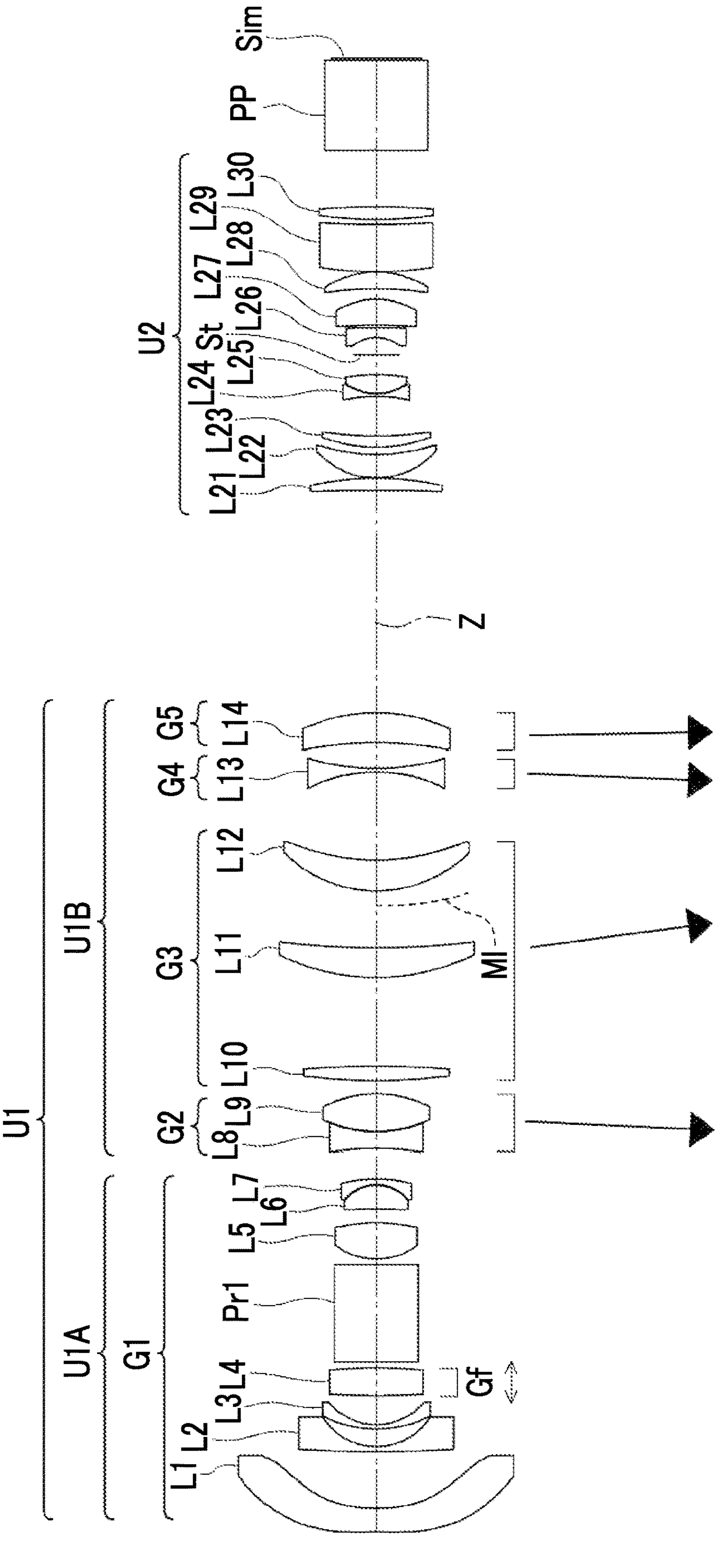
FIG. 11 is a cross-sectional view showing a configuration and rough movement directions of a zoom lens of Example 3.
Figure 12:
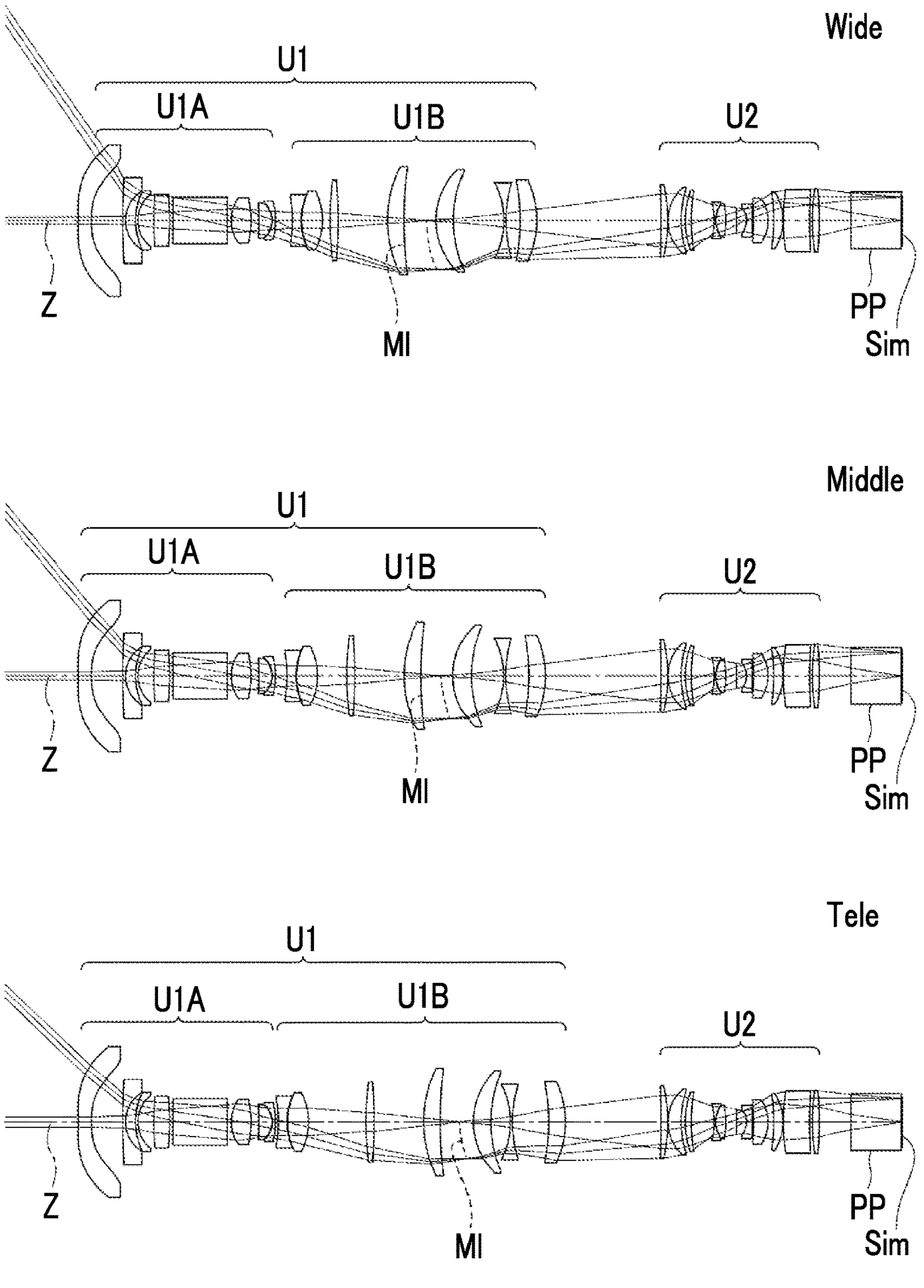
FIG. 12 is a cross-sectional view showing a configuration and luminous flux of the zoom lens of Example 3 in each zoom state.

FIGS. 11 and 12 show cross-sectional views of the configuration and luminous flux of the zoom lens of Example 3. The zoom lens of Example 3 consists of a first optical system U1 and a second optical system U2 in order from the magnification side to the reduction side. The first optical system U1 consists of a first A optical system U1A and a first B optical system U1B in order from the magnification side to the reduction side. The first A optical system U1A consists of a first lens group G1. The first B optical system U1B consists of, in order from the magnification side to the reduction side, a second lens group G2, a third lens group G3, a fourth lens group G4, and a fifth lens group G5.

The first lens group G1 consists of lenses L1 to LA, a prism Pr1, and lenses L5 to L7 in order from the magnification side to the reduction side. The second lens group G2 consists of lenses L8 and L9 in order from the magnification side to the reduction side. The third lens group G3 consists of lenses L10 to L12 in order from the magnification side to the reduction side. The fourth lens group G4 consists of a lens L13. The fifth lens group G5 consists of a lens L14. The second optical system U2 consists of lenses L21 to L25, an aperture stop St, and lenses L26 to L30 in order from the magnification side to the reduction side.

During zooming, the first lens group G1 remains stationary with respect to the magnification side image formation plane, and each of the second lens group G2, the third lens group G3, the fourth lens group G4, and the fifth lens groups G5 moves along the optical axis Z by changing the spacing between the adjacent groups. The intermediate image MI is formed in the third lens group G3. The focusing group Gf consists of a lens L4.

Figure 14:
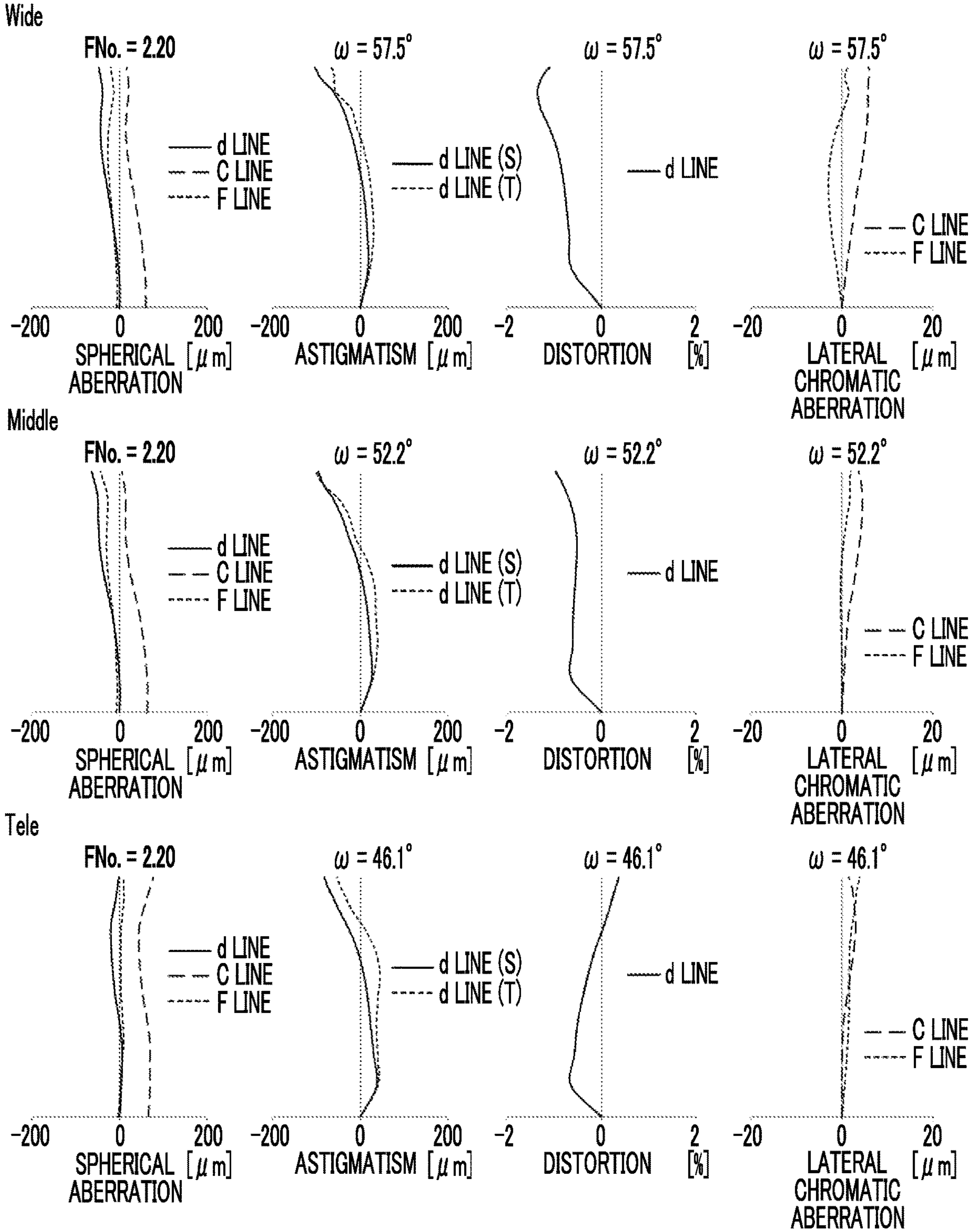
FIG. 14 is a diagram of aberrations in the zoom lens of Example 3.

Regarding the zoom lens of Example 3, Table 7A and 7B show basic lens data, Table 8 shows specifications and variable surface spacings, and Table 9 shows aspherical coefficients thereof. FIG. 14 shows aberration diagrams. The basic lens data and the aberration diagrams are in a state where the projection distance is 0.9 m (meters).

TABLE 7A

| Example 3 | | | | |
|---|---|---|---|---|
| Sn | R | D | Nd | νd |
| *1 | −299.5775 | 6.7790 | 1.53097 | 55.66 |
| *2 | 73.7721 | 16.1197 | | |
| 3 | 360.8820 | 1.4010 | 1.65160 | 58.54 |
| 4 | 18.8068 | 5.1477 | | |
| 5 | 36.2087 | 1.2007 | 1.55032 | 75.50 |
| 6 | 18.2358 | 8.3283 | | |

TABLE 7A-continued

| Example 3 | | | | |
|---|---|---|---|---|
| Sn | R | D | Nd | vd |
| 7 | 207.4210 | 7.9990 | 1.80518 | 25.46 |
| 8 | −142.8087 | 1.7204 | | |
| 9 | ∞ | 28.0000 | 1.80420 | 46.50 |
| 10 | ∞ | 1.6875 | | |
| *11 | 23.0952 | 10.2041 | 1.51680 | 64.20 |
| *12 | −39.9116 | 3.8627 | | |
| 13 | −354.9496 | 6.9485 | 1.55032 | 75.50 |
| 14 | −12.2610 | 1.7240 | 1.87070 | 40.73 |
| 15 | −42.3717 | DD[15] | | |
| 16 | −75.8564 | 4.6894 | 1.88100 | 40.14 |
| 17 | 36.9022 | 10.8660 | 1.49700 | 81.61 |
| 18 | −34.5704 | DD[18] | | |
| 19 | 161.6557 | 4.1561 | 1.84666 | 23.78 |
| 20 | −273.1065 | 25.4007 | | |
| 21 | 65.3452 | 8.5137 | 1.87070 | 40.73 |
| 22 | 234.8198 | 16.3600 | | |
| 23 | 38.6806 | 8.9579 | 1.87070 | 40.73 |
| 24 | 67.3696 | DD[24] | | |
| 25 | −45.1997 | 1.0313 | 1.61997 | 63.88 |
| 26 | 70.0206 | DD[26] | | |
| 27 | −111.6800 | 8.5444 | 1.84666 | 23.78 |
| 28 | −52.8980 | DD[28] | | |

TABLE 7B

| Example 3 | | | | |
|---|---|---|---|---|
| Sn | R | D | Nd | vd |
| 29 | −608.1413 | 3.4633 | 1.84666 | 23.78 |
| 30 | −90.2173 | 0.0299 | | |
| 31 | 23.5354 | 6.7798 | 1.59282 | 68.62 |
| 32 | 55.6310 | 2.1463 | | |
| 33 | 46.5343 | 3.1509 | 1.62041 | 60.29 |
| 34 | 98.2651 | 11.3988 | | |

TABLE 7B-continued

| Example 3 | | | | |
|---|---|---|---|---|
| Sn | R | D | Nd | vd |
| 35 | −46.0612 | 0.8000 | 1.80518 | 25.46 |
| 36 | 16.2511 | 0.0307 | | |
| 37 | 15.0363 | 5.1699 | 1.59282 | 68.62 |
| 38 | −58.1333 | 5.6602 | | |
| 39(St) | ∞ | 4.9658 | | |
| 40 | −11.1135 | 2.8341 | 1.84666 | 23.78 |
| 41 | −568.3485 | 0.8029 | | |
| 42 | −105.8072 | 7.4020 | 1.49700 | 81.61 |
| 43 | −22.1323 | 3.0714 | | |
| 44 | −95.6005 | 4.7729 | 1.87070 | 40.73 |
| 45 | −27.8856 | 0.0309 | | |
| 46 | 107.5492 | 13.5150 | 1.87070 | 40.73 |
| 47 | 265.2141 | 1.3550 | | |
| 48 | 109.6229 | 3.6827 | 1.92286 | 20.88 |
| 49 | −191.8514 | 16.2054 | | |
| 50 | ∞ | 26.0000 | 1.51633 | 64.14 |
| 51 | ∞ | 0.5000 | | |

TABLE 8

| Example 3 | | | |
|---|---|---|---|
| | Wide | Middle | Tele |
| Zr | 1.0 | 1.2 | 1.5 |
| \|f\| | 8.38 | 10.22 | 12.56 |
| FNo. | 2.20 | 2.20 | 2.20 |
| 2ω[°] | 115.0 | 104.4 | 92.2 |
| DD[15] | 8.64 | 5.97 | 1.40 |
| DD[18] | 3.78 | 15.03 | 29.54 |
| DD[24] | 25.24 | 16.50 | 10.10 |
| DD[26] | 7.30 | 11.95 | 18.65 |
| DD[28] | 63.85 | 59.35 | 49.12 |

TABLE 9

| Example 3 | | | | |
|---|---|---|---|---|
| Sn | 1 | 2 | 11 | 12 |
| KA | −1.0000000E+00 | 3.1214518E−01 | 1.0000000E+00 | 1.0000000E+00 |
| A3 | −1.4111626E−05 | 1.7554594E−04 | 0.0000000E+00 | 0.0000000E+00 |
| A4 | 3.2925295E−05 | −2.3786268E−05 | 2.6821753E−05 | 2.4211161E−05 |
| A5 | −2.3537548E−07 | 9.9570379E−06 | −8.0588515E−06 | −5.7213102E−06 |
| A6 | −1.0272573E−07 | −9.0178500E−07 | 2.1615657E−06 | 1.5585719E−06 |
| A7 | 2.0878899E−09 | 8.0500652E−09 | −1.3125728E−07 | 6.1630816E−09 |
| A8 | 3.2953163E−10 | 3.3439157E−09 | −3.9144580E−08 | −7.7604928E−08 |
| A9 | −1.5657238E−11 | −1.3387368E−10 | 6.4684542E−09 | 1.0425356E−08 |
| A10 | −2.4136289E−13 | −6.3512553E−12 | 1.2342755E−10 | 1.1556494E−09 |
| A11 | 2.7736481E−14 | 4.6936079E−13 | −7.9308699E−11 | −3.3332413E−10 |
| A12 | −1.7485545E−16 | 2.2074237E−15 | 1.9742192E−12 | 2.1352208E−12 |
| A13 | −2.2517548E−17 | −7.1527862E−16 | 4.7873662E−13 | 4.4493009E−12 |
| A14 | 3.6404899E−19 | 7.7269887E−18 | −2.0874570E−14 | −2.0996717E−13 |
| A15 | 9.3071829E−21 | 5.3188085E−19 | −1.5715889E−15 | −2.9988076E−14 |
| A16 | −2.2048673E−22 | −1.0492807E−20 | 8.4434742E−17 | 2.1177476E−15 |
| A17 | −1.8366549E−24 | −1.7549435E−22 | 2.6962542E−18 | 1.0049831E−16 |
| A18 | 6.0185325E−26 | 4.8747463E−24 | −1.6108343E−19 | −8.8910358E−18 |
| A19 | 1.2866204E−28 | 1.5233649E−26 | −1.8935895E−21 | −1.3325018E−19 |
| A20 | −6.4150845E−30 | −6.9257798E−28 | 1.2029003E−22 | 1.3939670E−20 |

Figure 13:
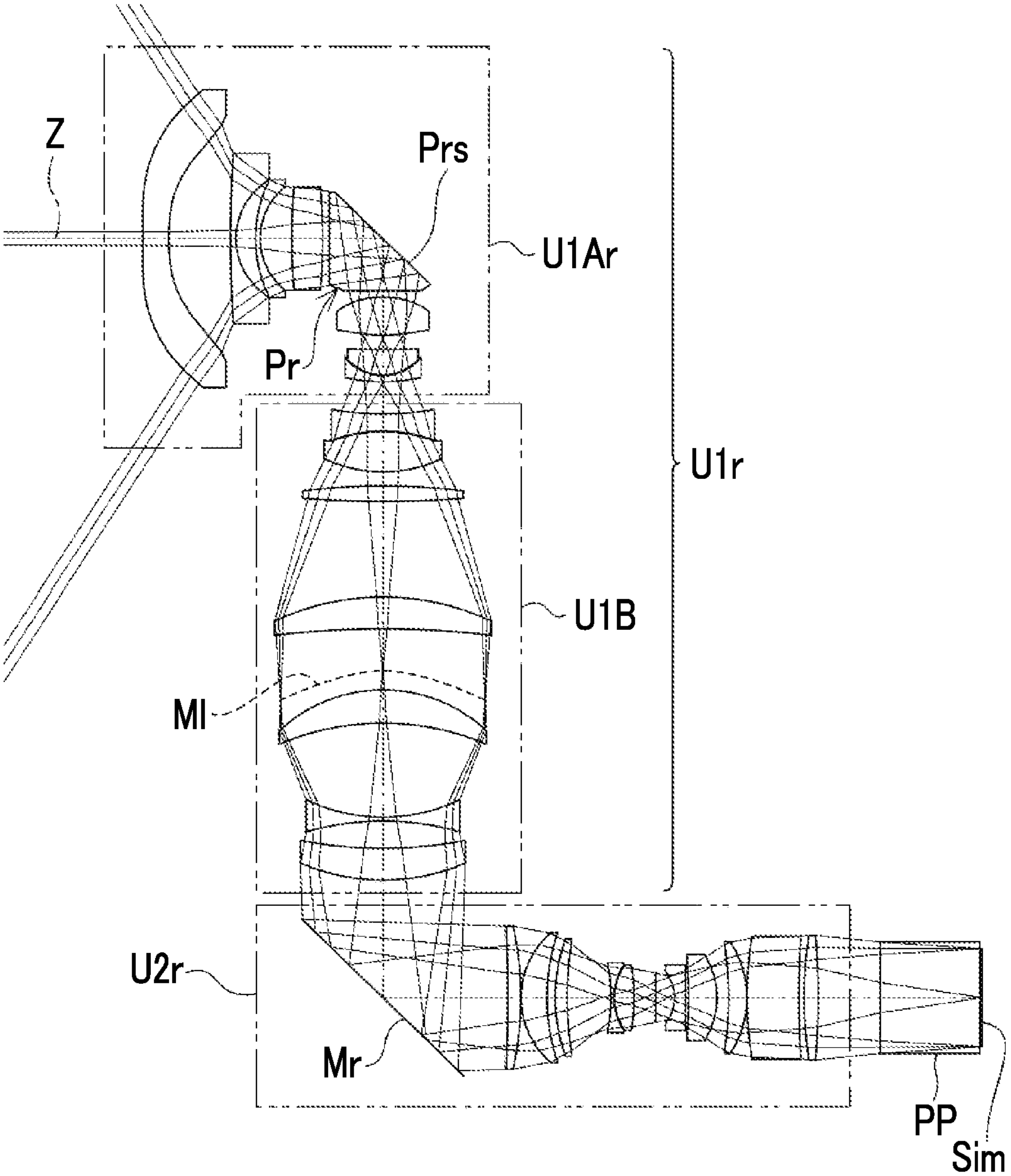
FIG. 13 is a cross-sectional view showing a configuration and luminous flux of a modification example of the zoom lens of Example 3.

FIG. 13 shows a configuration and luminous flux at the wide angle end of the zoom lens according to the modification example of Example 3. The zoom lens of FIG. 13 has two optical path deflecting members, and thus the optical path is deflected twice. The zoom lens of FIG. 13 consists of a first optical system U1*r* and a second optical system U2*r* in order from the magnification side to the reduction side along the optical path. The first optical system U1*r* consists of a first A optical system U1Ar and a first B optical system U1B in order from the magnification side to the reduction side along the optical path. The first A optical system U1Ar of FIG. 13 is different from the first A optical system U1A of Example 3 in that the prism Pr1 of Example 3 is replaced with the prism Pr having the reflecting surface Prs and the optical path is deflected by the reflecting surface Prs. The second optical system U2*r* of FIG. 13 is different from the second optical system U2 of Example 3 in that the mirror Mr is disposed closest to the magnification side of the second optical system U2*r* and the optical path is deflected by the mirror Mr. Other configurations of the zoom lens of FIG. 13 are the same as those of the zoom lens of Example 3.

Example 4

Figure 15:
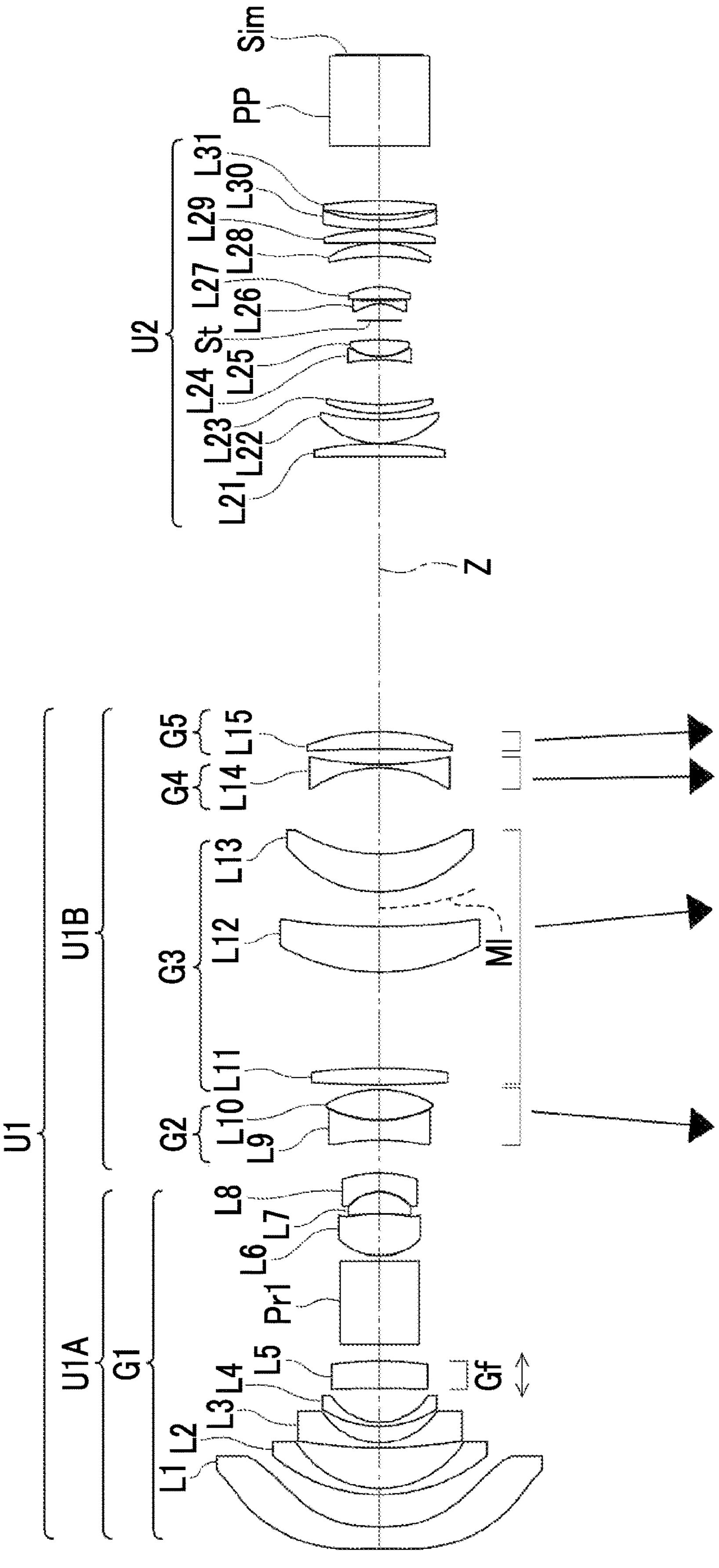
FIG. 15 is a cross-sectional view showing a configuration and rough movement directions of a zoom lens of Example 4.
Figure 16:
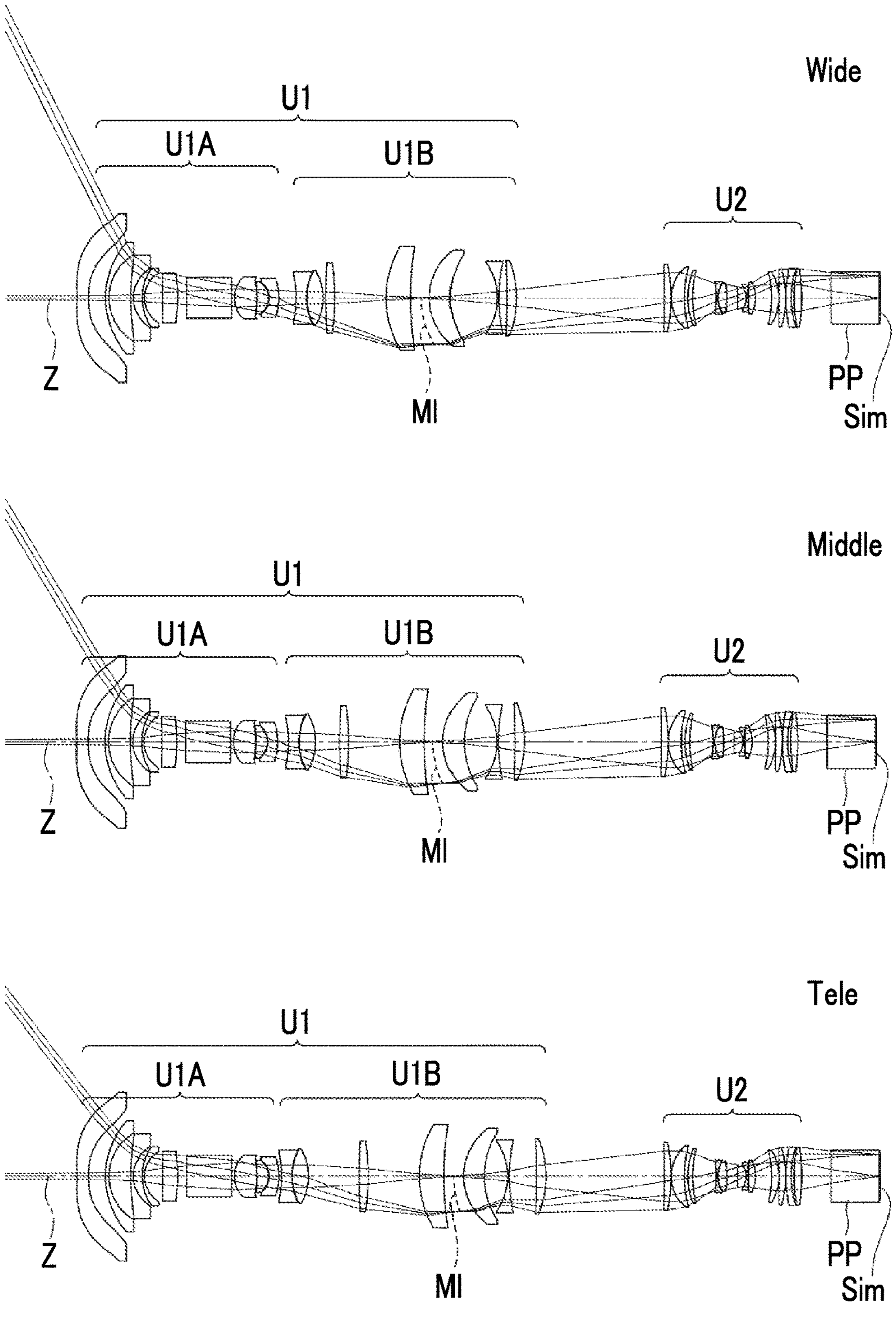
FIG. 16 is a cross-sectional view showing a configuration and luminous flux of the zoom lens of Example 4 in each zoom state.

FIGS. 15 and 16 show cross-sectional views of the configuration and luminous flux of the zoom lens of Example 4. The zoom lens of Example 4 consists of a first optical system U1 and a second optical system U2 in order from the magnification side to the reduction side. The first optical system U1 consists of a first A optical system U1A and a first B optical system U1B in order from the magnification side to the reduction side. The first A optical system U1A consists of a first lens group G1. The first B optical system U1B consists of, in order from the magnification side to the reduction side, a second lens group G2, a third lens group G3, a fourth lens group G4, and a fifth lens group G5.

The first lens group G1 consists of lenses L1 to L5, a prism Pr1, and lenses L6 to L8 in order from the magnification side to the reduction side. The second lens group G2 consists of lenses L9 to L10 in order from the magnification side to the reduction side. The third lens group G3 consists of lenses L11 to L13 in order from the magnification side to the reduction side. The fourth lens group G4 consists of a lens L14. The fifth lens group G5 consists of a lens L15. The second optical system U2 consists of lenses L21 to L25, an aperture stop St, and lenses L26 to L31 in order from the magnification side to the reduction side.

During zooming, the first lens group G1 remains stationary with respect to the magnification side image formation plane, and each of the second lens group G2, the third lens group G3, the fourth lens group G4, and the fifth lens groups G5 moves along the optical axis Z by changing the spacing between the adjacent groups. The intermediate image MI is formed in the third lens group G3. The focusing group Gf consists of a lens L5.

Figure 18:
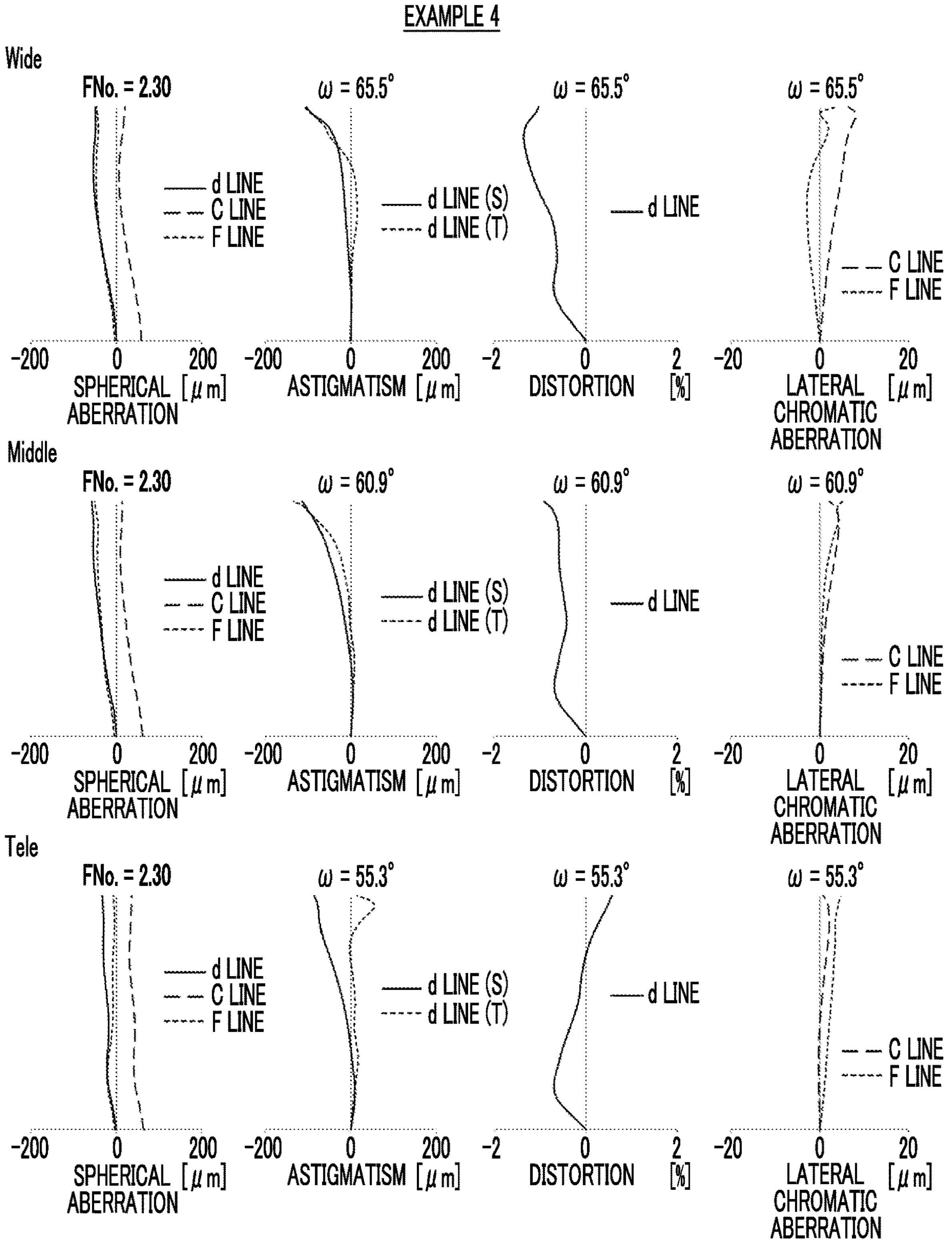
FIG. 18 is a diagram of aberrations in the zoom lens of Example 4.

Regarding the zoom lens of Example 4, Table 10A and 10B show basic lens data, Table 11 shows specifications and variable surface spacings, and Table 12 shows aspherical coefficients thereof. FIG. 18 shows aberration diagrams. The basic lens data and the aberration diagrams are in a state where the projection distance is 0.9 m (meters).

TABLE 10A

Example 4

| Sn | R | D | Nd | νd |
|---|---|---|---|---|
| *1 | −236.1530 | 6.2354 | 1.53097 | 55.66 |
| *2 | 76.7546 | 9.1625 | | |
| 3 | 49.8794 | 1.7993 | 1.72916 | 54.68 |
| 4 | 29.7037 | 11.8298 | | |
| 5 | 155.6980 | 1.4009 | 1.59282 | 68.62 |
| 6 | 20.4853 | 4.7466 | | |
| 7 | 30.9296 | 1.1997 | 1.55032 | 75.50 |
| 8 | 17.3721 | 9.7040 | | |
| 9 | −798.0182 | 7.9998 | 1.80518 | 25.46 |
| 10 | −105.0977 | 4.8947 | | |
| 11 | ∞ | 24.0000 | 1.80420 | 46.50 |
| 12 | ∞ | 1.6364 | | |
| *13 | 21.1208 | 12.0158 | 1.51680 | 64.20 |
| *14 | −36.0545 | 0.0306 | | |
| 15 | −103.7132 | 6.3009 | 1.55032 | 75.50 |
| 16 | −12.1252 | 5.4511 | 1.87070 | 40.73 |
| 17 | −35.7334 | DD[17] | | |
| 18 | −67.0609 | 5.7166 | 1.88100 | 40.14 |
| 19 | 35.0801 | 8.8759 | 1.49700 | 81.61 |
| 20 | −32.1912 | DD[20] | | |
| 21 | 329.0122 | 4.8498 | 1.84666 | 23.78 |
| 22 | −147.1225 | 27.5700 | | |
| 23 | 60.4267 | 13.1989 | 1.87070 | 40.73 |
| 24 | 194.0919 | 9.9974 | | |
| 25 | 35.6929 | 11.0510 | 1.87070 | 40.73 |
| 26 | 47.7906 | DD[26] | | |
| 27 | −36.4579 | 0.8003 | 1.61997 | 63.88 |
| 28 | 96.9237 | DD[28] | | |
| 29 | −509.7121 | 5.1329 | 1.84666 | 23.78 |
| 30 | −60.5951 | DD[30] | | |

TABLE 10B

Example 4

| Sn | R | D | Nd | νd |
|---|---|---|---|---|
| 31 | −1286.8265 | 3.7825 | 1.84666 | 23.78 |
| 32 | −101.0165 | 0.0309 | | |
| 33 | 24.5740 | 6.8032 | 1.59282 | 68.62 |
| 34 | 70.8329 | 1.9194 | | |
| 35 | 45.1078 | 2.5410 | 1.72916 | 54.68 |
| 36 | 68.6641 | 12.7427 | | |
| 37 | −49.6558 | 0.8000 | 1.80518 | 25.46 |
| 38 | 16.4636 | 0.0308 | | |
| 39 | 14.9354 | 4.8086 | 1.59282 | 68.62 |
| 40 | −66.6638 | 5.6160 | | |
| 41(St) | ∞ | 4.8697 | | |
| 42 | −11.3944 | 0.8137 | 1.84666 | 23.78 |
| 43 | 179.9464 | 0.5408 | | |
| 44 | 502.6235 | 3.5364 | 1.49700 | 81.61 |
| 45 | −21.7444 | 8.6712 | | |
| 46 | −67.2255 | 4.0365 | 1.87070 | 40.73 |
| 47 | −29.5055 | 0.0291 | | |
| 48 | −1078.0358 | 3.6550 | 1.87070 | 40.73 |
| 49 | −60.2984 | 0.0302 | | |
| 50 | 85.1355 | 2.7790 | 1.80518 | 25.46 |
| 51 | 53.5661 | 1.6122 | | |
| 52 | 95.5158 | 4.0003 | 1.92286 | 20.88 |
| 53 | −127.5553 | 15.8644 | | |
| 54 | ∞ | 26.0000 | 1.51633 | 64.14 |
| 55 | ∞ | 0.5000 | | |

TABLE 11

Example 4

| | Wide | Middle | Tele |
|---|---|---|---|
| Zr | 1.0 | 1.2 | 1.5 |
| \|f\| | 5.99 | 7.31 | 8.98 |

TABLE 11-continued

| Example 4 | | | |
|---|---|---|---|
| | Wide | Middle | Tele |
| FNo. | 2.30 | 2.30 | 2.30 |
| 2ω[°] | 131.0 | 121.8 | 110.6 |
| DD[17] | 9.30 | 5.91 | 1.40 |
| DD[20] | 1.40 | 13.12 | 27.19 |
| DD[26] | 24.99 | 17.57 | 12.64 |
| DD[28] | 4.40 | 8.94 | 14.67 |
| DD[30] | 79.46 | 74.03 | 63.65 |

TABLE 12

| Example 4 | | | | |
|---|---|---|---|---|
| Sn | 1 | 2 | 13 | 14 |
| KA | 1.0000000E+00 | −1.0000000E+00 | 1.0000000E+00 | 1.0000000E+00 |
| A3 | −1.5386578E−04 | −2.7784378E−05 | 0.0000000E+00 | 0.0000000E+00 |
| A4 | 4.0859047E−05 | 2.7603782E−06 | 2.5718778E−05 | 1.6047200E−05 |
| A5 | −1.8266978E−07 | 5.6044190E−06 | −4.7047362E−07 | 1.0588577E−05 |
| A6 | −9.3068149E−08 | −4.0729383E−07 | −5.9759318E−07 | −2.9319899E−06 |
| A7 | 1.3874307E−09 | −2.1159822E−09 | 2.7013946E−07 | 3.1506019E−07 |
| A8 | 1.7320591E−10 | 1.1025251E−09 | −2.3346592E−08 | 3.0708357E−08 |
| A9 | −6.2898495E−12 | −1.8417745E−11 | −3.4432371E−09 | −1.0280512E−08 |
| A10 | −6.4127309E−14 | −1.7677423E−12 | 5.9289187E−10 | 3.8737603E−10 |
| A11 | 7.1029260E−15 | 6.3160732E−14 | 1.9985791E−11 | 1.3051254E−10 |
| A12 | −9.0894837E−17 | 1.1144485E−15 | −6.3967966E−12 | −1.2141911E−11 |
| A13 | −2.6109743E−18 | −7.8157544E−17 | −4.2481451E−14 | −8.2831155E−13 |
| A14 | 9.2037615E−20 | 1.1207602E−19 | 3.9209647E−14 | 1.2415192E−13 |
| A15 | −4.0545250E−22 | 4.5435434E−20 | −6.3766243E−17 | 2.5917928E−15 |
| A16 | −2.7133849E−23 | −4.6007298E−22 | −1.3872841E−16 | −6.2527018E−16 |
| A17 | 4.8287362E−25 | −1.1613442E−23 | 4.1897886E−19 | −3.1939623E−18 |
| A18 | 6.5130182E−28 | 1.8228458E−25 | 2.6069921E−19 | 1.5355965E−18 |
| A19 | −8.4168379E−29 | 7.9048505E−28 | −4.9004110E−22 | −7.4098957E−24 |
| A20 | 5.9892653E−31 | −1.7596430E−29 | −2.0056869E−22 | −1.4397874E−21 |

Figure 17:
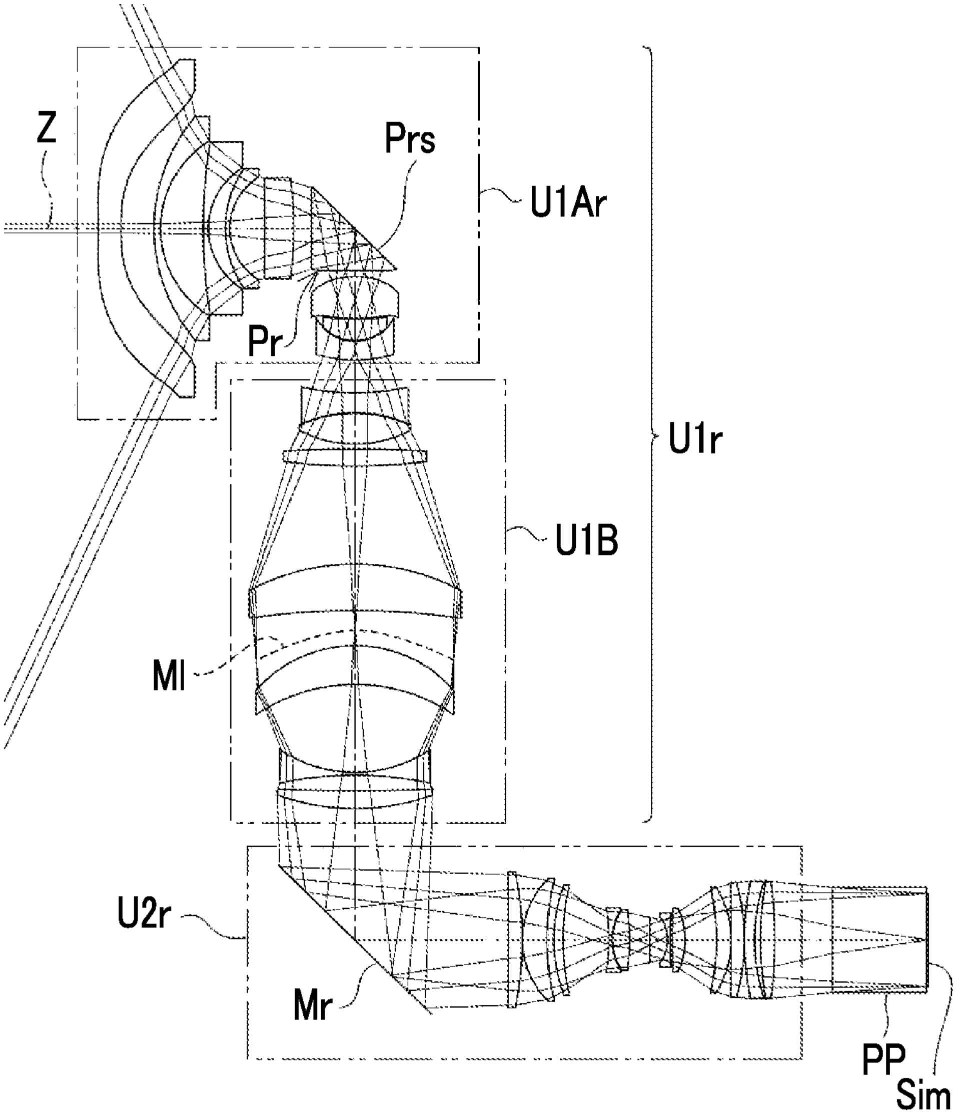
FIG. 17 is a cross-sectional view showing a configuration and luminous flux of a modification example of the zoom lens of Example 4.

FIG. 17 shows a configuration and luminous flux at the wide angle end of the zoom lens according to the modification example of Example 4. The zoom lens of FIG. 17 has two optical path deflecting members, and thus the optical path is deflected twice. The zoom lens of FIG. 17 consists of a first optical system U1*r* and a second optical system U2*r* in order from the magnification side to the reduction side along the optical path. The first optical system U1*r* consists of a first A optical system U1Ar and a first B optical system U1B in order from the magnification side to the reduction side along the optical path. The first A optical system U1Ar of FIG. 17 is different from the first A optical system U1A of Example 4 in that the prism Pr1 of Example 4 is replaced with the prism Pr having the reflecting surface Prs and the optical path is deflected at the reflecting surface Prs. The second optical system U2*r* of FIG. 17 is different from the second optical system U2 of Example 4 in that the mirror Mr is disposed closest to the magnification side of the second optical system U2*r* and the optical path is deflected by the mirror Mr. Other configurations of the zoom lens of FIG. 17 are the same as those of the zoom lens of Example 4.

Example 5

Figure 19:
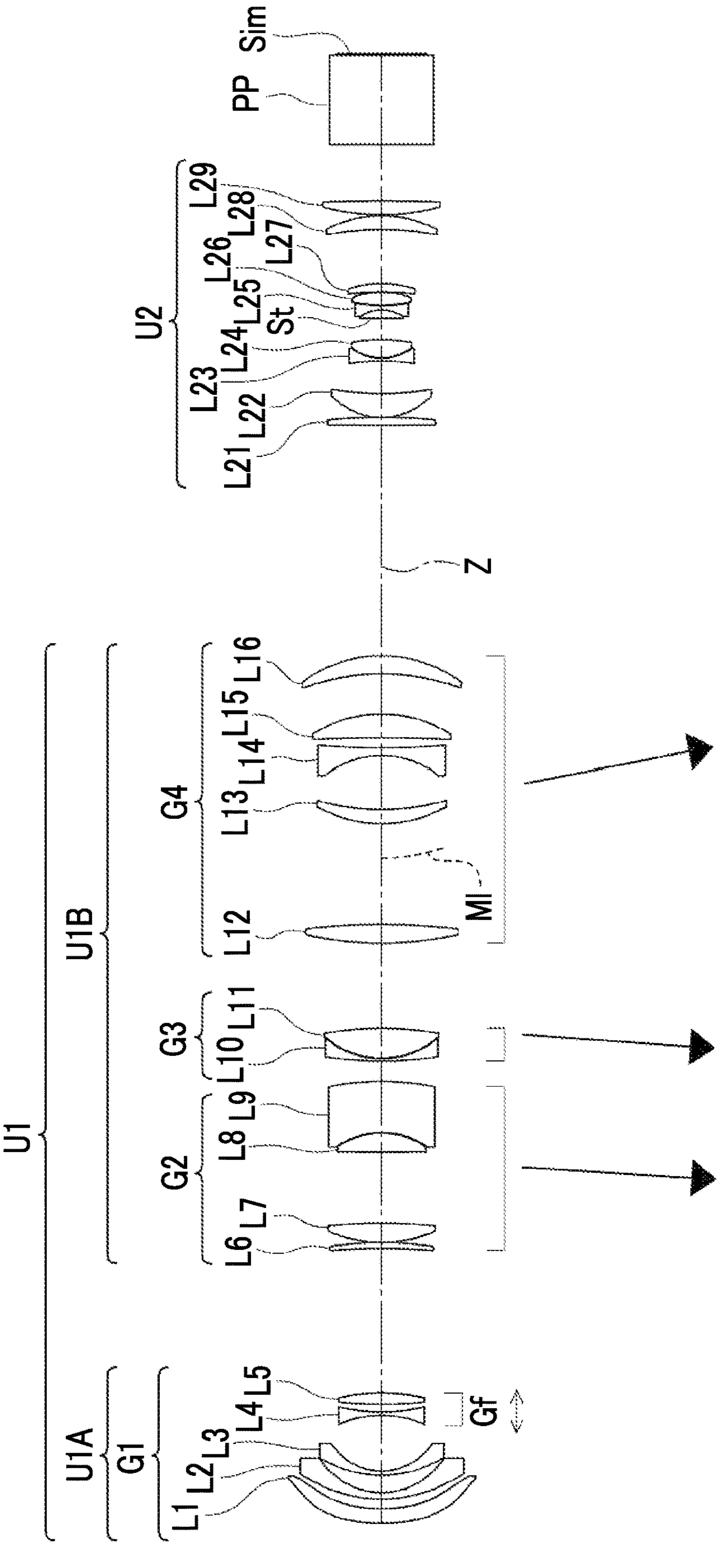
FIG. 19 is a cross-sectional view showing a configuration and rough movement directions of a zoom lens of Example 5.
Figure 20:
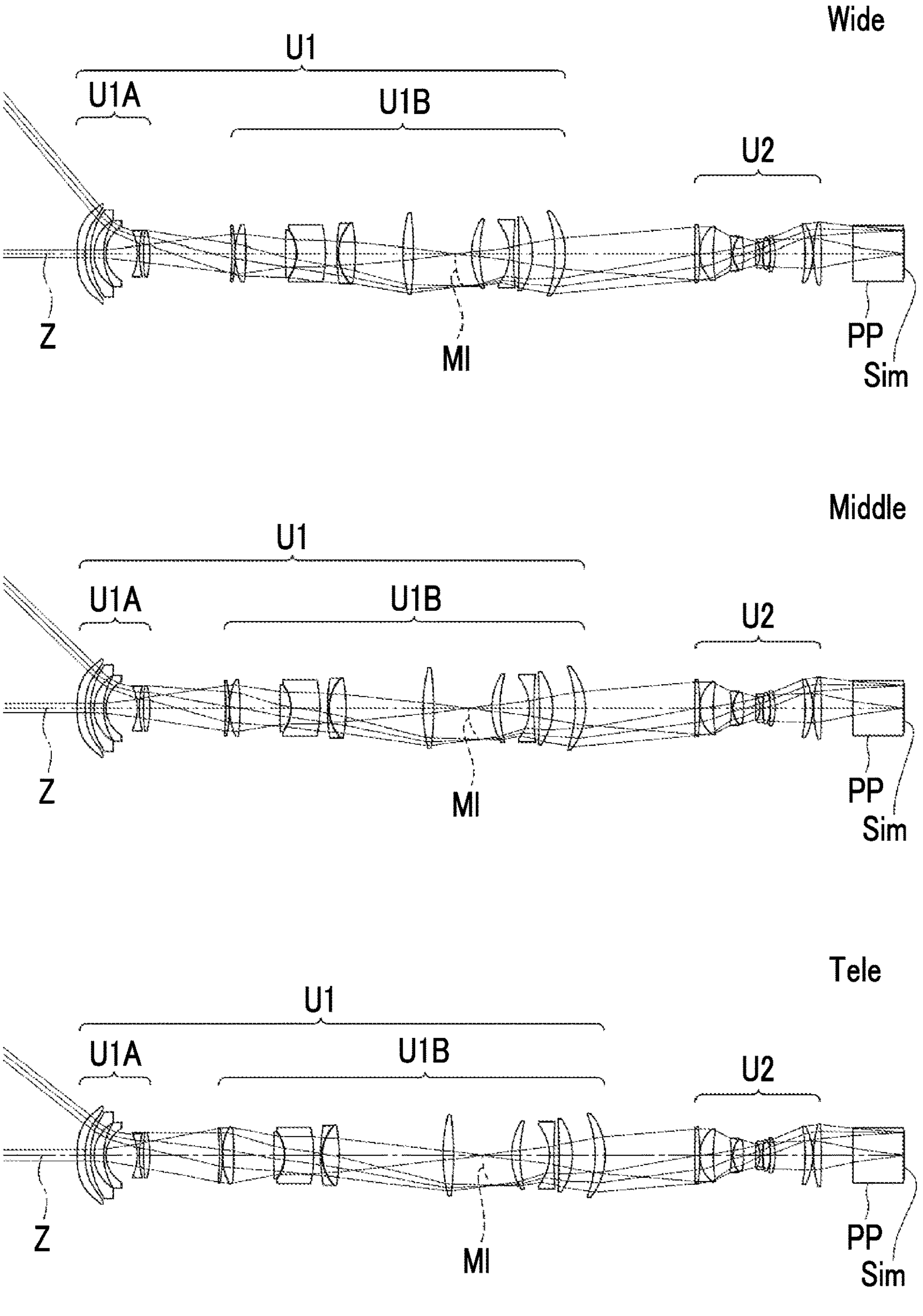
FIG. 20 is a cross-sectional view showing a configuration and luminous flux of the zoom lens of Example 5 in each zoom state.

FIGS. 19 and 20 show cross-sectional views of the configuration and luminous flux of the zoom lens of Example 5. The zoom lens of Example 5 consists of a first optical system U1 and a second optical system U2 in order from the magnification side to the reduction side. The first optical system U1 consists of a first A optical system U1A and a first B optical system U1B in order from the magnification side to the reduction side. The first A optical system U1A consists of a first lens group G1. The first B optical system U1B consists of a second lens group G2, a third lens group G3, and a fourth lens group G4 in order from the magnification side to the reduction side.

The first lens group G1 consists of lenses L1 to L5 in order from the magnification side to the reduction side. The second lens group G2 consists of lenses L6 to L9 in order from the magnification side to the reduction side. The third lens group G3 consists of lenses L10 to L11 in order from the magnification side to the reduction side. The fourth lens group G4 consists of lenses L12 to L16 in order from the magnification side to the reduction side. The second optical system U2 consists of lenses L21 to L24, an aperture stop St, and lenses L25 to L29 in order from the magnification side to the reduction side.

During zooming, the first lens group G1 remains stationary with respect to the magnification side image formation plane, and each of the second lens group G2, the third lens group G3, and the fourth lens group G4 moves along the optical axis Z by changing the spacing between the adjacent groups. The intermediate image MI is formed in the fourth lens group G4. The focusing group Gf consists of a lens L4 and a lens L5.

Figure 22:
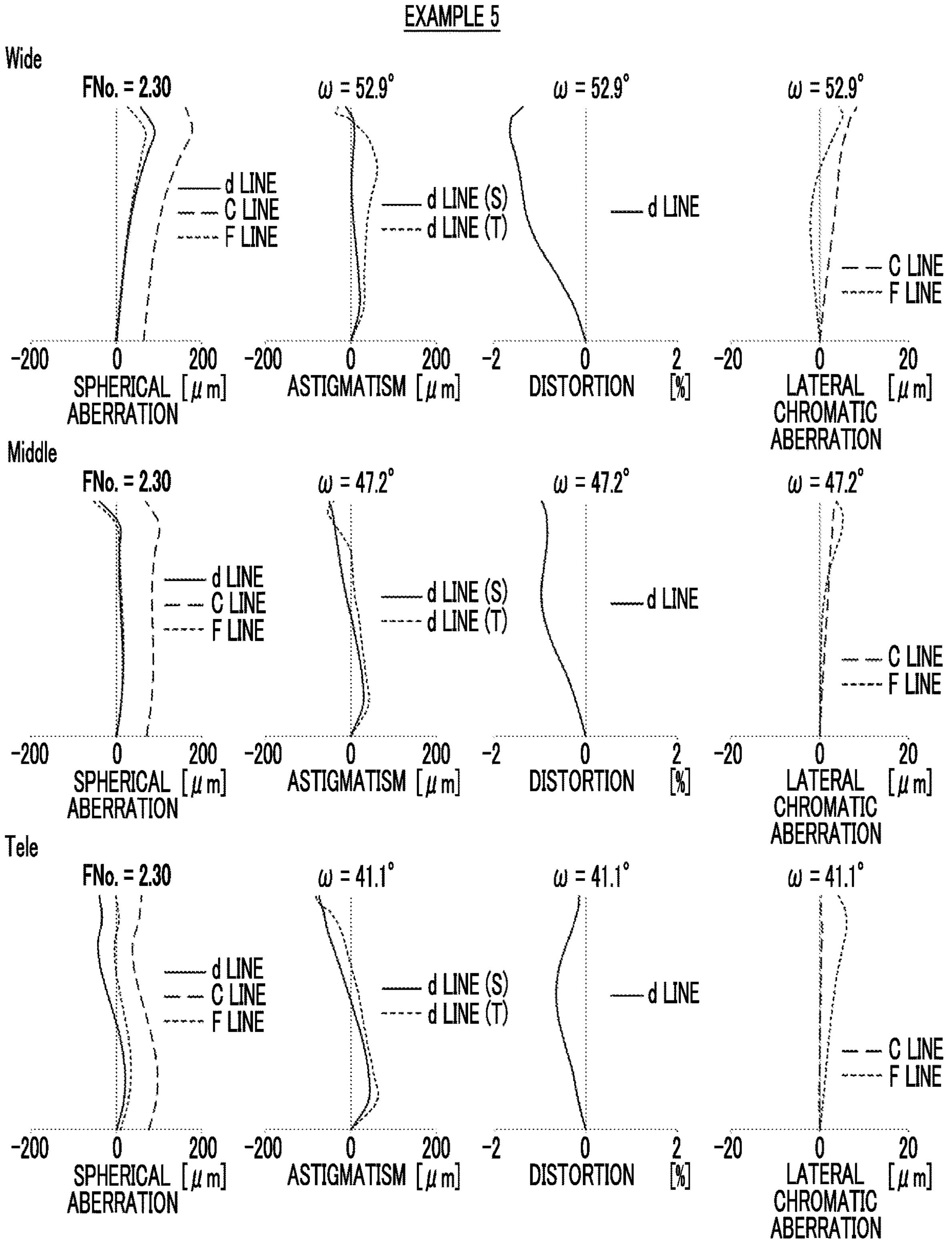
FIG. 22 is a diagram of aberrations in the zoom lens of Example 5.

Regarding the zoom lens of Example 5, Table 13A and 13B show basic lens data, Table 14 shows specifications and variable surface spacings, and Table 15 shows aspherical coefficients thereof. FIG. 22 shows aberration diagrams. The basic lens data and the aberration diagrams are in a state where the projection distance is 1.4 m (meters).

TABLE 13A

| Example 5 | | | | |
|---|---|---|---|---|
| Sn | R | D | Nd | νd |
| *1 | 70.4948 | 4.1642 | 1.53097 | 55.66 |
| *2 | 50.5888 | 2.8463 | | |
| 3 | 42.0842 | 1.7999 | 1.87070 | 40.73 |
| 4 | 21.5552 | 4.9938 | | |
| 5 | 34.6371 | 1.2004 | 1.87070 | 40.73 |
| 6 | 17.5044 | 16.2314 | | |
| 7 | −30.5384 | 1.0008 | 1.59282 | 68.62 |
| 8 | 53.3424 | 2.1980 | | |

TABLE 13A-continued

| Example 5 | | | | |
|---|---|---|---|---|
| Sn | R | D | Nd | vd |
| 9 | 116.9673 | 3.3259 | 1.84666 | 23.78 |
| 10 | −59.3094 | DD[10] | | |
| 11 | −191.1097 | 1.6629 | 1.84666 | 23.78 |
| 12 | −91.1717 | 0.0291 | | |
| 13 | 39.1846 | 5.5669 | 1.59282 | 68.62 |
| 14 | −145.8277 | 20.6213 | | |
| 15 | 477.6369 | 5.6748 | 1.49700 | 81.61 |
| 16 | −22.7243 | 14.9998 | 1.85451 | 25.15 |
| 17 | −79.7801 | DD[17] | | |
| 18 | 105.5520 | 0.7991 | 1.83400 | 37.34 |
| 19 | 25.1954 | 8.8156 | 1.49700 | 81.61 |
| 20 | −90.8972 | DD[20] | | |
| 21 | 94.3927 | 5.4882 | 1.87070 | 40.73 |
| 22 | −191.6375 | 29.3944 | | |
| 23 | 37.5506 | 4.2548 | 1.87070 | 40.73 |
| 24 | 72.0094 | 15.3269 | | |
| 25 | −27.4692 | 2.1359 | 1.84666 | 23.78 |
| 26 | 205.0961 | 2.8826 | | |
| 27 | −365.9311 | 6.9316 | 1.59282 | 68.62 |
| 28 | −37.5142 | 11.6544 | | |
| 29 | −66.7746 | 5.3185 | 1.84666 | 23.78 |
| 30 | −38.7411 | DD[30] | | |

TABLE 13B

| Example 5 | | | | |
|---|---|---|---|---|
| Sn | R | D | Nd | vd |
| 31 | 1166.3588 | 2.2601 | 1.84666 | 23.78 |
| 32 | −163.5708 | 0.0300 | | |
| 33 | 19.7588 | 6.9535 | 1.65412 | 39.68 |
| 34 | 95.4622 | 9.4562 | | |
| 35 | −64.9594 | 0.7992 | 1.84666 | 23.78 |
| 36 | 14.1160 | 0.0291 | | |
| 37 | 13.7962 | 5.3865 | 1.59282 | 68.62 |
| 38 | −50.6166 | 6.2330 | | |
| 39(St) | ∞ | 2.3822 | | |
| 40 | −12.0049 | 1.4081 | 1.84666 | 23.78 |
| 41 | 36.9433 | 0.0292 | | |
| 42 | 36.5337 | 3.8166 | 1.49700 | 81.61 |
| 43 | −24.5194 | 0.0291 | | |
| 44 | −82.9446 | 2.4818 | 1.72916 | 54.68 |
| 45 | −31.6297 | 15.5746 | | |
| 46 | −88.6915 | 4.0445 | 1.84666 | 23.78 |
| 47 | −34.5522 | 0.3278 | | |
| 48 | 68.0399 | 3.9769 | 1.92286 | 20.88 |
| 49 | −440.6159 | 16.4677 | | |
| 50 | ∞ | 26.0000 | 1.51633 | 64.14 |
| 51 | ∞ | 0.4800 | | |

TABLE 14

| Example 5 | | | |
|---|---|---|---|
| | Wide | Middle | Tele |
| Zr | 1.0 | 1.2 | 1.5 |
| \|f\| | 10.05 | 12.27 | 15.05 |
| FNo. | 2.30 | 2.30 | 2.30 |
| 2ω[°] | 105.8 | 94.4 | 82.2 |
| DD[10] | 42.15 | 39.24 | 35.97 |
| DD[17] | 5.93 | 3.90 | 3.70 |
| DD[20] | 24.58 | 39.94 | 53.72 |
| DD[30] | 67.13 | 56.70 | 46.39 |

TABLE 15

| Example 5 | | |
|---|---|---|
| Sn | 1 | 2 |
| KA | 6.6448422E−01 | 5.5322583E−01 |
| A3 | 5.1898953E−04 | 7.4319927E−04 |
| A4 | −6.0620986E−05 | −1.2245956E−04 |
| A5 | 2.1757522E−06 | 9.1141167E−06 |
| A6 | 3.1420381E−07 | −1.1864074E−07 |
| A7 | −3.0689752E−08 | −1.2630699E−08 |
| A8 | 6.9119556E−10 | 6.5498256E−11 |
| A9 | 4.2789408E−11 | 6.1546630E−11 |
| A10 | −2.7732951E−12 | −2.8067082E−12 |
| A11 | 1.0722520E−14 | −4.3553800E−14 |
| A12 | 3.2694236E−15 | 5.7166051E−15 |
| A13 | −7.2826649E−17 | −6.0678806E−17 |
| A14 | −1.5337520E−18 | −4.6497945E−18 |
| A15 | 6.7840732E−20 | 1.1210171E−19 |
| A16 | 2.2006153E−23 | 1.4216082E−21 |
| A17 | −2.6787329E−23 | −6.5483322E−23 |
| A18 | 2.0368794E−25 | 2.1202982E−25 |
| A19 | 3.9129161E−27 | 1.4899563E−26 |
| A20 | −6.5929628E−29 | −2.4223238E−28 |

Figure 21:
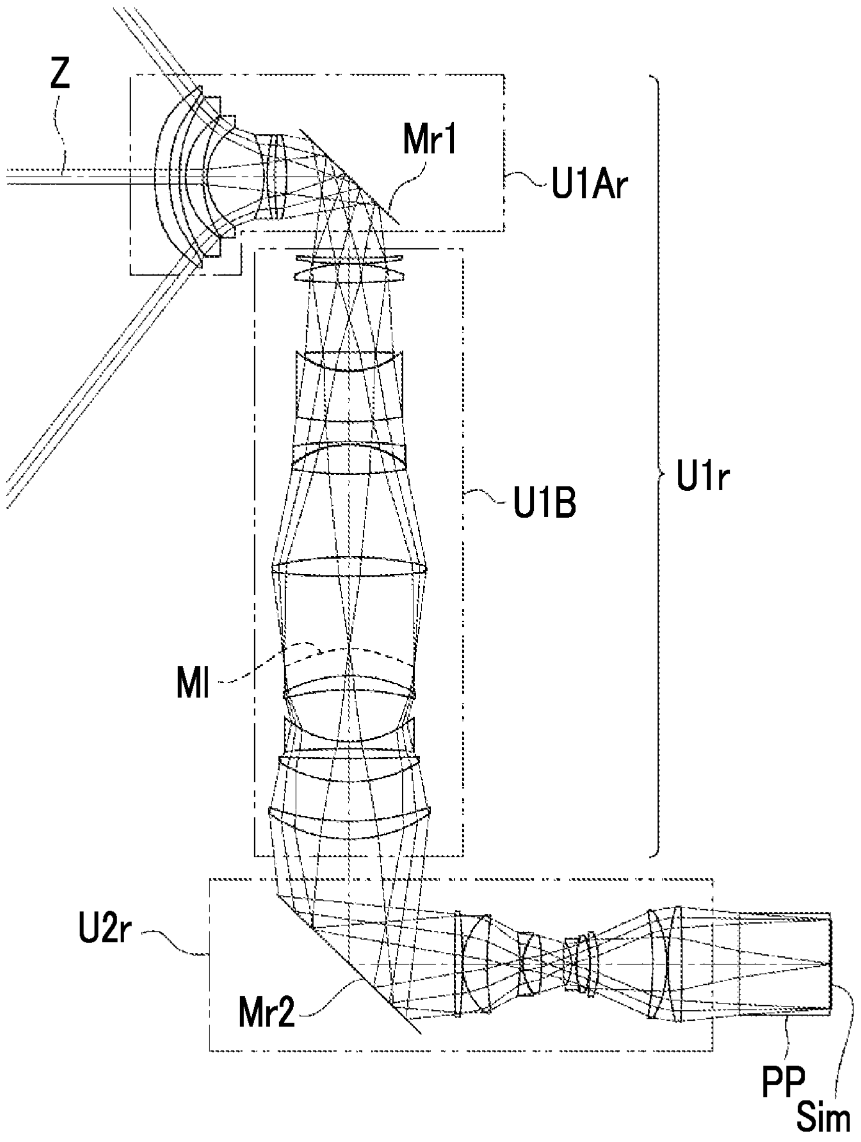
FIG. 21 is a cross-sectional view showing a configuration and luminous flux of a modification example of the zoom lens of Example 5.

FIG. 21 shows a configuration and luminous flux at the wide angle end of the zoom lens according to the modification example of Example 5. The zoom lens of FIG. 21 has two optical path deflecting members, and thus the optical path is deflected twice. The zoom lens of FIG. 21 consists of a first optical system U1*r* and a second optical system U2*r* in order from the magnification side to the reduction side along the optical path. The first optical system U1*r* consists of a first A optical system U1Ar and a first B optical system U1B in order from the magnification side to the reduction side along the optical path. The first A optical system U1Ar of FIG. 21 is different from the first A optical system U1A of Example 5 in that the mirror Mr1 is disposed closest to the reduction side in the first A optical system U1Ar and the optical path is deflected by the mirror Mr1. The second optical system U2*r* of FIG. 21 is different from the second optical system U2 of Example 5 in that the mirror Mr2 is disposed closest to the magnification side of the second optical system U2*r* and the optical path is deflected by the mirror Mr2. Other configurations of the zoom lens of FIG. 21 are the same as those of the zoom lens of Example 5.

Example 6

Figure 23:
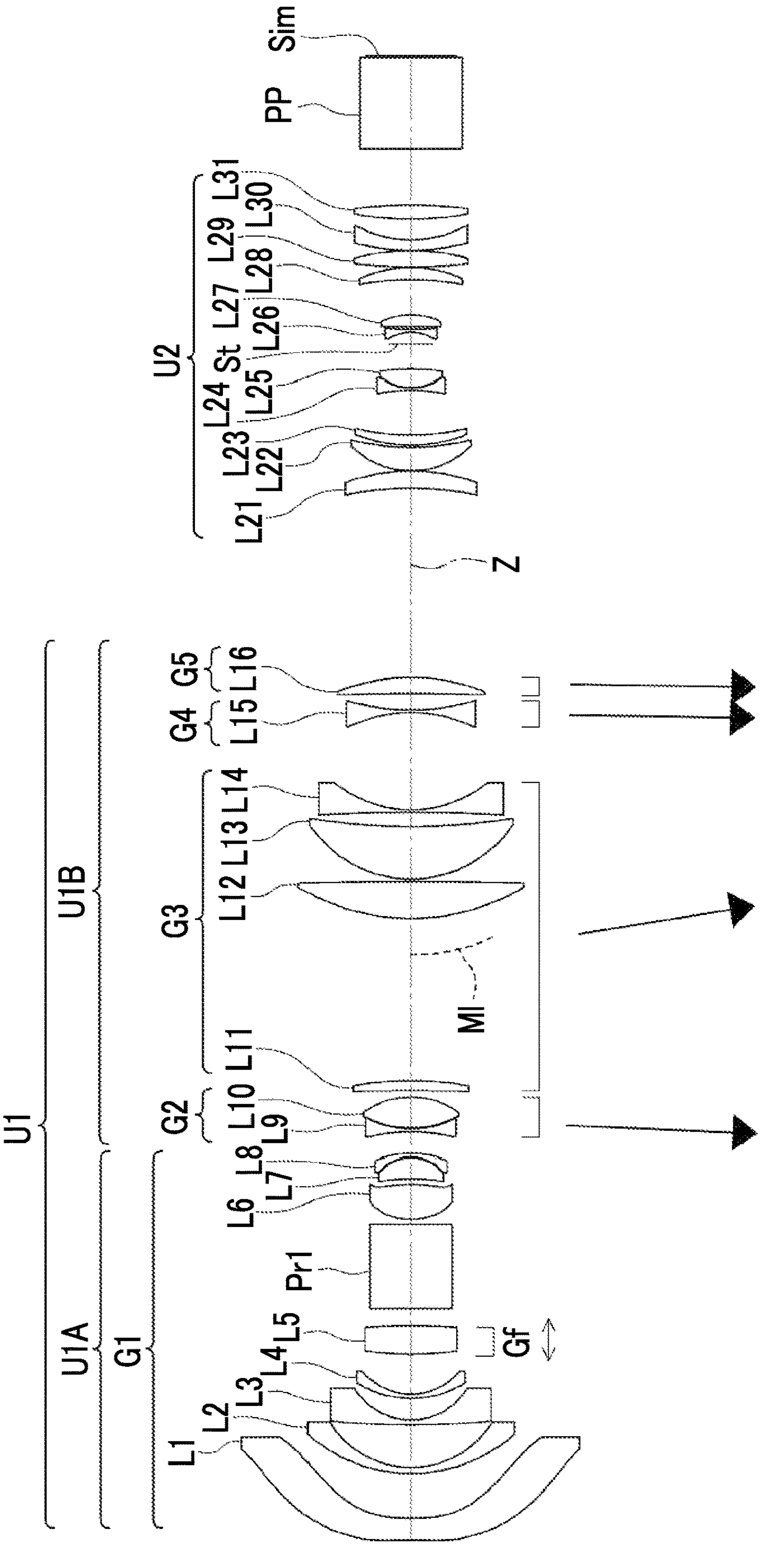
FIG. 23 is a cross-sectional view showing a configuration and rough movement directions of a zoom lens of Example 6.
Figure 24:
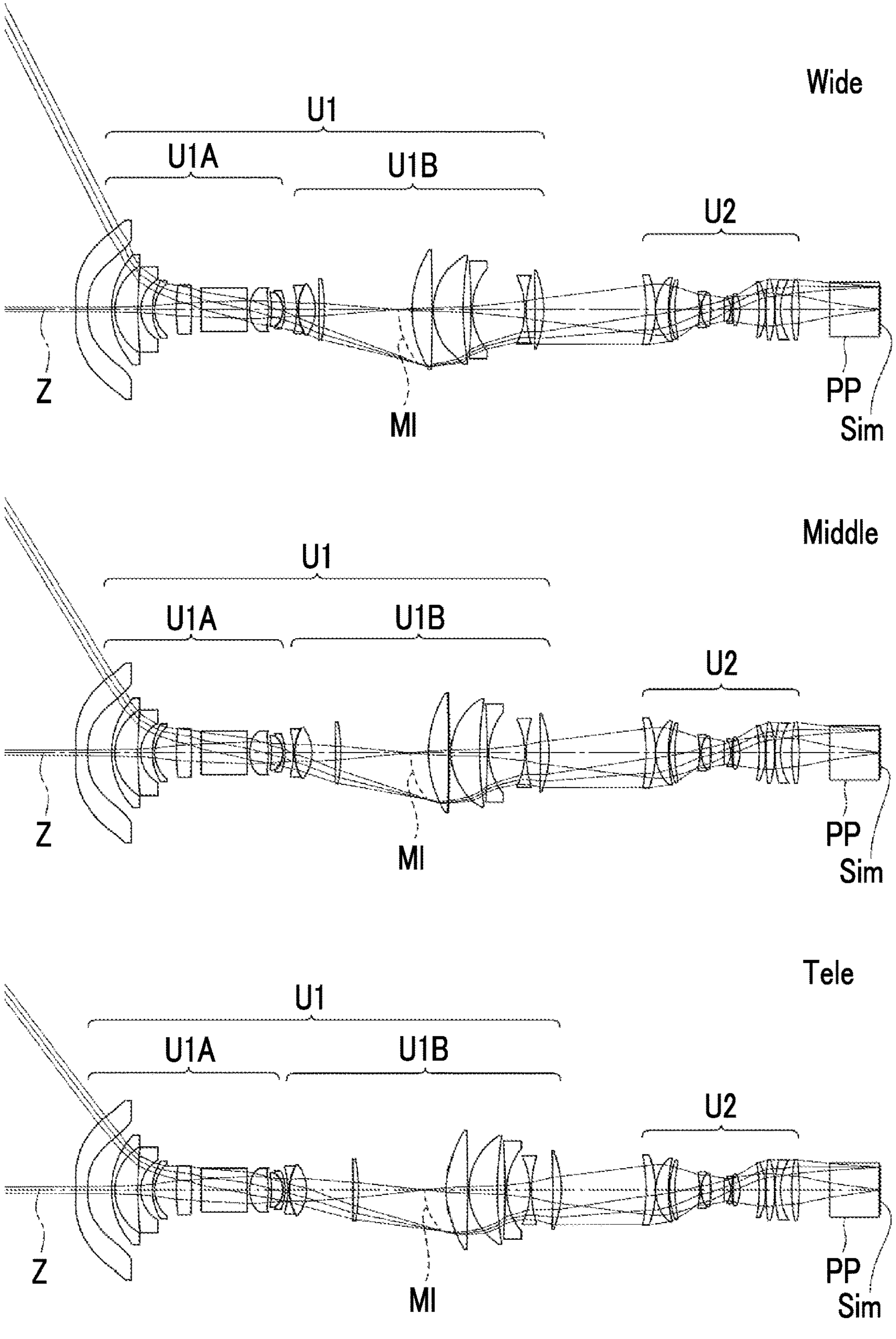
FIG. 24 is a cross-sectional view showing a configuration and luminous flux of the zoom lens of Example 6 in each zoom state.

FIGS. 23 and 24 show cross-sectional views of the configuration and luminous flux of the zoom lens of Example 6. The zoom lens of Example 6 consists of a first optical system U1 and a second optical system U2 in order from the magnification side to the reduction side. The first optical system U1 consists of a first A optical system U1A and a first B optical system U1B in order from the magnification side to the reduction side. The first A optical system U1A consists of a first lens group G1. The first B optical system U1B consists of, in order from the magnification side to the reduction side, a second lens group G2, a third lens group G3, a fourth lens group G4, and a fifth lens group G5.

The first lens group G1 consists of lenses L1 to L5, a prism Pr1, and lenses L6 to L8 in order from the magnification side to the reduction side. The second lens group G2 consists of lenses L9 to L10 in order from the magnification side to the reduction side. The third lens group G3 consists of lenses L11 to L14 in order from the magnification side to the reduction side. The fourth lens group G4 consists of a lens L15. The fifth lens group G5 consists of a lens L16. The second optical system U2 consists of lenses L21 to L25, an aperture stop St, and lenses L26 to L31 in order from the magnification side to the reduction side.

During zooming, the first lens group G1 remains stationary with respect to the magnification side image formation plane, and each of the second lens group G2, the third lens group G3, the fourth lens group G4, and the fifth lens groups G5 moves along the optical axis Z by changing the spacing between the adjacent groups. The intermediate image MI is formed in the third lens group G3. The focusing group Gf consists of a lens L5.

Figure 26:
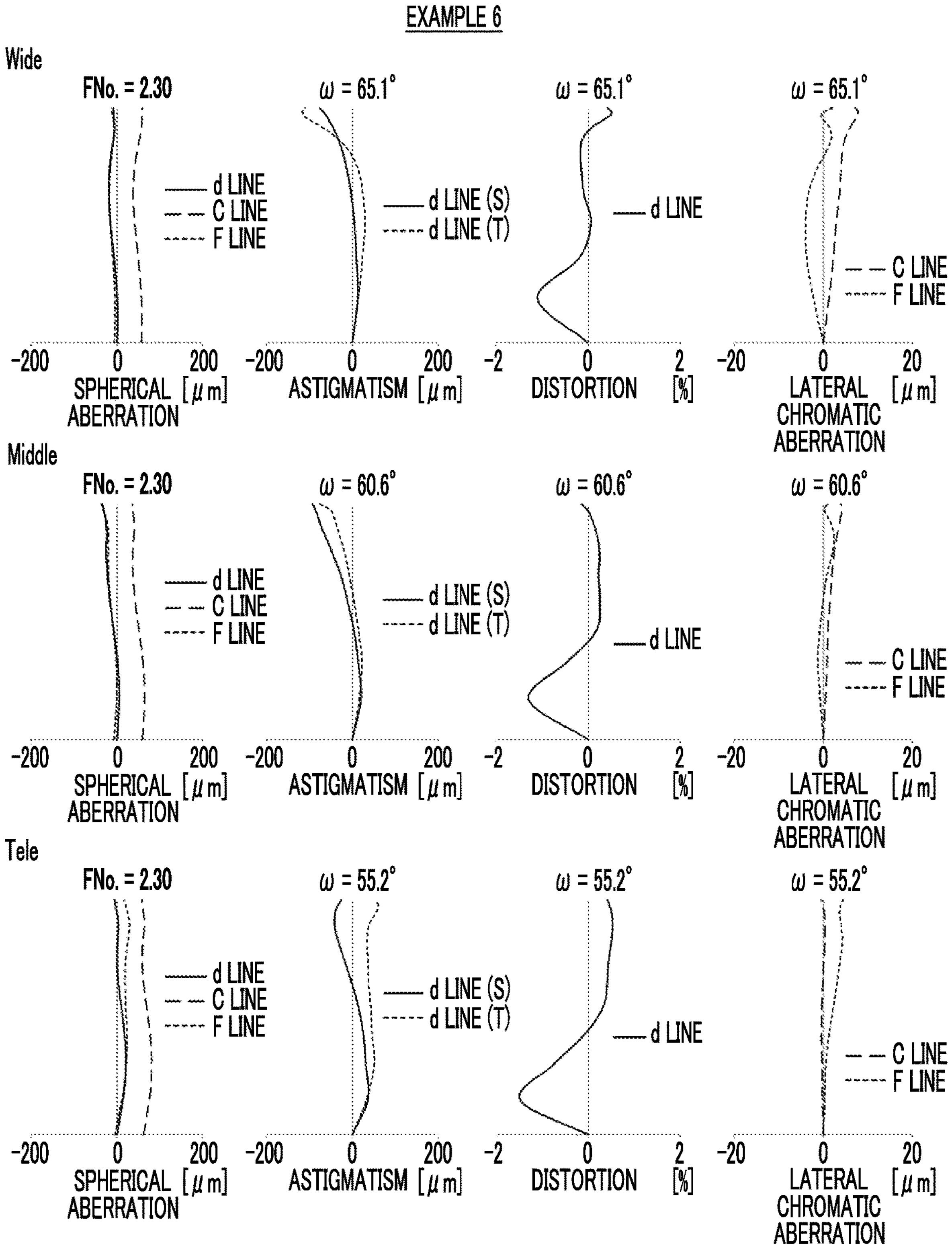
FIG. 26 is a diagram of aberrations in the zoom lens of Example 6.

Regarding the zoom lens of Example 6, Table 16A and 16B show basic lens data, Table 17 shows specifications and variable surface spacings, and Table 18 shows aspherical coefficients thereof. FIG. 26 shows aberration diagrams. The basic lens data and the aberration diagrams are in a state where the projection distance is 0.9 m (meters).

TABLE 16A

| Example 6 | | | | |
|---|---|---|---|---|
| Sn | R | D | Nd | νd |
| *1 | −222.9171 | 6.2687 | 1.53097 | 55.66 |
| *2 | 93.0486 | 12.4927 | | |
| 3 | 45.7844 | 1.8010 | 1.65160 | 58.54 |
| 4 | 28.3875 | 12.1387 | | |
| 5 | 265.3956 | 1.4007 | 1.59282 | 68.62 |
| 6 | 19.6300 | 6.1574 | | |
| 7 | 30.7580 | 1.2003 | 1.59282 | 68.62 |
| 8 | 18.7680 | 11.4212 | | |
| 9 | 104.9391 | 7.9997 | 1.80518 | 25.46 |
| 10 | −235.0789 | 4.9417 | | |
| 11 | ∞ | 24.0000 | 1.80420 | 46.50 |
| 12 | ∞ | 1.3948 | | |
| *13 | 21.0901 | 9.9027 | 1.51680 | 64.20 |
| *14 | −40.7970 | 1.6316 | | |
| 15 | −53.0531 | 6.0111 | 1.55032 | 75.50 |
| 16 | −12.3206 | 1.1240 | 1.87070 | 40.73 |
| 17 | −27.2170 | DD[17] | | |
| 18 | −48.5478 | 0.8000 | 1.88100 | 40.14 |
| 19 | 28.7627 | 8.9896 | 1.49700 | 81.61 |
| 20 | −24.2490 | DD[20] | | |
| 21 | −836.2706 | 2.9144 | 1.84666 | 23.78 |
| 22 | −92.0455 | 46.0853 | | |
| 23 | 64.5277 | 10.5763 | 1.80420 | 46.50 |
| 24 | −1193.2429 | 0.6476 | | |
| 25 | 36.0047 | 14.9993 | 1.87070 | 40.73 |
| 26 | 185.1610 | 4.0336 | | |
| 27 | −464.2606 | 0.8000 | 1.84666 | 23.78 |
| 28 | 36.3755 | DD[28] | | |
| 29 | −43.4533 | 0.7991 | 1.61997 | 63.88 |
| 30 | 68.2543 | DD[30] | | |
| 31 | −581.5716 | 4.5669 | 1.84666 | 23.78 |
| 32 | −58.8134 | DD[32] | | |

TABLE 16B

| Example 6 | | | | |
|---|---|---|---|---|
| Sn | R | D | Nd | νd |
| 33 | −104.2148 | 4.9990 | 1.84666 | 23.78 |
| 34 | −56.9143 | 0.0297 | | |
| 35 | 25.1105 | 6.7278 | 1.59282 | 68.62 |
| 36 | 73.7492 | 0.6085 | | |
| 37 | 45.1604 | 2.9223 | 1.83400 | 37.34 |
| 38 | 73.5549 | 12.6046 | | |
| 39 | −56.2498 | 0.8008 | 1.80518 | 25.46 |
| 40 | 16.4770 | 0.0300 | | |
| 41 | 15.2814 | 5.1635 | 1.59282 | 68.62 |
| 42 | −69.8411 | 7.0670 | | |
| 43(St) | ∞ | 3.3715 | | |
| 44 | −12.3976 | 0.8010 | 1.84666 | 23.78 |
| 45 | 104.9014 | 0.6723 | | |
| 46 | 509.2702 | 3.4368 | 1.49700 | 81.61 |
| 47 | −20.9731 | 10.0746 | | |
| 48 | −81.1523 | 3.5059 | 1.87070 | 40.73 |
| 49 | −35.6719 | 0.0301 | | |
| 50 | 152.6311 | 4.6288 | 1.87070 | 40.73 |
| 51 | −62.3615 | 0.0299 | | |
| 52 | 64.9122 | 2.9752 | 1.68430 | 26.81 |
| 53 | 33.9846 | 5.9202 | | |
| 54 | 90.3364 | 4.0001 | 1.92286 | 20.88 |
| 55 | −141.4804 | 16.0582 | | |
| 56 | ∞ | 26.0000 | 1.51633 | 64.14 |
| 57 | ∞ | 0.5700 | | |

TABLE 17

| Example 6 | | | |
|---|---|---|---|
| | Wide | Middle | Tele |
| Zr | 1.0 | 1.2 | 1.5 |
| \|f\| | 6.01 | 7.33 | 9.01 |
| FNo. | 2.30 | 2.30 | 2.30 |
| 2ω[°] | 130.2 | 121.2 | 110.4 |
| DD[17] | 6.14 | 4.26 | 1.39 |
| DD[20] | 1.79 | 12.32 | 24.50 |
| DD[28] | 27.51 | 18.94 | 12.39 |
| DD[30] | 4.67 | 7.43 | 11.13 |
| DD[32] | 53.81 | 50.97 | 44.51 |

TABLE 18

| Example 6 | | | | |
|---|---|---|---|---|
| Sn | 1 | 2 | 13 | 14 |
| KA | 1.0000000E+00 | 1.0000000E+00 | 1.0000000E+00 | 1.0000000E+00 |
| A3 | −2.5485701E−04 | 3.3967959E−05 | 0.0000000E+00 | 0.0000000E+00 |
| A4 | 7.3092106E−05 | 4.6434114E−06 | 7.9509188E−06 | 2.6773931E−05 |
| A5 | −2.0189378E−06 | 6.8945150E−06 | 8.4259420E−06 | 8.4147119E−06 |
| A6 | −1.1846181E−07 | −5.3333768E−07 | −2.9586660E−06 | −4.0177810E−06 |
| A7 | 8.3910649E−09 | −3.1882790E−09 | 4.7698750E−07 | 7.8296274E−07 |
| A8 | 1.6969262E−13 | 1.8443917E−09 | 5.3380790E−09 | 8.2195887E−09 |
| A9 | −1.5548180E−11 | −3.9933300E−11 | −1.0254923E−08 | −2.2956489E−08 |
| A10 | 3.9439680E−13 | −3.6086960E−12 | 6.5461643E−10 | 1.7850337E−09 |
| A11 | 1.0373305E−14 | 1.5249515E−13 | 9.7580114E−11 | 2.9205218E−10 |
| A12 | −5.7046851E−16 | 3.1255550E−15 | −1.0020097E−11 | −3.7197607E−11 |
| A13 | 9.1104256E−19 | −2.2958422E−16 | −4.9884223E−13 | −1.9706132E−12 |
| A14 | 3.3465581E−19 | −4.9125895E−19 | 6.9140453E−14 | 3.5596762E−13 |

TABLE 18-continued

| Example 6 | | | | |
|---|---|---|---|---|
| Sn | 1 | 2 | 13 | 14 |
| A15 | −4.3853221E−21 | 1.7651725E−19 | 1.4357259E−15 | 7.1447828E−15 |
| A16 | −7.8442794E−23 | −1.0964290E−21 | −2.5194382E−16 | −1.8165010E−15 |
| A17 | 1.9687205E−24 | −6.8926293E−23 | −2.2080146E−18 | −1.2688662E−17 |
| A18 | −1.4284830E−28 | 7.5653383E−25 | 4.6830004E−19 | 4.7451122E−18 |
| A19 | −2.8239274E−28 | 1.0837788E−26 | 1.4252604E−21 | 7.9520875E−21 |
| A20 | 1.9245200E−30 | −1.5212047E−28 | −3.4974306E−22 | −4.9599824E−21 |

Figure 25:
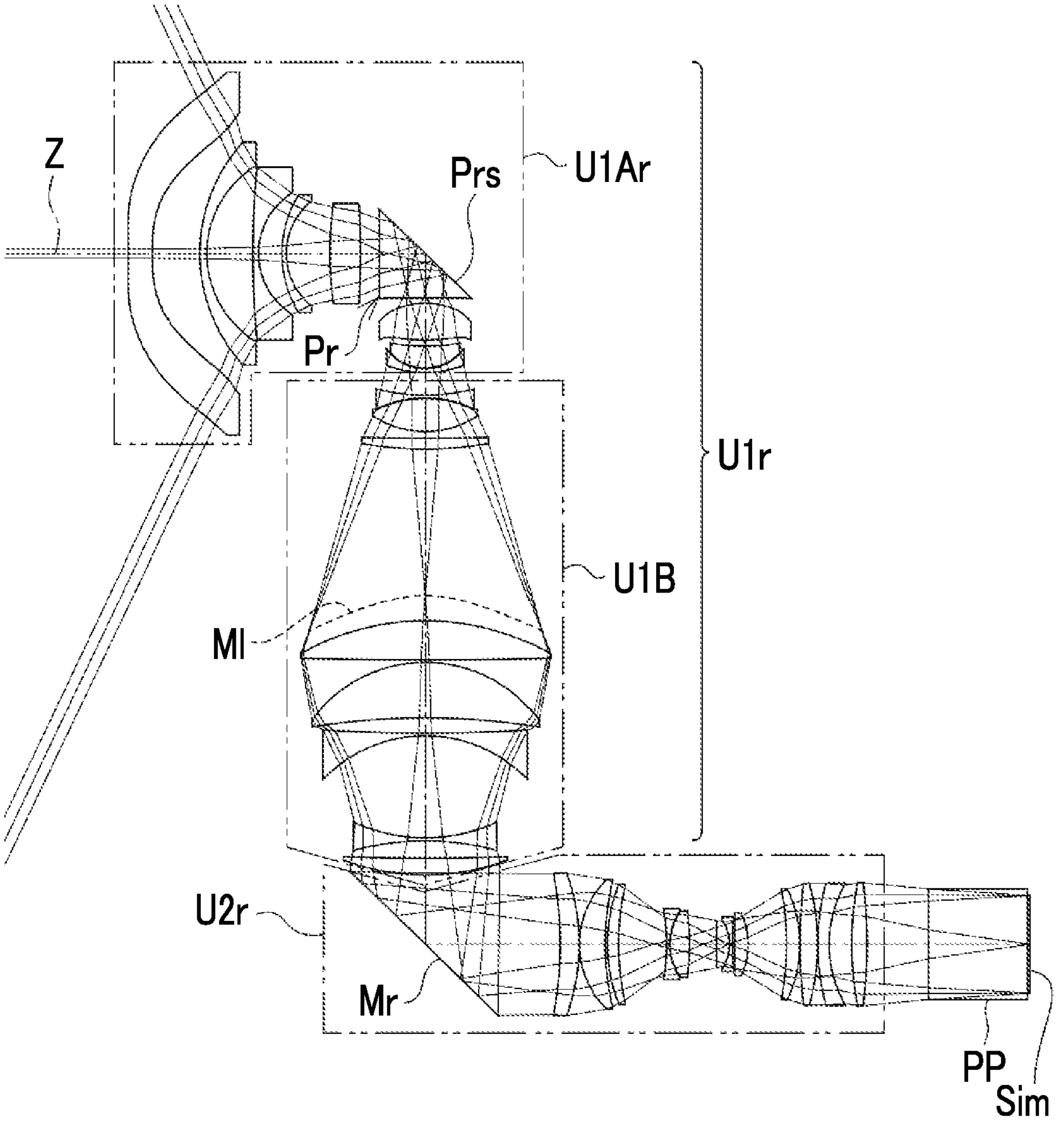
FIG. 25 is a cross-sectional view showing a configuration and luminous flux of a modification example of the zoom lens of Example 6.

FIG. 25 shows a configuration and luminous flux at the wide angle end of the zoom lens according to the modification example of Example 6. The zoom lens of FIG. 25 has two optical path deflecting members, and thus the optical path is deflected twice. The zoom lens of FIG. 25 consists of a first optical system U1*r* and a second optical system U2*r* in order from the magnification side to the reduction side along the optical path. The first optical system U1*r* consists of a first A optical system U1Ar and a first B optical system U1B in order from the magnification side to the reduction side along the optical path. The first A optical system U1Ar of FIG. 25 is different from the first A optical system U1A of Example 6 in that the prism Pr1 of Example 6 is replaced with the prism Pr having the reflecting surface Prs and the optical path is deflected at the reflecting surface Prs. The second optical system U2*r* of FIG. 25 is different from the second optical system U2 of Example 6 in that the mirror Mr is disposed closest to the magnification side of the second optical system U2*r* and the optical path is deflected by the mirror Mr. Other configurations of the zoom lens of FIG. 25 are the same as those of the zoom lens of Example 6.

Example 7

Figure 27:
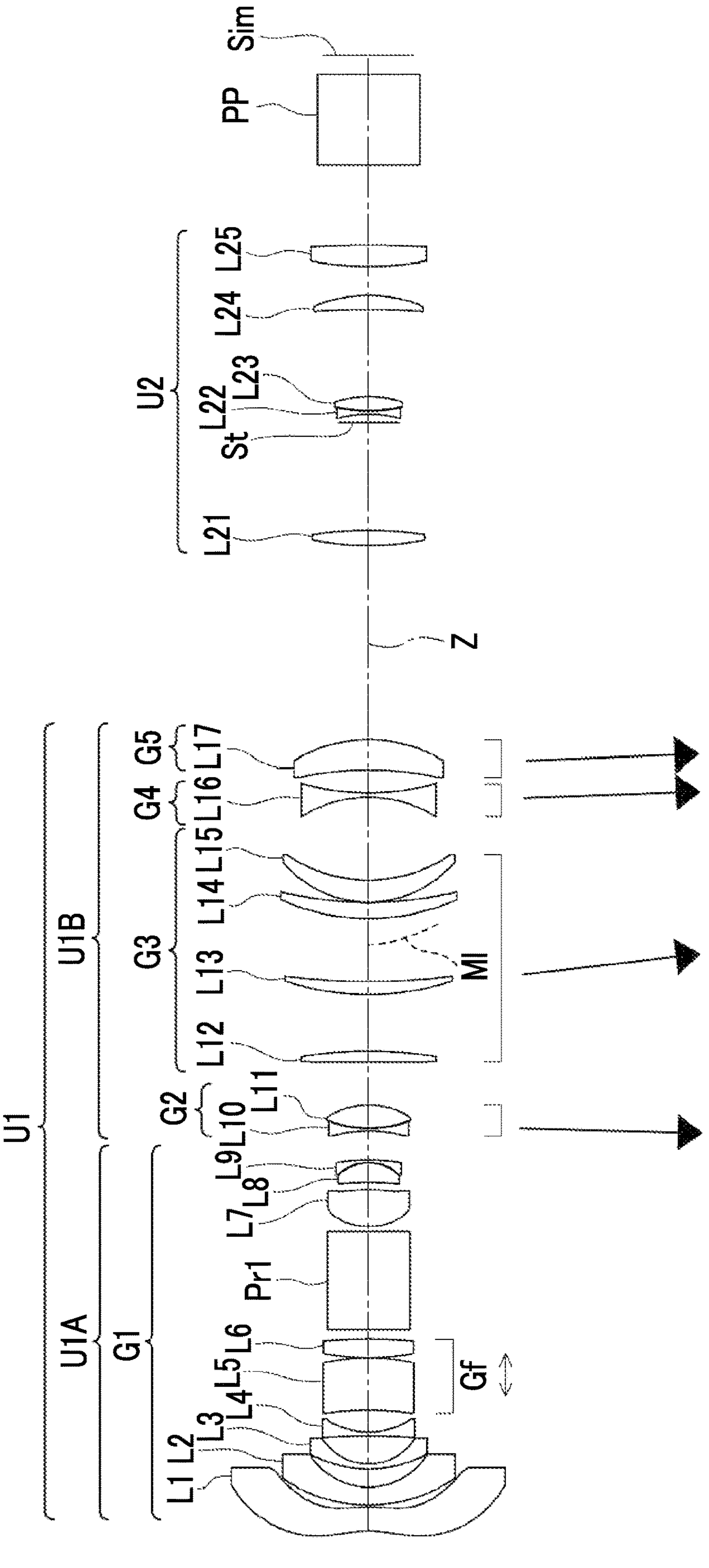
FIG. 27 is a cross-sectional view showing a configuration and rough movement directions of a zoom lens of Example 7.
Figure 28:
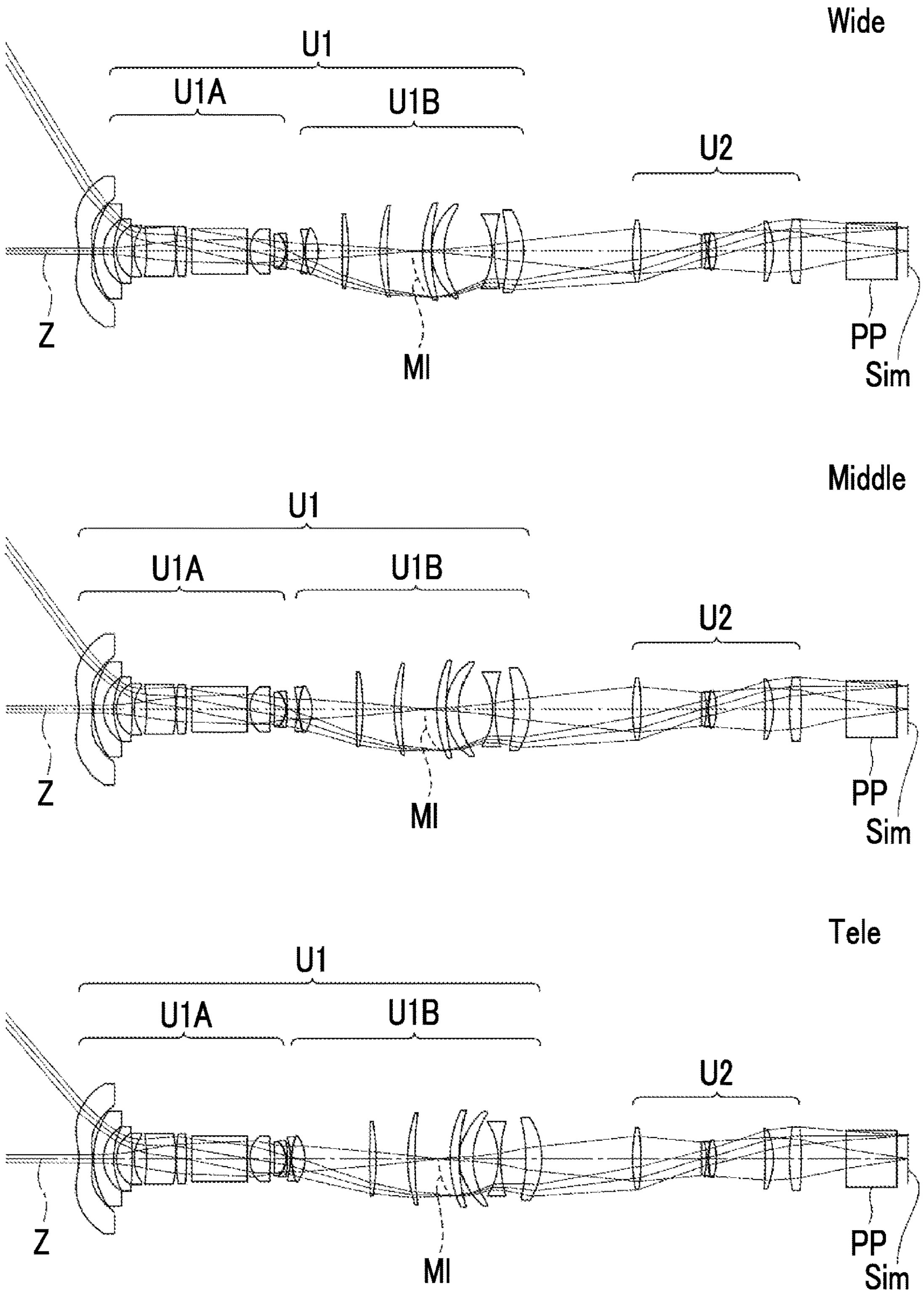
FIG. 28 is a cross-sectional view showing a configuration and luminous flux of the zoom lens of Example 7 in each zoom state.

FIGS. 27 and 28 show cross-sectional views of the configuration and luminous flux of the zoom lens of Example 7. The zoom lens of Example 7 consists of a first optical system U1 and a second optical system U2 in order from the magnification side to the reduction side. The first optical system U1 consists of a first A optical system U1A and a first B optical system U1B in order from the magnification side to the reduction side. The first A optical system U1A consists of a first lens group G1. The first B optical system U1B consists of, in order from the magnification side to the reduction side, a second lens group G2, a third lens group G3, a fourth lens group G4, and a fifth lens group G5.

The first lens group G1 consists of lenses L1 to L6, a prism Pr1, and lenses L7 to L9 in order from the magnification side to the reduction side. The second lens group G2 consists of lenses L10 to L11 in order from the magnification side to the reduction side. The third lens group G3 consists of lenses L12 to L15 in order from the magnification side to the reduction side. The fourth lens group G4 consists of a lens L16. The fifth lens group G5 consists of a lens L17. The second optical system U2 consists of lens L21, an aperture stop St, and lenses L22 to L25 in order from the magnification side to the reduction side.

During zooming, the first lens group G1 remains stationary with respect to the magnification side image formation plane, and each of the second lens group G2, the third lens group G3, the fourth lens group G4, and the fifth lens groups G5 moves along the optical axis Z by changing the spacing between the adjacent groups. The intermediate image MI is formed in the third lens group G3. The focusing group Gf consists of a lens L5 and a lens L6.

Figure 30:
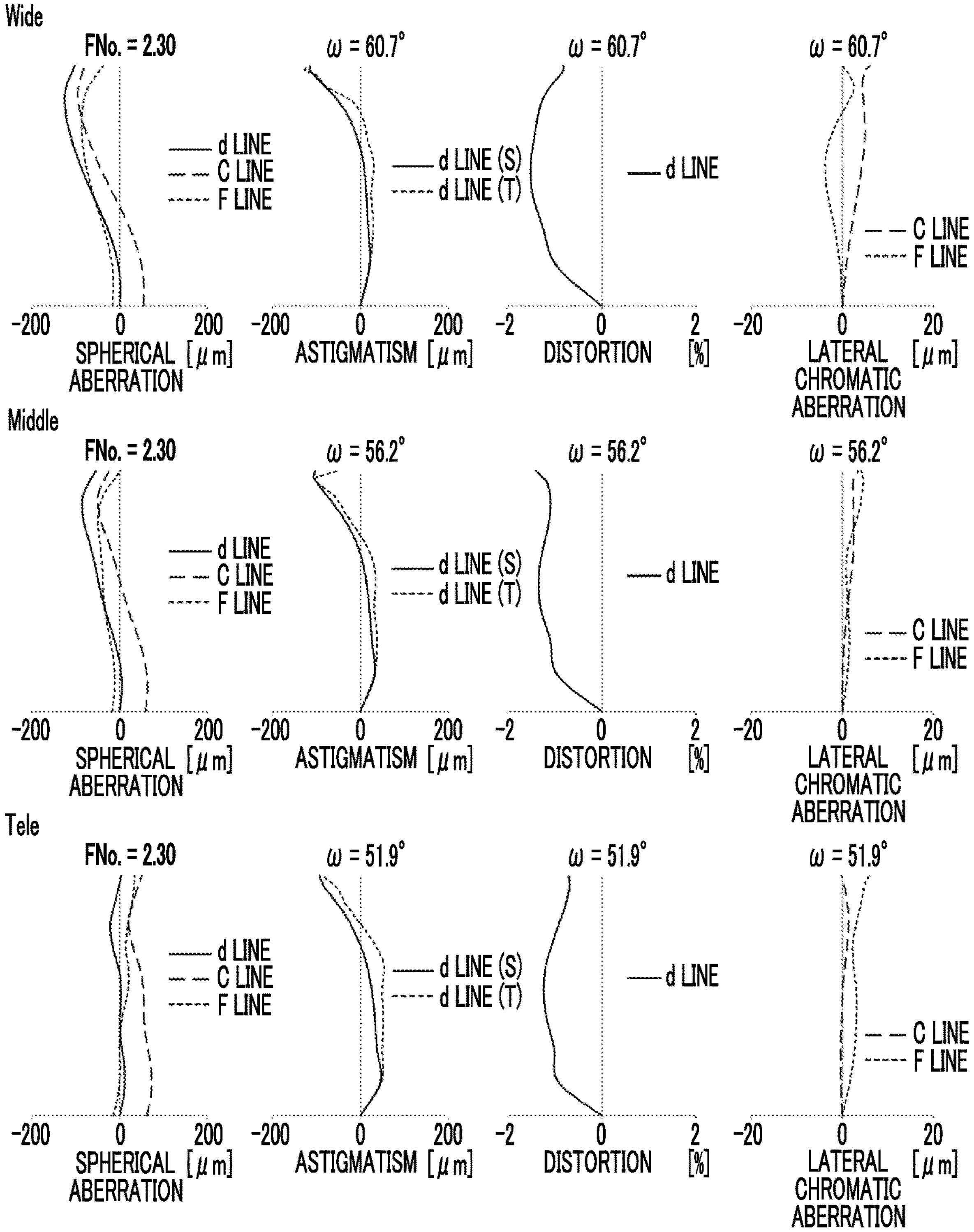
FIG. 30 is a diagram of aberrations in the zoom lens of Example 7.

Regarding the zoom lens of Example 7, Table 19A and 19B show basic lens data, Table 20 shows specifications and variable surface spacings, and Table 21 shows aspherical coefficients thereof. FIG. 30 shows aberration diagrams. The basic lens data and the aberration diagrams are in a state where the projection distance is 0.9 m (meters).

TABLE 19A

| Example 7 | | | | |
|---|---|---|---|---|
| Sn | R | D | Nd | νd |
| *1 | −27.8318 | 6.8320 | 1.53638 | 56.09 |
| *2 | −51.3220 | 0.6120 | | |
| 3 | 46.3094 | 4.9992 | 1.65160 | 58.54 |
| 4 | 20.6402 | 5.2075 | | |
| 5 | 37.0163 | 1.4000 | 1.64000 | 60.08 |
| 6 | 16.3555 | 7.9646 | | |
| 7 | −246.7795 | 1.1991 | 1.58913 | 61.13 |
| 8 | 22.6920 | 6.2771 | | |
| 9 | −88.5846 | 14.9992 | 1.87070 | 40.73 |
| 10 | −66.0953 | 0.0318 | | |
| 11 | 73.0002 | 5.3465 | 1.80420 | 46.50 |
| 12 | −172.6317 | 2.8269 | | |
| 13 | ∞ | 28.0000 | 1.51680 | 64.20 |
| 14 | ∞ | 1.3892 | | |
| *15 | 20.8425 | 10.5152 | 1.51680 | 64.20 |
| *16 | −46.8530 | 2.1033 | | |
| 17 | −113.2593 | 5.7142 | 1.55032 | 75.50 |
| 18 | −12.9571 | 0.8000 | 1.87070 | 40.73 |
| 19 | −60.5129 | DD[19] | | |
| 20 | −42.9635 | 0.7995 | 1.88100 | 40.14 |
| 21 | 34.0800 | 6.7236 | 1.49700 | 81.61 |
| 22 | −22.6867 | DD[22] | | |
| 23 | 1325.9555 | 3.1255 | 1.84666 | 23.78 |
| 24 | −125.5484 | 16.0732 | | |
| 25 | 78.7678 | 3.7180 | 1.87070 | 40.73 |
| 26 | 189.9552 | 18.0558 | | |
| 27 | 63.2795 | 4.6759 | 2.00100 | 29.13 |
| 28 | 111.4275 | 0.0291 | | |
| 29 | 33.1465 | 6.3489 | 2.00100 | 29.13 |
| 30 | 43.1010 | DD[30] | | |
| 31 | −37.7324 | 1.2492 | 1.61997 | 63.88 |
| 32 | 74.3136 | DD[32] | | |
| 33 | −93.1966 | 8.2222 | 1.94595 | 17.98 |
| 34 | −43.5550 | DD[34] | | |

TABLE 19B

| Example 7 | | | | |
|---|---|---|---|---|
| Sn | R | D | Nd | νd |
| 35 | 87.5108 | 4.3153 | 1.87070 | 40.73 |
| 36 | −123.4482 | 30.8670 | | |
| 37(St) | ∞ | 2.4139 | | |
| 38 | −34.7016 | 0.7992 | 1.94595 | 17.98 |
| 39 | 43.5911 | 0.3057 | | |
| 40 | 48.2802 | 3.9014 | 1.59282 | 68.62 |

TABLE 19B-continued

| Example 7 | | | | |
|---|---|---|---|---|
| Sn | R | D | Nd | vd |
| 41 | −33.1612 | 25.0149 | | |
| 42 | −213.2115 | 4.0372 | 1.65160 | 58.54 |
| 43 | −42.5533 | 8.1905 | | |
| 44 | 90.2341 | 6.0009 | 1.94595 | 17.98 |
| 45 | −320.8441 | 23.0305 | | |
| 46 | ∞ | 26.0000 | 1.51633 | 64.14 |
| 47 | ∞ | 5.5300 | | |

TABLE 20

| Example 7 | | | |
|---|---|---|---|
| | Wide | Middle | Tele |
| Zr | 1.0 | 1.2 | 1.4 |
| \|f\| | 7.41 | 8.90 | 10.36 |
| FNo. | 2.30 | 2.30 | 2.30 |
| 2ω[°] | 121.4 | 112.4 | 103.8 |
| DD[19] | 8.23 | 5.09 | 1.40 |
| DD[22] | 12.30 | 22.75 | 33.29 |
| DD[30] | 23.81 | 16.84 | 12.81 |
| DD[32] | 6.61 | 9.53 | 12.78 |
| DD[34] | 55.72 | 52.45 | 46.39 |

TABLE 21

| Example 7 | | | | |
|---|---|---|---|---|
| Sn | 1 | 2 | 15 | 16 |
| KA | −9.1072656E−01 | 2.1625429E−01 | 1.0000000E+00 | 1.0000000E+00 |
| A3 | −1.5868013E−04 | 1.8403288E−04 | 0.0000000E+00 | 0.0000000E+00 |
| A4 | 1.3440307E−04 | 1.3716326E−05 | 2.1329155E−05 | 3.6334505E−05 |
| A5 | −5.1913215E−06 | 1.7234822E−05 | 3.1656749E−06 | 6.8390572E−06 |
| A6 | −2.3404362E−07 | −1.9859622E−06 | −1.0944041E−06 | −3.4835255E−06 |
| A7 | 2.1569584E−08 | 2.1135075E−08 | 1.8395647E−07 | 7.4277744E−07 |
| A8 | −9.8647372E−12 | 9.8698160E−09 | 8.1584781E−10 | 2.2541820E−08 |
| A9 | −4.5796572E−11 | −4.8504315E−10 | −3.2327378E−09 | −2.6968863E−08 |
| A10 | 1.0618503E−12 | −2.2261404E−11 | 1.8359267E−10 | 1.5931482E−09 |
| A11 | 4.3555513E−14 | 2.1060069E−12 | 3.1491892E−11 | 4.1854028E−10 |
| A12 | −1.9137932E−15 | 8.1462586E−15 | −2.8280437E−12 | −3.9726602E−11 |
| A13 | −1.2489532E−17 | −4.3083639E−15 | −1.6245077E−13 | −3.3501603E−12 |
| A14 | 1.5033520E−18 | 5.2103376E−17 | 1.9098754E−14 | 3.9769281E−13 |
| A15 | −7.9120538E−21 | 4.7245776E−18 | 4.6133178E−16 | 1.4668307E−14 |
| A16 | −5.6593745E−22 | −9.9471513E−20 | −6.4706258E−17 | −1.9956698E−15 |
| A17 | 6.3530659E−24 | −2.6805097E−21 | −6.8771311E−19 | −3.3519197E−17 |
| A18 | 8.3981576E−26 | 7.3388966E−23 | 1.0759711E−19 | 4.9675609E−18 |
| A19 | −1.2300753E−27 | 6.1650888E−25 | 4.2196813E−22 | 3.1319265E−20 |
| A20 | −3.9843660E−31 | −2.0184508E−26 | −7.0067076E−23 | −4.8875931E−21 |

Figure 29:
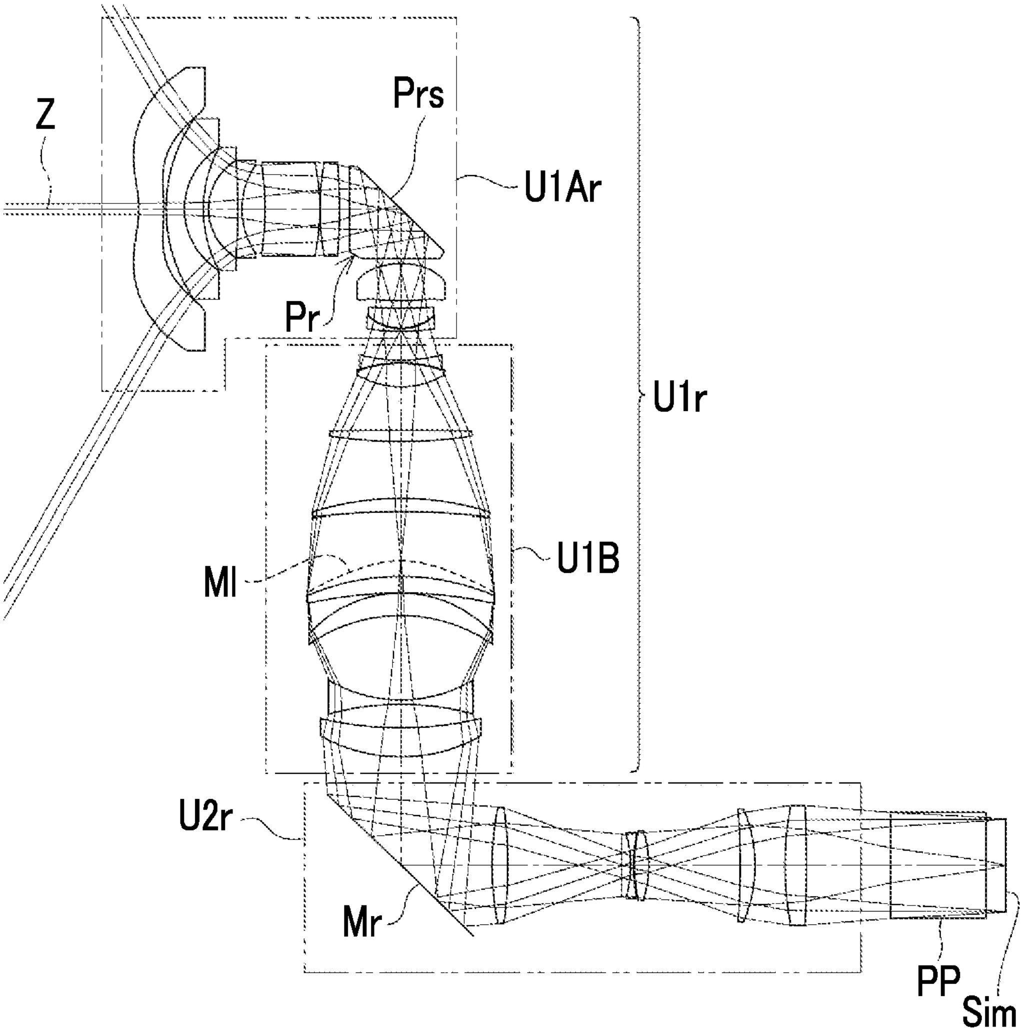
FIG. 29 is a cross-sectional view showing a configuration and luminous flux of a modification example of the zoom lens of Example 7.

FIG. 29 shows a configuration and luminous flux at the wide angle end of the zoom lens according to the modification example of Example 7. The zoom lens of FIG. 29 has two optical path deflecting members, and thus the optical path is deflected twice. The zoom lens of FIG. 29 consists of a first optical system U1*r* and a second optical system U2*r* in order from the magnification side to the reduction side along the optical path. The first optical system U1*r* consists of a first A optical system U1Ar and a first B optical system U1B in order from the magnification side to the reduction side along the optical path. The first A optical system U1Ar of FIG. 29 is different from the first A optical system U1A of Example 7 in that the prism Pr1 of Example 7 is replaced with the prism Pr having the reflecting surface Prs and the optical path is deflected at the reflecting surface Prs. The second optical system U2*r* of FIG. 29 is different from the second optical system U2 of Example 7 in that the mirror Mr is disposed closest to the magnification side of the second optical system U2*r* and the optical path is deflected by the mirror Mr. Other configurations of the zoom lens of FIG. 29 are the same as those of the zoom lens of Example 7.

Example 8

Figure 31:
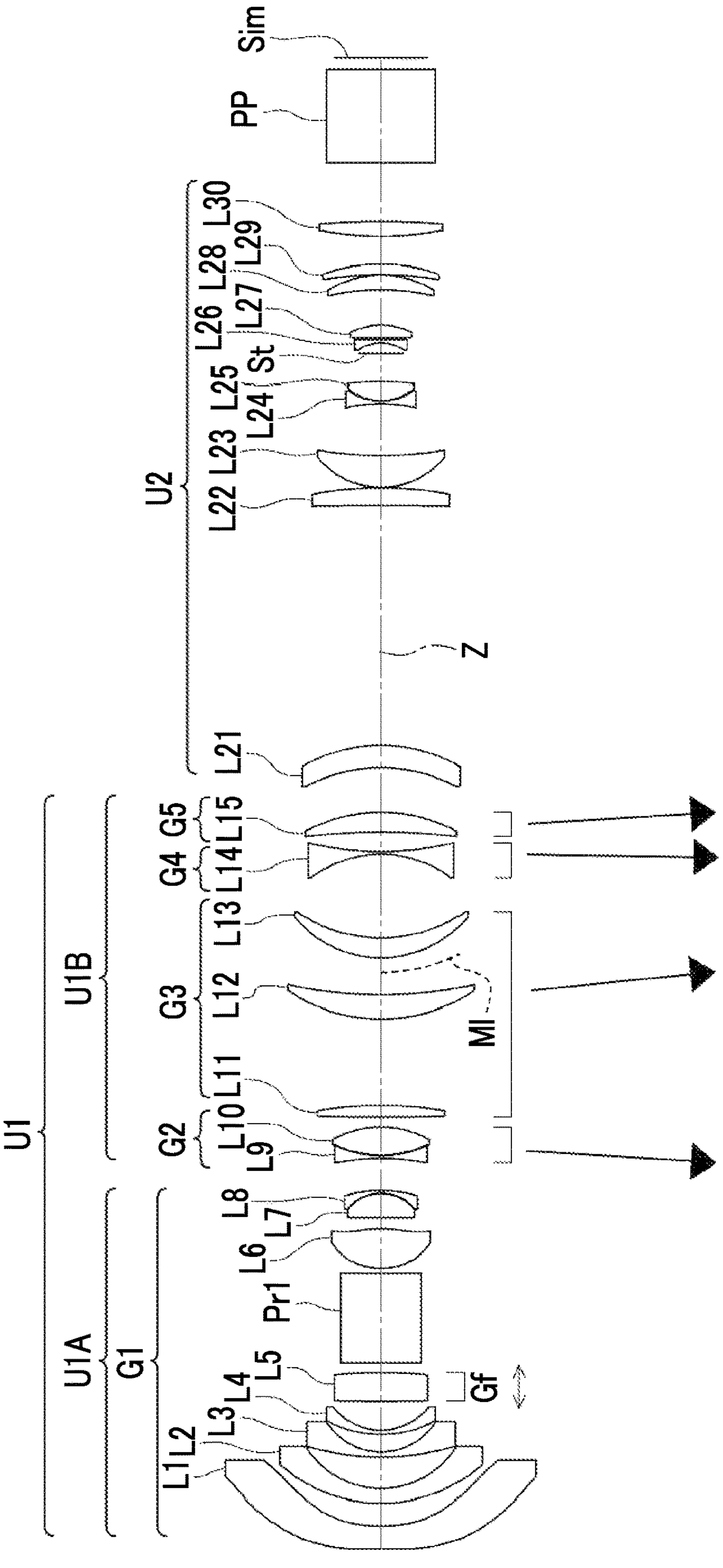
FIG. 31 is a cross-sectional view showing a configuration and rough movement directions of a zoom lens of Example 8.
Figure 32:
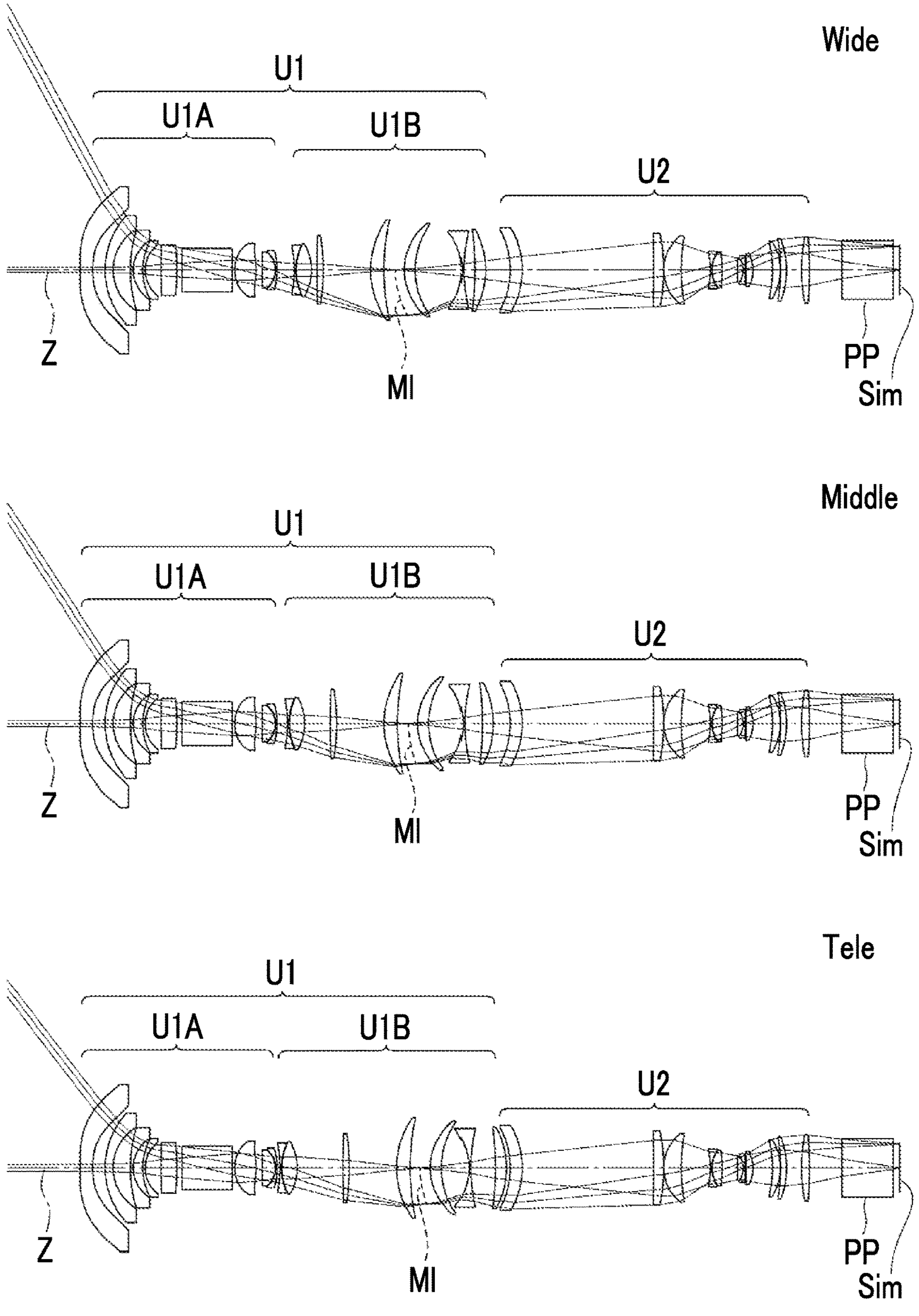
FIG. 32 is a cross-sectional view showing a configuration and luminous flux of the zoom lens of Example 8 in each zoom state.

FIGS. 31 and 32 show cross-sectional views of the configuration and luminous flux of the zoom lens of Example 8. The zoom lens of Example 8 consists of a first optical system U1 and a second optical system U2 in order from the magnification side to the reduction side. The first optical system U1 consists of a first A optical system U1A and a first B optical system U1B in order from the magnification side to the reduction side. The first A optical system U1A consists of a first lens group G1. The first B optical system U1B consists of, in order from the magnification side to the reduction side, a second lens group G2, a third lens group G3, a fourth lens group G4, and a fifth lens group G5.

The first lens group G1 consists of lenses L1 to L5, a prism Pr1, and lenses L6 to L8 in order from the magnification side to the reduction side. The second lens group G2 consists of lenses L9 to L10 in order from the magnification side to the reduction side. The third lens group G3 consists of lenses L11 to L13 in order from the magnification side to the reduction side. The fourth lens group G4 consists of a lens L14. The fifth lens group G5 consists of a lens L15. The second optical system U2 consists of lenses L21 to L25, an aperture stop St, and lenses L26 to L30 in order from the magnification side to the reduction side.

During zooming, the first lens group G1 remains stationary with respect to the magnification side image formation plane, and each of the second lens group G2, the third lens group G3, the fourth lens group G4, and the fifth lens groups G5 moves along the optical axis Z by changing the spacing between the adjacent groups. The intermediate image MI is formed in the third lens group G3. The focusing group Gf consists of a lens L5.

Figure 34:
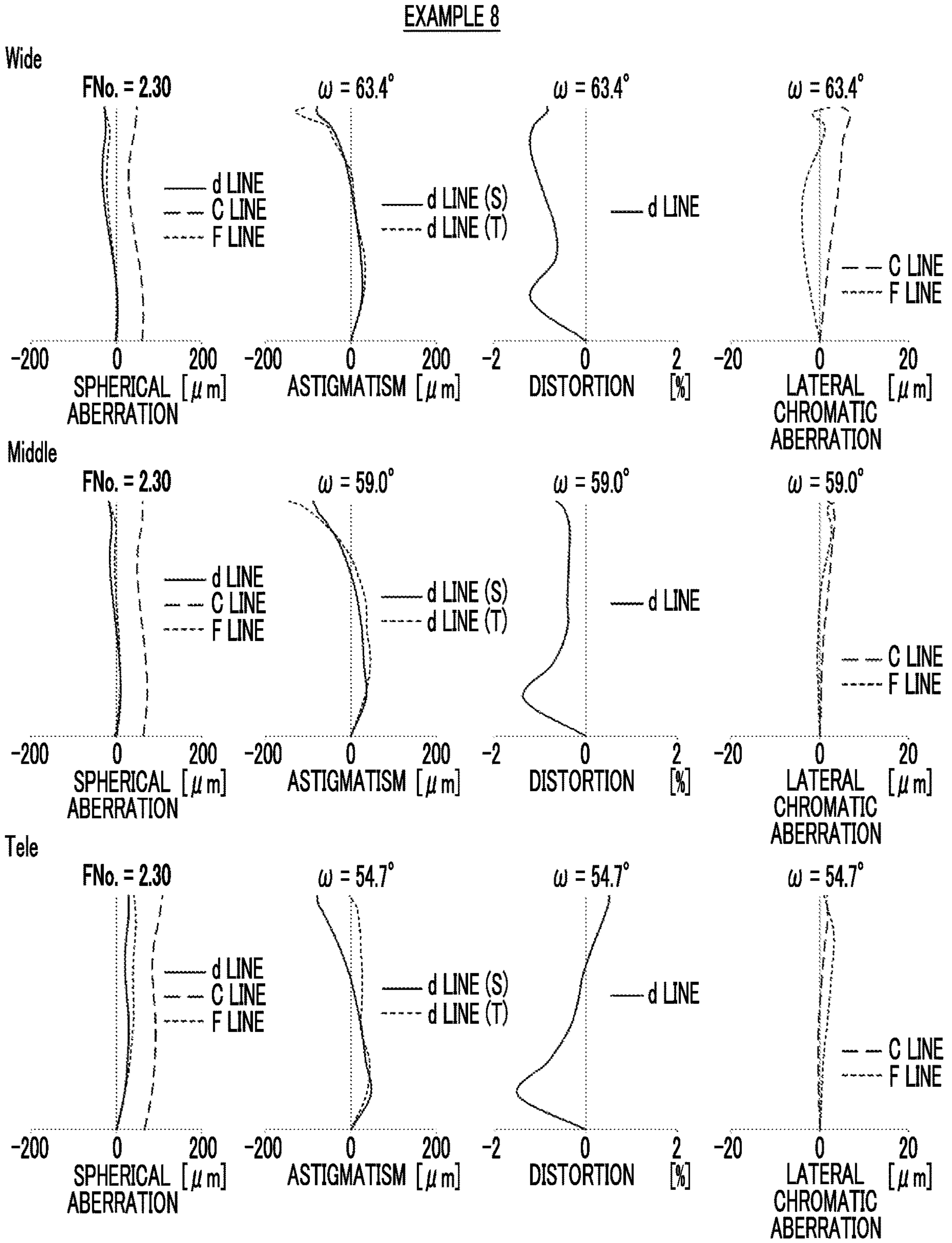
FIG. 34 is a diagram of aberrations in the zoom lens of Example 8.

Regarding the zoom lens of Example 8, Table 22A and 22B show basic lens data, Table 23 shows specifications and variable surface spacings, and Table 24 shows aspherical coefficients thereof. FIG. 34 shows aberration diagrams. The basic lens data and the aberration diagrams are in a state where the projection distance is 0.9 m (meters).

TABLE 22A

| Example 8 | | | | |
|---|---|---|---|---|
| Sn | R | D | Nd | vd |
| *1 | −304.5857 | 6.3254 | 1.53638 | 56.09 |
| *2 | 69.6215 | 6.2800 | | |
| 3 | 44.1739 | 4.0653 | 1.65160 | 58.54 |
| 4 | 25.5954 | 8.7005 | | |
| 5 | 74.6914 | 1.4001 | 1.64000 | 60.08 |
| 6 | 18.7095 | 4.8585 | | |
| 7 | 33.5931 | 1.2007 | 1.58913 | 61.13 |
| 8 | 17.5053 | 8.0433 | | |
| 9 | 546.3117 | 7.9991 | 1.80518 | 25.46 |
| 10 | −135.2933 | 2.6223 | | |
| 11 | ∞ | 25.0000 | 1.51680 | 64.20 |
| 12 | ∞ | 1.3951 | | |
| *13 | 21.2009 | 10.7762 | 1.51680 | 64.20 |
| *14 | −42.4629 | 3.1009 | | |
| 15 | −1398.1799 | 6.7849 | 1.55032 | 75.50 |
| 16 | −12.4720 | 0.7991 | 1.87070 | 40.73 |
| 17 | −37.3033 | DD[17] | | |
| 18 | −64.6154 | 0.8009 | 1.88100 | 40.14 |
| 19 | 31.3056 | 7.8674 | 1.49700 | 81.61 |
| 20 | −29.0320 | DD[20] | | |
| 21 | 453.3847 | 3.3169 | 1.84666 | 23.78 |
| 22 | −115.3634 | 23.9348 | | |
| 23 | 47.9450 | 6.7567 | 1.87070 | 40.73 |
| 24 | 126.5553 | 10.2201 | | |
| 25 | 32.3642 | 5.5568 | 2.00100 | 29.13 |
| 26 | 43.1010 | DD[26] | | |
| 27 | −33.7151 | 0.8000 | 1.61997 | 63.88 |
| 28 | 91.9372 | DD[28] | | |
| 29 | −167.6242 | 5.4577 | 1.84666 | 23.78 |
| 30 | −46.8853 | DD[30] | | |

TABLE 22B

| Example 8 | | | | |
|---|---|---|---|---|
| Sn | R | D | Nd | vd |
| 31 | −45.5770 | 5.9994 | 1.80420 | 46.50 |
| 32 | −47.0380 | 66.5617 | | |

TABLE 22B-continued

| Example 8 | | | | |
|---|---|---|---|---|
| Sn | R | D | Nd | vd |
| 33 | −1132.1706 | 5.0009 | 1.84666 | 23.78 |
| 34 | −98.5713 | 0.0310 | | |
| 35 | 23.6336 | 8.8728 | 1.59282 | 68.62 |
| 36 | 106.1787 | 14.3583 | | |
| 37 | −48.0564 | 0.8008 | 1.80518 | 25.46 |
| 38 | 16.8194 | 0.0309 | | |
| 39 | 14.9804 | 5.1867 | 1.59282 | 68.62 |
| 40 | −74.8944 | 7.7868 | | |
| 41(St) | ∞ | 2.9299 | | |
| 42 | −11.0113 | 0.8163 | 1.84666 | 23.78 |
| 43 | 808.9017 | 0.5678 | | |
| 44 | −556.2008 | 3.5211 | 1.49700 | 81.61 |
| 45 | −19.5409 | 9.8154 | | |
| 46 | −64.8942 | 4.0373 | 1.87070 | 40.73 |
| 47 | −29.1456 | 0.0299 | | |
| 48 | −102.1042 | 3.0228 | 1.87070 | 40.73 |
| 49 | −48.3664 | 7.6502 | | |
| 50 | 97.1314 | 3.9996 | 1.92286 | 20.88 |
| 51 | −235.4265 | 16.3772 | | |
| 52 | ∞ | 26.0000 | 1.51633 | 64.14 |
| 53 | ∞ | 3.2000 | | |

TABLE 23

| Example 8 | | | |
|---|---|---|---|
| | Wide | Middle | Tele |
| Zr | 1.0 | 1.2 | 1.4 |
| \|f\| | 6.57 | 7.89 | 9.20 |
| FNo. | 2.30 | 2.30 | 2.30 |
| 2ω[°] | 126.8 | 118.0 | 109.4 |
| DD[17] | 8.63 | 5.21 | 1.40 |
| DD[20] | 2.69 | 12.90 | 23.08 |
| DD[26] | 23.25 | 16.90 | 13.41 |
| DD[28] | 5.39 | 8.85 | 12.52 |
| DD[30] | 12.45 | 8.55 | 2.00 |

TABLE 24

| Example 8 | | | | |
|---|---|---|---|---|
| Sn | 1 | 2 | 13 | 14 |
| KA | −1.0000000E+00 | 7.3291115E−01 | 1.0000000E+00 | 1.0000000E+00 |
| A3 | −1.4333091E−04 | 2.9458057E−04 | 0.0000000E+00 | 0.0000000E+00 |
| A4 | 5.8593978E−05 | −6.3893824E−05 | 2.4150111E−05 | 4.6858667E−05 |
| A5 | 2.4784805E−07 | 1.7785820E−05 | −7.0165134E−06 | −1.6501990E−05 |
| A6 | −2.5884067E−07 | −9.9901947E−07 | 1.6730135E−06 | 4.5721310E−06 |
| A7 | 2.1224692E−09 | −5.6629476E−08 | 1.4759676E−08 | −7.9749837E−08 |
| A8 | 8.1156687E−10 | 6.1001150E−09 | −5.4488071E−08 | −1.8039990E−07 |
| A9 | −2.1991067E−11 | 7.7118747E−11 | 5.1132455E−09 | 2.3164902E−08 |
| A10 | −1.0231668E−12 | −2.0303331E−11 | 5.2981397E−10 | 2.3821956E−09 |
| A11 | 4.4711093E−14 | 2.1669534E−13 | −8.7624320E−11 | −5.7669617E−10 |
| A12 | 5.2161004E−16 | 3.3515932E−14 | −1.7894948E−12 | −5.7628942E−12 |
| A13 | −4.2998601E−17 | −8.0157251E−16 | 6.5964901E−13 | 6.6150674E−12 |
| A14 | 4.1503798E−20 | −2.7879047E−17 | −2.5089445E−15 | −1.5197554E−13 |
| A15 | 2.2379043E−20 | 1.0335763E−18 | −2.6056939E−15 | −4.0211854E−14 |
| A16 | −1.6706911E−22 | 8.6462948E−21 | 3.2436693E−17 | 1.5861947E−15 |
| A17 | −6.1370754E−24 | −6.2302575E−22 | 5.2935617E−18 | 1.2533246E−16 |
| A18 | 7.0257478E−26 | 2.1180854E−24 | −7.8110780E−20 | −6.1503722E−18 |
| A19 | 7.0475937E−28 | 1.4697690E−25 | −4.3608064E−21 | −1.5783461E−19 |
| A20 | −9.9940174E−30 | −1.4805135E−27 | 6.1012076E−23 | 8.7253989E−21 |

Figure 33:
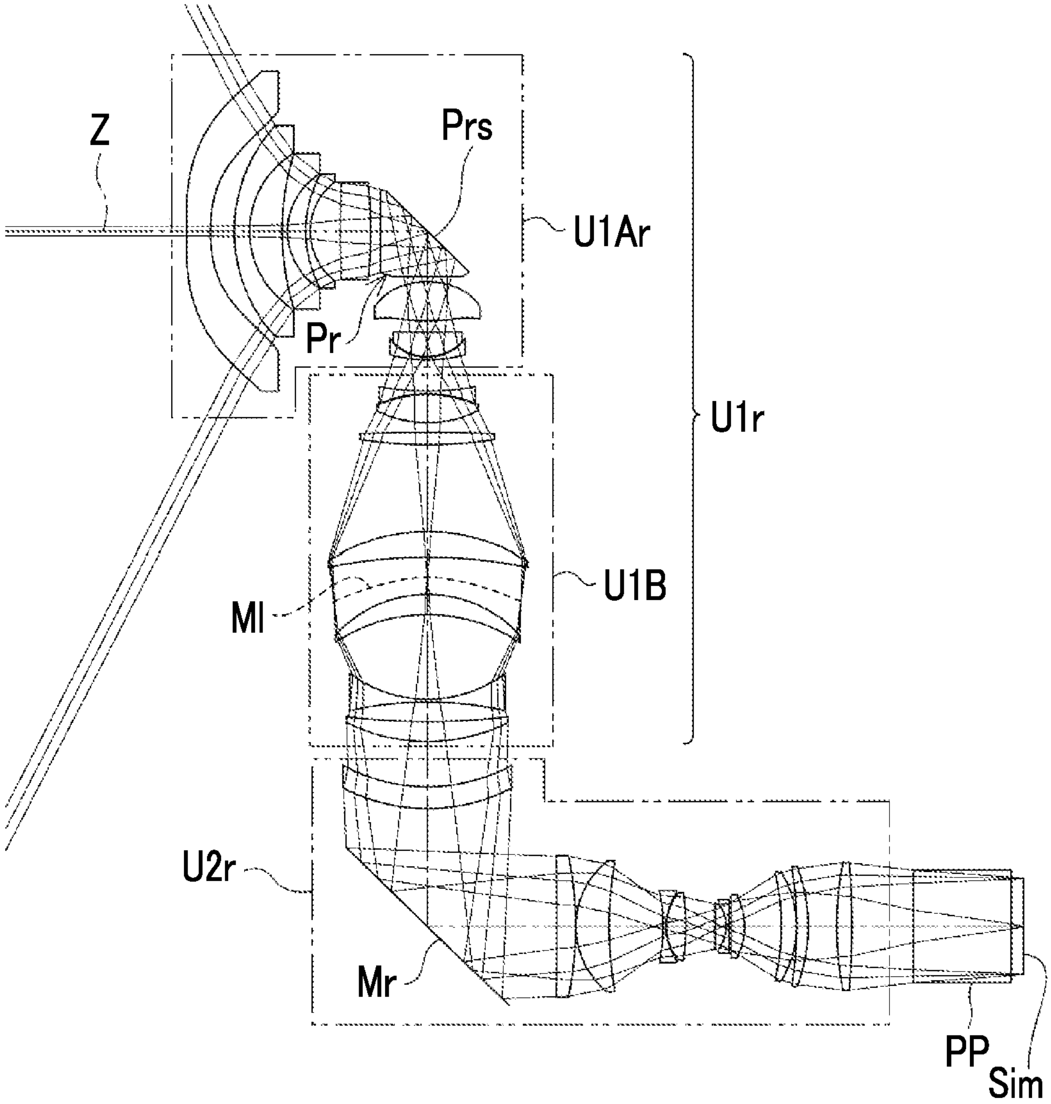
FIG. 33 is a cross-sectional view showing a configuration and luminous flux of a modification example of the zoom lens of Example 8.

FIG. 33 shows a configuration and luminous flux at the wide angle end of the zoom lens according to the modification example of Example 8. The zoom lens of FIG. 33 has two optical path deflecting members, and thus the optical path is deflected twice. The zoom lens of FIG. 33 consists of a first optical system U1*r* and a second optical system U2*r* in order from the magnification side to the reduction side along the optical path. The first optical system U1*r* consists of a first A optical system U1Ar and a first B optical system U1B in order from the magnification side to the reduction side along the optical path. The first A optical system U1Ar of FIG. 33 is different from the first A optical system U1A of Example 8 in that the prism Pr1 of Example 8 is replaced with the prism Pr having the reflecting surface Prs and the optical path is deflected at the reflecting surface Prs. The second optical system U2*r* of FIG. 33 is different from the second optical system U2 of Example 8 in that a mirror Mr is disposed inside the second optical system U2*r* and the optical path is deflected by the mirror Mr. Other configurations of the zoom lens of FIG. 33 are the same as those of the zoom lens of Example 8.

Example 9

Figure 35:
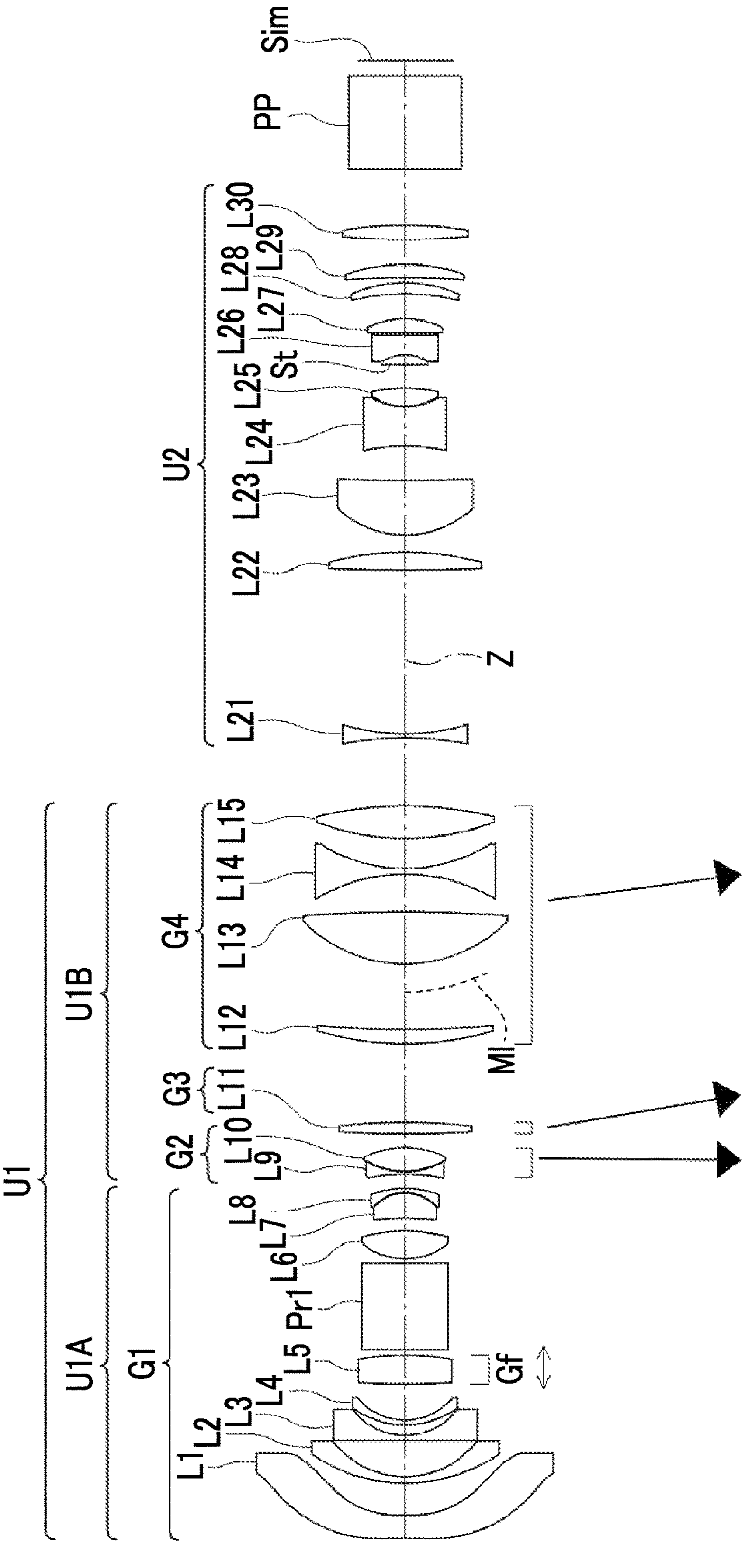
FIG. 35 is a cross-sectional view showing a configuration and rough movement directions of a zoom lens of Example 9.
Figure 36:
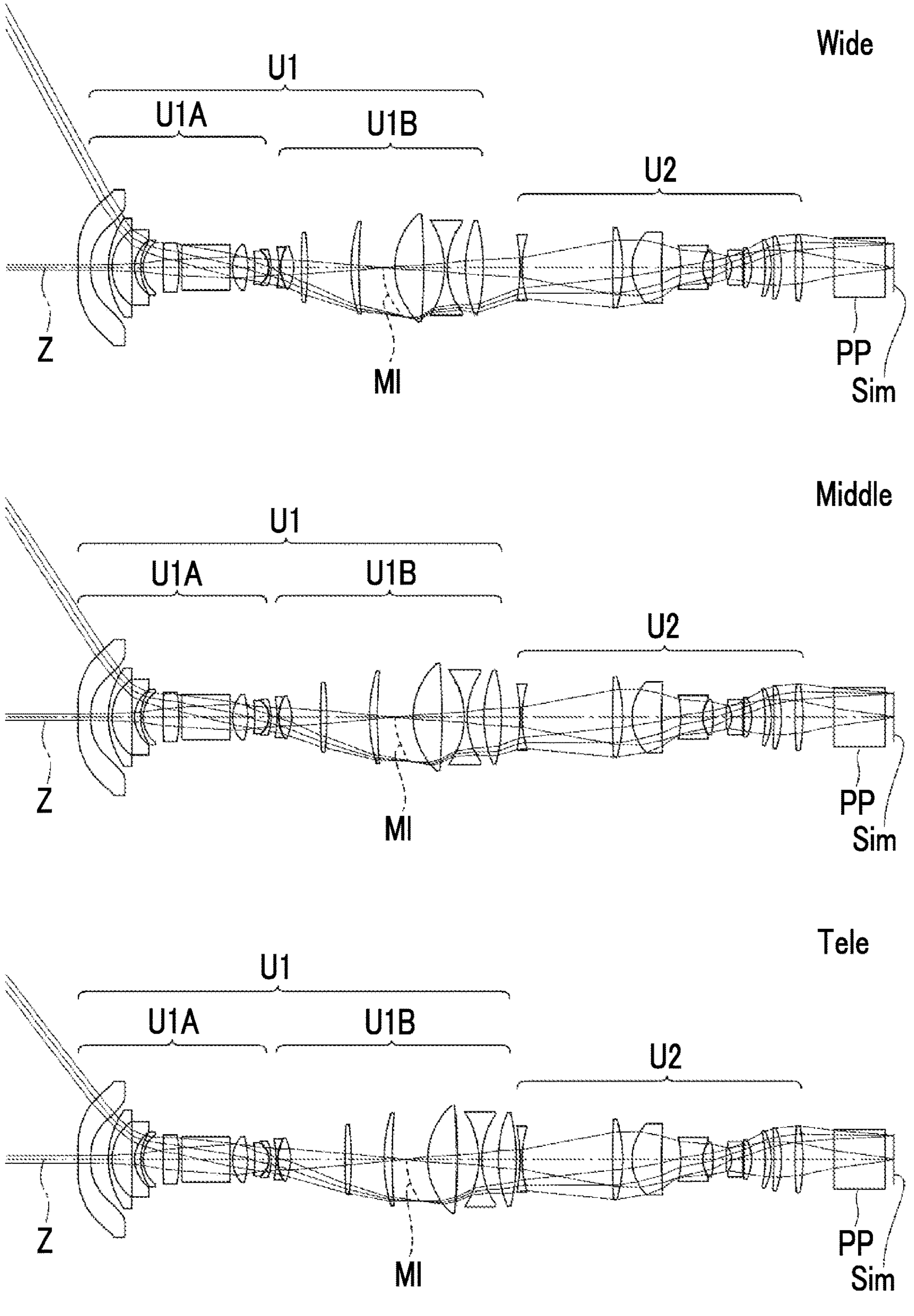
FIG. 36 is a cross-sectional view showing a configuration and luminous flux of the zoom lens of Example 9 in each zoom state.

FIGS. 35 and 36 show cross-sectional views of the configuration and luminous flux of the zoom lens of Example 9. The zoom lens of Example 9 consists of a first optical system U1 and a second optical system U2 in order from the magnification side to the reduction side. The first optical system U1 consists of a first A optical system U1A and a first B optical system U1B in order from the magnification side to the reduction side. The first A optical system U1A consists of a first lens group G1. The first B optical system U1B consists of a second lens group G2, a third lens group G3, and a fourth lens group G4 in order from the magnification side to the reduction side.

The first lens group G1 consists of lenses L1 to L5, a prism Pr1, and lenses L6 to L8 in order from the magnification side to the reduction side. The second lens group G2 consists of lenses L9 to L10 in order from the magnification side to the reduction side. The third lens group G3 consists of a lens L11. The fourth lens group G4 consists of lenses L12 to L15 in order from the magnification side to the reduction side. The second optical system U2 consists of lenses L21 to L25, an aperture stop St, and lenses L26 to L30 in order from the magnification side to the reduction side.

During zooming, the first lens group G1 remains stationary with respect to the magnification side image formation plane, and each of the second lens group G2, the third lens group G3, and the fourth lens group G4 moves along the optical axis Z by changing the spacing between the adjacent groups. The intermediate image MI is formed in the fourth lens group G4. The focusing group Gf consists of a lens L5.

Figure 38:
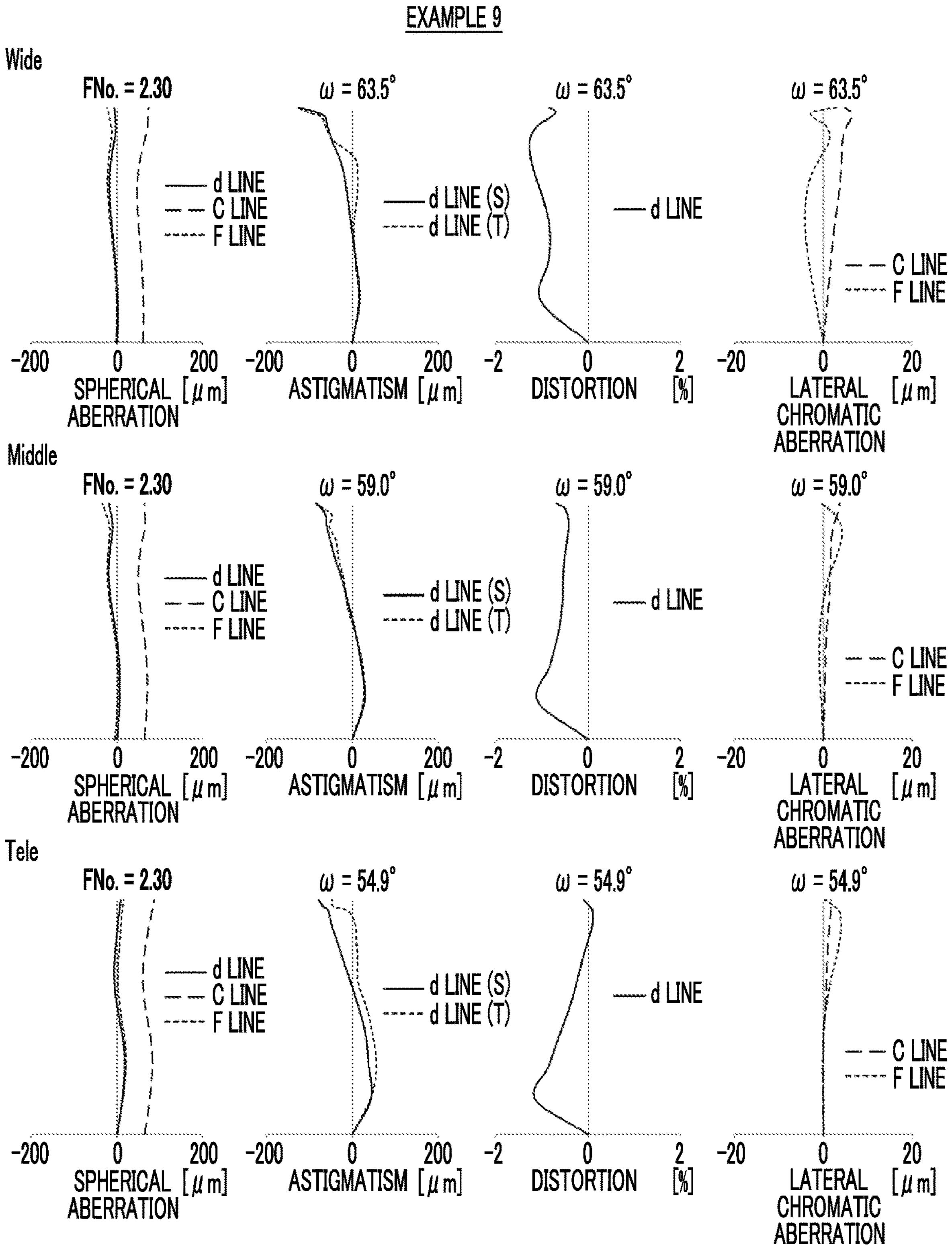
FIG. 38 is a diagram of aberrations in the zoom lens of Example 9.

Regarding the zoom lens of Example 9, Table 25A and 25B show basic lens data, Table 26 shows specifications and variable surface spacings, and Table 27 shows aspherical coefficients thereof. FIG. 38 shows aberration diagrams. The basic lens data and the aberration diagrams are in a state where the projection distance is 0.9 m (meters).

TABLE 25A

Example 9

| Sn | R | D | Nd | νd |
|---|---|---|---|---|
| *1 | −160.7717 | 6.3676 | 1.53638 | 56.09 |
| *2 | 65.4819 | 8.8502 | | |
| 3 | 45.8823 | 1.7997 | 1.65160 | 58.54 |
| 4 | 25.1646 | 10.1156 | | |
| 5 | 3900.3377 | 1.4007 | 1.64000 | 60.08 |
| 6 | 18.3199 | 3.0125 | | |
| 7 | 25.8633 | 1.2008 | 1.58913 | 61.13 |
| 8 | 17.1963 | 10.1480 | | |
| 9 | 214.0554 | 8.0001 | 1.80518 | 25.46 |
| 10 | −75.0982 | 1.5244 | | |
| 11 | ∞ | 24.0000 | 1.51680 | 64.20 |
| 12 | ∞ | 1.3960 | | |
| *13 | 21.0239 | 7.5521 | 1.51680 | 64.20 |
| *14 | −35.2211 | 3.5493 | | |
| 15 | −69.5659 | 7.0878 | 1.55032 | 75.50 |
| 16 | −11.3235 | 1.2003 | 1.87070 | 40.73 |
| 17 | −26.3523 | DD[17] | | |
| 18 | −55.5004 | 0.8009 | 1.88100 | 40.14 |
| 19 | 22.1747 | 6.5510 | 1.49700 | 81.61 |
| 20 | −26.2378 | DD[20] | | |
| 21 | 325.7134 | 3.1256 | 1.59282 | 68.62 |
| 22 | −167.0700 | DD[22] | | |
| 23 | 86.0439 | 3.9425 | 2.00100 | 29.13 |
| 24 | 266.2287 | 18.0980 | | |
| 25 | 39.5184 | 14.5550 | 1.72916 | 54.67 |
| 26 | −377.5560 | 10.5230 | | |
| 27 | −47.5313 | 1.5005 | 1.49700 | 81.61 |
| 28 | 43.6046 | 8.4127 | | |
| 29 | 68.3163 | 9.0061 | 1.80610 | 33.27 |
| 30 | −105.6879 | DD[30] | | |

TABLE 25B

Example 9

| Sn | R | D | Nd | νd |
|---|---|---|---|---|
| 31 | −91.1031 | 1.0000 | 1.84666 | 23.78 |
| 32 | 58.2778 | 45.7304 | | |
| 33 | 534.0190 | 4.9999 | 1.84666 | 23.78 |
| 34 | −79.9807 | 4.7743 | | |
| 35 | 27.6791 | 15.0008 | 1.59282 | 68.62 |
| 36 | 428.8773 | 9.5817 | | |
| 37 | −56.0610 | 10.9449 | 1.80518 | 25.46 |
| 38 | 17.6572 | 0.0310 | | |
| 39 | 15.4023 | 5.1239 | 1.59282 | 68.62 |
| 40 | −51.1251 | 6.6472 | | |
| 41(St) | ∞ | 2.7004 | | |
| 42 | −11.9007 | 5.5160 | 1.84666 | 23.78 |
| 43 | 309.3809 | 0.7378 | | |
| 44 | −411.1407 | 3.8303 | 1.49700 | 81.61 |
| 45 | −23.4189 | 6.9199 | | |
| 46 | −63.6211 | 3.1377 | 1.87070 | 40.73 |
| 47 | −36.0652 | 1.3039 | | |
| 48 | −230.5143 | 3.7570 | 1.87070 | 40.73 |
| 49 | −49.5349 | 6.8296 | | |
| 50 | 199.3011 | 3.9998 | 1.92286 | 20.88 |
| 51 | −107.3059 | 15.5873 | | |
| 52 | ∞ | 26.0000 | 1.51633 | 64.14 |
| 53 | ∞ | 4.2600 | | |

TABLE 26

| Example 9 | | | |
|---|---|---|---|
| | Wide | Middle | Tele |
| Zr | 1.0 | 1.2 | 1.4 |
| \|f\| | 6.56 | 7.88 | 9.18 |
| FNo. | 2.30 | 2.30 | 2.30 |
| 2ω[°] | 127.0 | 118.0 | 109.8 |
| DD[17] | 3.95 | 3.00 | 2.49 |
| DD[20] | 3.97 | 14.64 | 27.45 |
| DD[22] | 21.97 | 21.55 | 16.61 |
| DD[30] | 18.65 | 9.35 | 1.98 |

TABLE 27

| Example 9 | | | | |
|---|---|---|---|---|
| Sn | 1 | 2 | 13 | 14 |
| KA | −1.0000000E+00 | −4.4096147E−01 | 1.0000000E+00 | 1.0000000E+00 |
| A3 | −3.9972580E−05 | 3.7820841E−04 | 0.0000000E+00 | 0.0000000E+00 |
| A4 | 6.0190969E−05 | −6.7694206E−05 | −5.9135577E−07 | 5.1545600E−06 |
| A5 | −9.2150938E−07 | 2.0535033E−05 | 8.0298771E−06 | 1.2905736E−05 |
| A6 | −2.1230822E−07 | −1.4972308E−06 | −2.0069175E−06 | −3.5435721E−06 |
| A7 | 7.2070267E−09 | −4.8955473E−08 | 1.7966580E−07 | 2.2174607E−07 |
| A8 | 5.6765664E−10 | 1.0662453E−08 | 1.9478615E−08 | 7.2013186E−08 |
| A9 | −3.3579823E−11 | −1.3715764E−10 | −4.6016141E−09 | −1.1508762E−08 |
| A10 | −4.1010971E−13 | −3.7029722E−11 | 5.1753955E−11 | −3.9119962E−10 |
| A11 | 5.9088447E−14 | 1.3427425E−12 | 4.5411227E−11 | 1.6853195E−10 |
| A12 | −3.3685977E−16 | 6.0043346E−14 | −2.1447817E−12 | −2.9576291E−12 |
| A13 | −5.2965738E−17 | −3.5338840E−15 | −2.3794622E−13 | −1.2366751E−12 |
| A14 | 7.4816019E−19 | −3.7423532E−17 | 1.6148448E−14 | 4.9576188E−14 |
| A15 | 2.6117634E−20 | 4.5132525E−18 | 7.0060314E−16 | 4.9487491E−15 |
| A16 | −5.0926223E−22 | −1.4725014E−20 | −5.7653163E−17 | −2.6182892E−16 |
| A17 | −6.7836047E−24 | −2.8814860E−21 | −1.0946903E−18 | −1.0323429E−17 |
| A18 | 1.6092179E−25 | 3.1064971E−23 | 1.0166435E−19 | 6.3126007E−19 |
| A19 | 7.3114237E−28 | 7.3701855E−25 | 7.0863762E−22 | 8.7973133E−21 |
| A20 | −2.0177527E−29 | −1.1411493E−26 | −7.1201608E−23 | −5.8750646E−22 |

Figure 37:
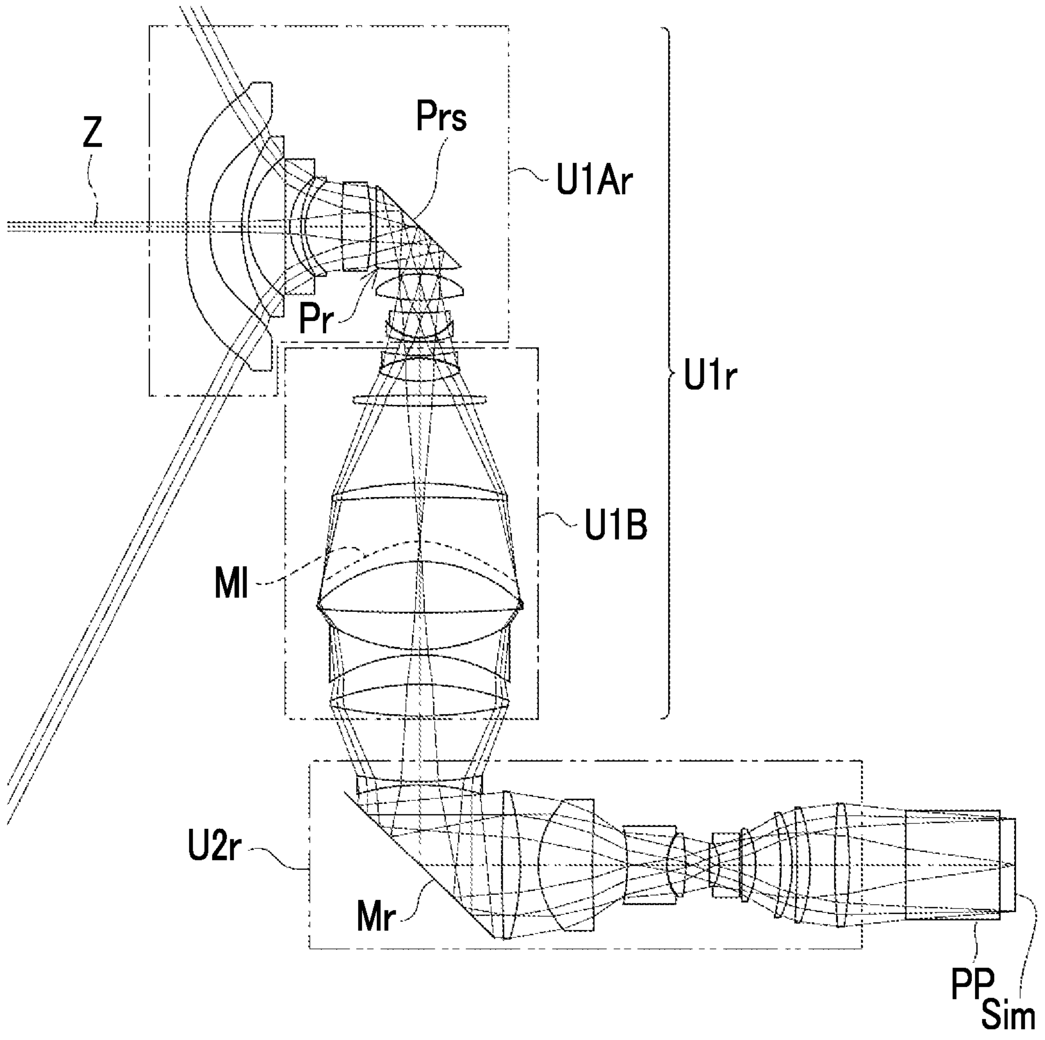
FIG. 37 is a cross-sectional view showing a configuration and luminous flux of a modification example of the zoom lens of Example 9.

FIG. 37 shows a configuration and luminous flux at the wide angle end of the zoom lens according to the modification example of Example 9. The zoom lens of FIG. 37 has two optical path deflecting members, and thus the optical path is deflected twice. The zoom lens of FIG. 37 consists of a first optical system U1*r* and a second optical system U2*r* in order from the magnification side to the reduction side along the optical path. The first optical system U1*r* consists of a first A optical system U1Ar and a first B optical system U1B in order from the magnification side to the reduction side along the optical path. The first A optical system U1Ar of FIG. 37 is different from the first A optical system U1A of Example 9 in that the prism Pr1 of Example 9 is replaced with the prism Pr having the reflecting surface Prs and the optical path is deflected by the reflecting surface Prs. The second optical system U2*r* of FIG. 37 is different from the second optical system U2 of Example 9 in that a mirror Mr is disposed inside the second optical system U2*r* and the optical path is deflected by the mirror Mr. Other configurations of the zoom lens of FIG. 37 are the same as those of the zoom lens of Example 9.

In the above description, in Examples 2 to 9, an example, in which the optical path is deflected twice, has been shown as a modification example. However, in Examples 2 to 9, a modification example of the configuration in which only the first optical path deflecting member is provided as an optical path deflecting member and a modification example of the configuration in which only the second optical path deflecting member is provided can be made.

Table 28 shows values relating to Conditional Expressions (1), (1a), (2), and (2a) of the zoom lenses of Examples 1 to 9.

TABLE 28

| | Example 1 | Example 2 | Example 3 | Example 4 | Example 5 |
|---|---|---|---|---|---|
| Dbend1 | 29.403 | 31.065 | 31.408 | 30.531 | 35.969 |
| E1f | 25.658 | 19.132 | 26.359 | 27.325 | 25.000 |
| E1r | 20.071 | 23.474 | 20.824 | 18.844 | 29.971 |
| (E1f + E1r)/4 | 11.432 | 10.652 | 11.796 | 11.542 | 13.743 |
| (E1f + E1r)/2 | 22.865 | 21.303 | 23.592 | 23.085 | 27.486 |
| Dbend2 | 61.867 | 55.104 | 49.121 | 63.650 | 46.388 |
| E2f | 42.500 | 37.804 | 43.000 | 43.000 | 46.221 |
| E2r | 39.000 | 36.720 | 38.500 | 38.500 | 31.385 |
| (E2f + E2r)/4 | 20.375 | 18.631 | 20.375 | 20.375 | 19.402 |
| (E2f + E2r)/2 | 40.750 | 37.262 | 40.750 | 40.750 | 38.803 |

| | Example 6 | Example 7 | Example 8 | Example 9 |
|---|---|---|---|---|
| Dbend1 | 30.336 | 31.672 | 29.017 | 26.920 |
| E1f | 26.079 | 26.542 | 25.447 | 25.660 |
| E1r | 19.321 | 21.000 | 18.407 | 19.108 |
| (E1f + E1r)/4 | 11.350 | 11.886 | 10.964 | 11.192 |
| (E1f + E1r)/2 | 22.700 | 23.771 | 21.927 | 22.384 |
| Dbend2 | 44.509 | 46.390 | 66.562 | 45.730 |
| E2f | 43.000 | 44.000 | 43.000 | 33.821 |
| E2r | 38.500 | 33.000 | 39.000 | 42.000 |
| (E2f + E2r)/4 | 20.375 | 19.250 | 20.500 | 18.955 |
| (E2f + E2r)/2 | 40.750 | 38.500 | 41.000 | 37.911 |

The zoom lenses of Examples 1 to 9 each have a high magnification which is a zoom magnification of 1.3 times or more. The zoom lenses of Examples 1 to 9 each have a wide angle of view which is a total angle of view of 90 degrees or more at the wide angle end. Further, in the zoom lenses of Examples 1 to 9, fluctuation in aberrations during zooming is suppressed, and each aberration is satisfactorily corrected to achieve high optical performance.

It is necessary for a projection optical system used in a projection type display device to have favorable aberration correction in accordance with a resolution of the light valve of the projection type display device. Further, in recent years, with an increase in luminance of the light valve, there is a demand for a device capable of projecting a screen having a large screen and an intended size. Therefore, the projection type display device having a wide angle of view and a high zoom magnification has been developed. Furthermore, it is also necessary to provide the projection type display device at a position at which the projection type display device body cannot be visually recognized in a state where the projected image is seen. For this reason, reduction in size is further achieved by deflecting the optical path using a mirror or the like. According to the zoom lens according to the present disclosure, it is possible to cope with these demands.

Figure 39:
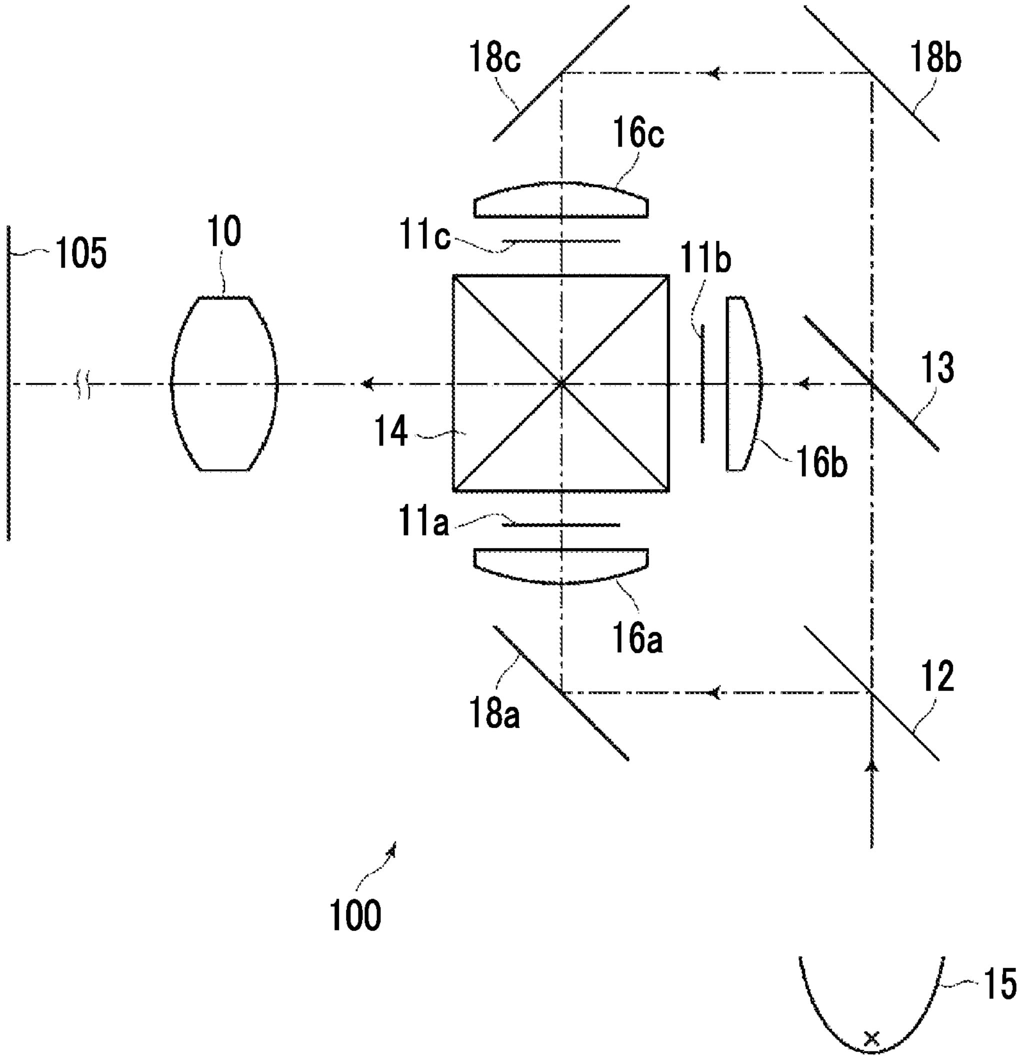
FIG. 39 is a schematic configuration diagram of a projection type display device according to an embodiment.

Next, a projection type display device according to an embodiment of the present disclosure will be described. FIG. 39 is a schematic configuration diagram of a projection type display device according to an embodiment of the present disclosure. The projection type display device 100 shown in FIG. 39 has a zoom lens 10 according to an embodiment of the present disclosure, a light source 15, and transmissive display elements 11*a* to 11*c* as light valves corresponding to each color light and outputting an optical image. Further, the projection type display device 100 has dichroic mirrors 12 and 13 for color separation, cross dichroic prisms 14 for color synthesis, condenser lenses 16*a* to 16*c*, and total reflection mirrors 18*a* to 18*c* for deflecting the optical path. It should be noted that FIG. 39 schematically shows the zoom lens 10. Furthermore, an integrator is disposed between the light source 15 and the dichroic mirror 12, but is not shown in FIG. 39.

White light originating from the light source 15 is separated into ray with three colors (green light, blue light, and red light) through the dichroic mirrors 12 and 13. Thereafter, the ray respectively pass through the condenser lenses 16*a* to 16*c*, are incident into and modulated through the transmissive display elements 11*a* to 11*c* respectively corresponding to the ray with the respective colors, are subjected to color synthesis through the cross dichroic prism 14, and are subsequently incident into the zoom lens 10. The zoom lens 10 projects an optical image based on the modulated light modulated through the transmissive display elements 11*a* to 11*c* onto the screen 105.

Figure 40:
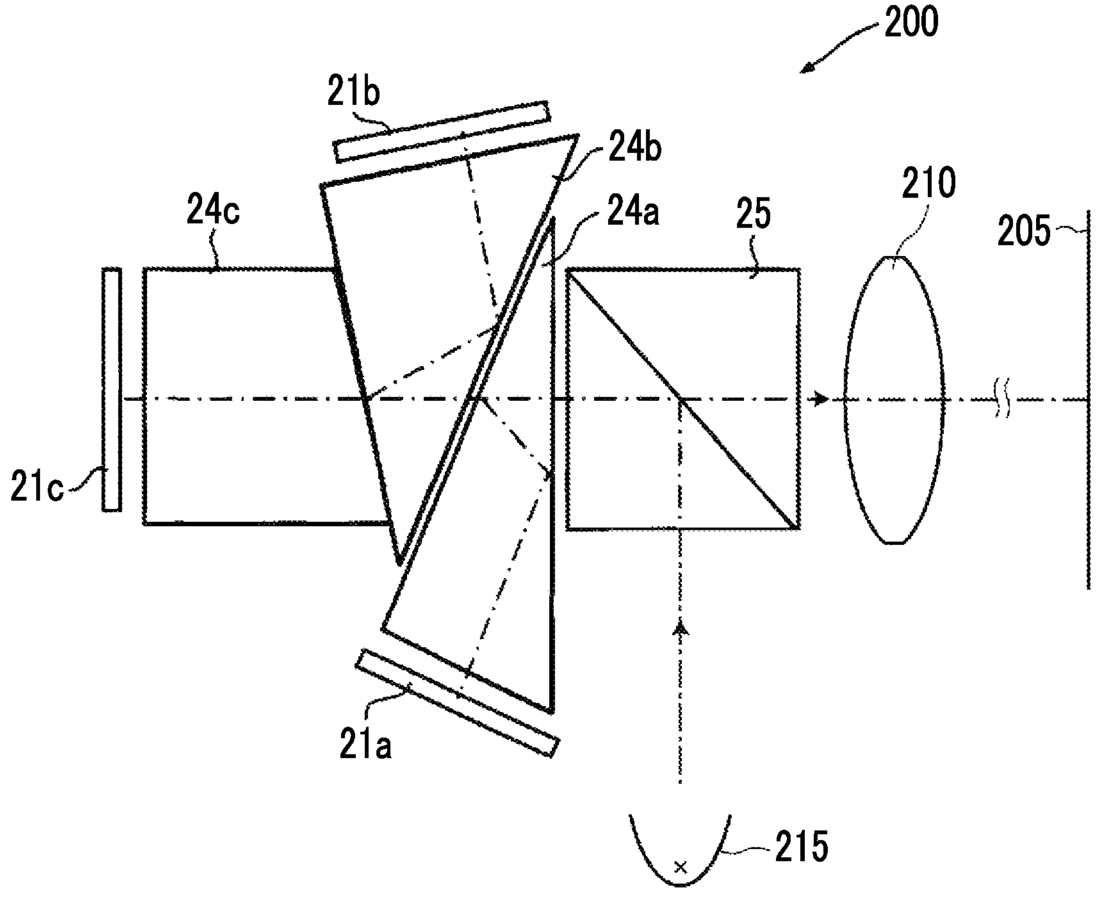
FIG. 40 is a schematic configuration diagram of a projection type display device according to another embodiment.

FIG. 40 is a schematic configuration diagram of a projection type display device according to another embodiment of the present disclosure. The projection type display device 200 shown in FIG. 40 has a zoom lens 210 according to an embodiment of the present disclosure, a light source 215, and digital micromirror device (DMD: registered trademark) elements 21*a* to 21*c* as light valves each of which outputs an optical image corresponding to each color light. Further, the projection type display device 200 has total internal reflection (TIR) prisms 24*a* to 24*c* for color separation and color synthesis, and a polarized light separating prism 25 that separates illumination light and projection light. It should be noted that FIG. 40 schematically shows the zoom lens 210. Furthermore, an integrator is disposed between the light source 215 and the polarized light separating prism 25, but is not shown in FIG. 40.

White light originating from the light source 215 is reflected on a reflecting surface inside the polarized light separating prism 25, and is separated into ray with three colors (green light, blue light, and red light) through the TIR prisms 24*a* to 24*c*. The separated ray with the respective colors are respectively incident into and modulated through the corresponding DMD elements 21*a* to 21*c*, travel through the TIR prisms 24*a* to 24*c* again in a reverse direction, are subjected to color synthesis, are subsequently transmitted through the polarized light separating prism 25, and are incident into the zoom lens 210. The zoom lens 210 projects an optical image based on the modulated light modulated through the DMD elements 21_a_ to 21_c_ onto the screen 205.

Figure 41:
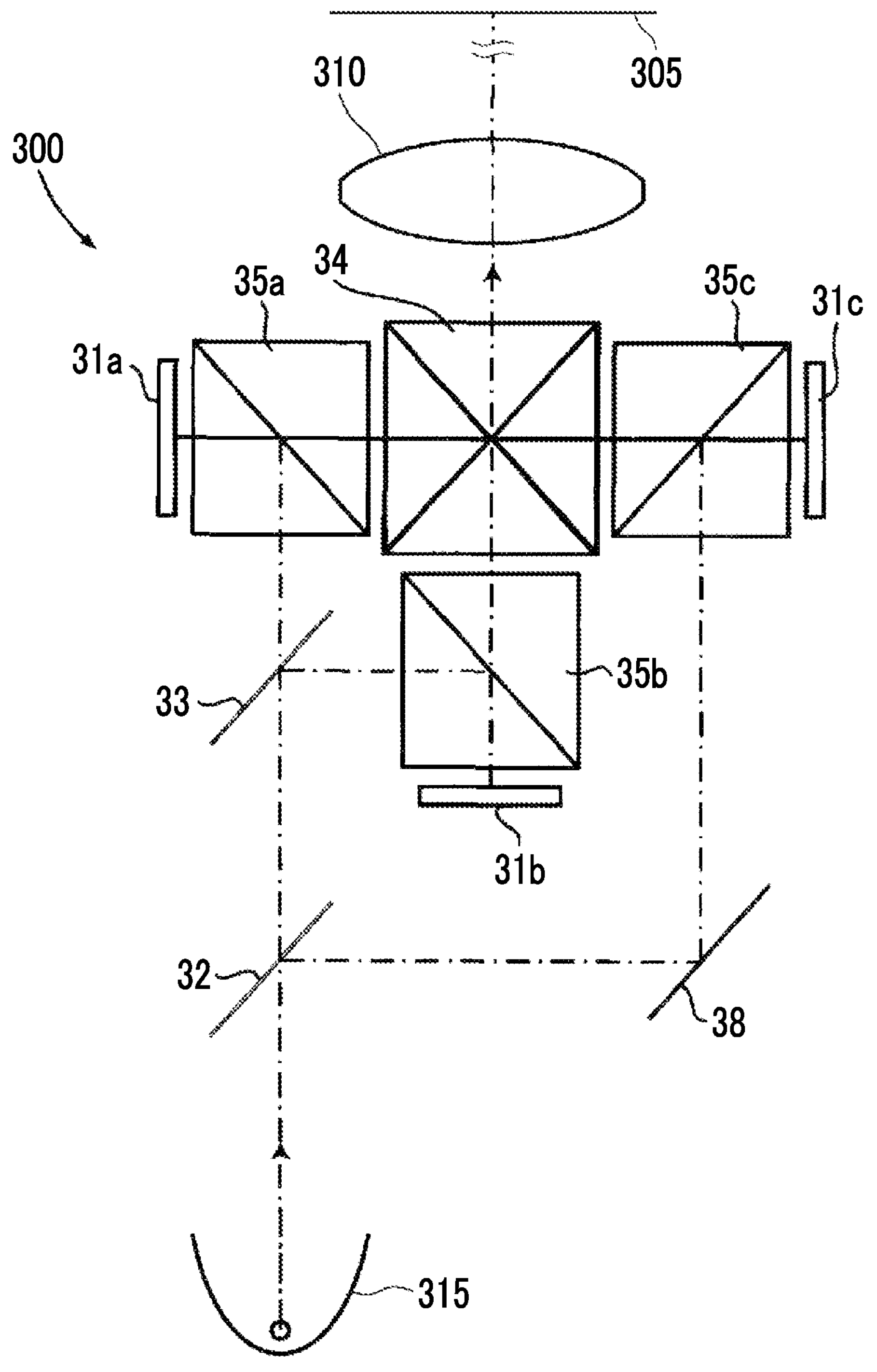
FIG. 41 is a schematic configuration diagram of a projection type display apparatus according to still another embodiment.

FIG. 41 is a schematic configuration diagram of a projection type display device according to still another embodiment of the present disclosure. The projection type display device 300 shown in FIG. 41 has a zoom lens 310 according to an embodiment of the present disclosure, a light source 315, and reflective display elements 31_a_ to 31_c_ as light valves corresponding to each color light and outputting an optical image. Further, the projection type display device 300 has dichroic mirrors 32 and 33 for color separation, a cross dichroic prism 34 for color synthesis, a total reflection mirror 38 for optical path deflection, and polarized light separating prisms 35_a_ to 35_c_. It should be noted that FIG. 41 schematically shows the zoom lens 310. Furthermore, an integrator is disposed between the light source 315 and the dichroic mirror 32, but is not shown in FIG. 41.

White light originating from the light source 315 is separated into ray with three colors (green light, blue light, and red light) through the dichroic mirrors 32 and 33. The separated ray with the respective colors respectively pass through the polarized light separating prisms 35_a_ to 35_c_, are incident into and modulated through the reflective display elements 31_a_ to 31_c_ respectively corresponding to the ray with the respective colors, are subjected to color synthesis through the cross dichroic prism 34, and are subsequently incident into the zoom lens 310. The zoom lens 310 projects an optical image based on the modulated light modulated through the reflective display elements 31_a_ to 31_c_ onto the screen 305.

Figure 42:
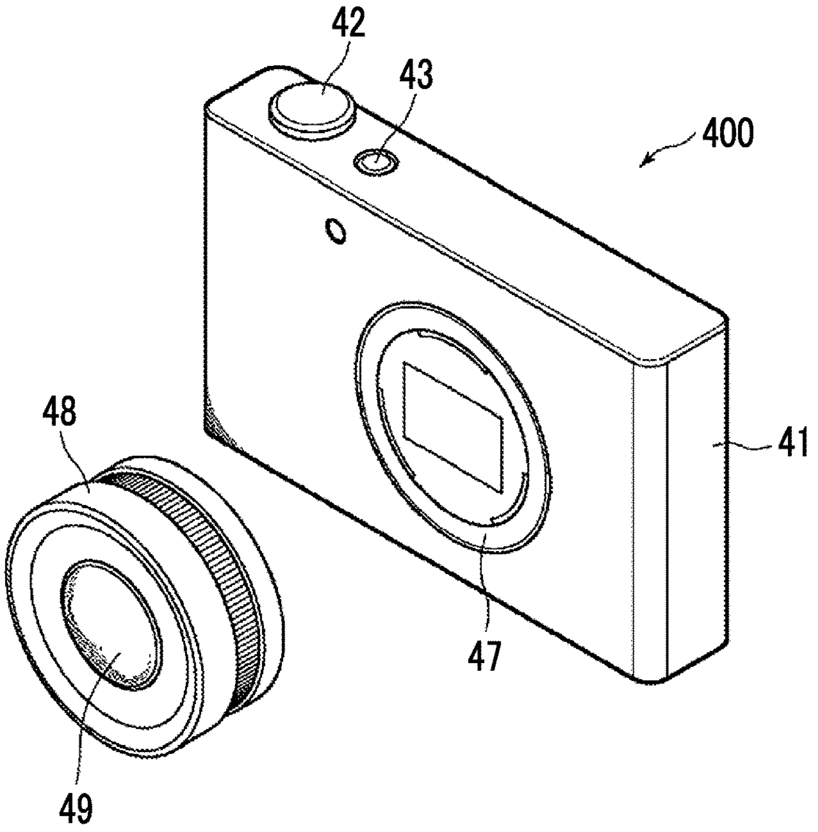
FIG. 42 is a perspective view of a front side of an imaging apparatus according to an embodiment.
Figure 43:
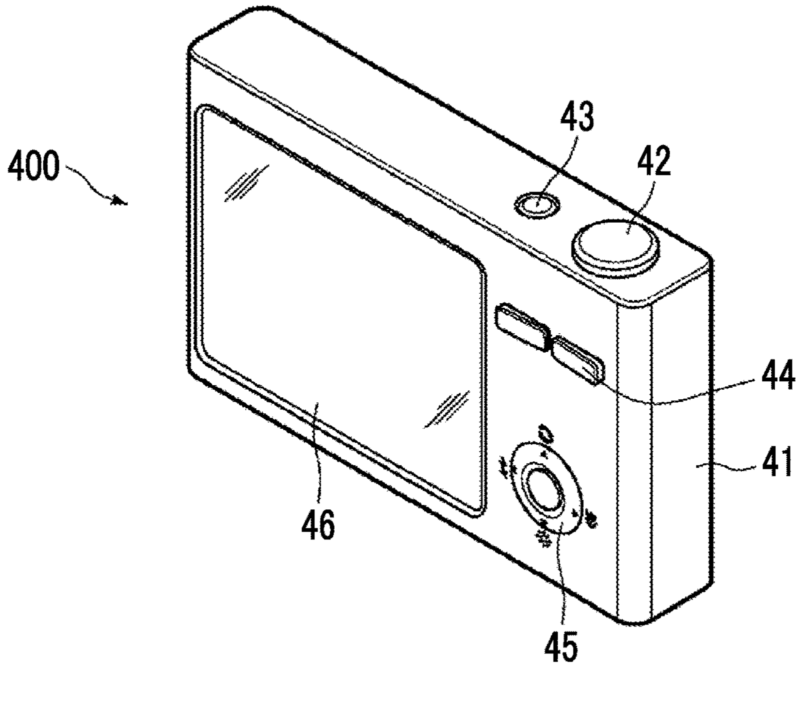
FIG. 43 is a perspective view of a rear side of the imaging apparatus shown in FIG. 42.

FIGS. 42 and 43 are external views of a camera 400 which is the imaging apparatus according to the embodiment of the present disclosure. FIG. 42 is a perspective view of the camera 400 viewed from a front side, and FIG. 43 is a perspective view of the camera 400 viewed from a rear side. The camera 400 is a mirrorless single-lens type digital camera on which an interchangeable lens 48 is attachably and detachably mounted. The interchangeable lens 48 is a lens barrel containing a zoom lens 49 according to the embodiment of the present disclosure.

The camera 400 comprises a camera body 41, and a shutter button 42 and a power button 43 are provided on an upper surface of the camera body 41. Further, operating parts 44 and 45 and a display unit 46 are provided on a rear surface of the camera body 41. The display unit 46 displays a captured image or an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, there are provided an imaging element (not shown in the drawing), a signal processing circuit (not shown in the drawing), a storage medium (not shown in the drawing), and the like. The imaging element such as a charge coupled device (CCD) or a complementary metal oxide semiconductor (CMOS) outputs a captured image signal based on a subject image which is formed through the interchangeable lens 48. The signal processing circuit generates an image through processing of the captured image signal which is output from the imaging element. The storage medium stores the generated image. The camera 400 captures a static image or a video by pressing the shutter button 42, and records image data, which is obtained through imaging, in the storage medium.

The technique of the present disclosure has been hitherto described through embodiments and examples, but the technique of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the examples, and different values may be used therefor.

Further, the projection type display device according to the technique of the present disclosure is not limited to the above-mentioned configuration, and may be modified into various forms such as the optical member used for ray separation or ray synthesis and the light valve. The light valve is not limited to a form in which light from a light source is spatially modulated through an image display element and is output as an optical image based on image data, but may be a form in which light itself output from the self-light-emitting image display element is output as an optical image based on the image data. Examples of the self-light-emitting image display element include an image display element in which light emitting elements such as light emitting diodes (LED) or organic light emitting diodes (OLED) are two-dimensionally arranged.

Further, the imaging apparatus according to the technique of the present disclosure is not limited to the above-mentioned configuration, and may be modified into various forms such as a non-mirrorless type camera, a film camera, a video camera, and a camera for movie imaging.

Regarding the above-mentioned embodiments and examples, the following Supplementary Notes will be further disclosed.

Supplementary Note 1

A zoom lens consisting of, in order from a magnification side to a reduction side along an optical path:

a first optical system that includes at least one lens; and a second optical system that includes a plurality of lenses, wherein the first optical system includes an intermediate image, which is formed at a position conjugate to a magnification side image formation plane, inside the first optical system, the first optical system includes a reduction side movable lens group, which moves during zooming, at a position closest to the reduction side, the second optical system remains stationary with respect to the magnification side image formation plane during zooming, and a lens adjacent to the magnification side of the intermediate image moves, a lens adjacent to the reduction side of the intermediate image moves, and the intermediate image moves, during zooming.

Supplementary Note 2

The zoom lens according to Supplementary Note 1, wherein the first optical system consists of a first A optical system and a first B optical system, in order from the magnification side to the reduction side along the optical path, the first A optical system remains stationary with respect to the magnification side image formation plane during zooming, and the first B optical system includes a lens, which moves during zooming, at a position closest to the magnification side.

Supplementary Note 3

The zoom lens according to Supplementary Note 1 or 2, wherein the second optical system includes a stop.

Supplementary Note 4

The zoom lens according to any one of Supplementary Notes 1 to 3, wherein the intermediate image is positioned inside a lens group which moves during zooming, and in a case where a group, of which spacing to an adjacent group in an optical axis direction changes during zooming, is one lens group, the zoom lens includes one or more lens groups, which move during zooming, at a position closer to the magnification side than the lens group in which the intermediate image is positioned.

Supplementary Note 5

The zoom lens according to Supplementary Note 4, wherein the zoom lens includes one or more lens groups, which move during zooming, at a position closer to the reduction side than the lens group in which the intermediate image is positioned.

Supplementary Note 6

The zoom lens according to any one of Supplementary Notes 1 to 5, wherein in a case where a group, of which spacing to an adjacent group in an optical axis direction changes during zooming, is one lens group, the first optical system includes three or more lens groups which move during zooming, including the reduction side movable lens group.

Supplementary Note 7

The zoom lens according to any one of Supplementary Notes 1 to 6, wherein a lens surface adjacent to the reduction side of the intermediate image is a surface having a convex shape facing toward the magnification side.

Supplementary Note 8

The zoom lens according to Supplementary Note 2, wherein a first optical path deflecting member, which deflects the optical path, is disposed in the first A optical system.

Supplementary Note 9

The zoom lens according to Supplementary Note 8, wherein assuming that a minimum distance on an optical axis between a surface adjacent to the magnification side of the first optical path deflecting member and a surface adjacent to the reduction side of the first optical path deflecting member in an entire zoom range is Dbend1, an effective diameter of the surface adjacent to the magnification side of the first optical path deflecting member is E1f, and an effective diameter of the surface adjacent to the reduction side of the first optical path deflecting member is E1r, Conditional Expression (1) is satisfied, which is represented by $$Dbend1 > (E1f + E1r)/4. \quad (1)$$

Supplementary Note 10

The zoom lens according to Supplementary Note 8 or 9, comprising a focusing group that moves during focusing, wherein the focusing group is disposed closer to the magnification side than the first optical path deflecting member.

Supplementary Note 11

The zoom lens according to any one of Supplementary Notes 1 to 10, wherein a second optical path deflecting member, which deflects the optical path, is disposed closer to the reduction side than the first optical system.

Supplementary Note 12

The zoom lens according to Supplementary Note 11, wherein assuming that a minimum distance on an optical axis between a surface adjacent to the magnification side of the second optical path deflecting member and a surface adjacent to the reduction side of the second optical path deflecting member in an entire zoom range is Dbend2, an effective diameter of the surface adjacent to the magnification side of the second optical path deflecting member is E2f, and an effective diameter of the surface adjacent to the reduction side of the second optical path deflecting member is E2r, Conditional Expression (2) is satisfied, which is represented by $$Dbend2 > (E2f + E2r)/4. \quad (2)$$

Supplementary Note 13

The zoom lens according to Supplementary Note 8, wherein a second optical path deflecting member, which deflects the optical path, is disposed closer to the reduction side than the first optical system.

Supplementary Note 14

The zoom lens according to Supplementary Note 13, wherein all lens groups, which move during zooming, are disposed on the optical path between the first optical path deflecting member and the second optical path deflecting member.

Supplementary Note 15

The zoom lens according to Supplementary Note 9, wherein Conditional Expression (1a) is satisfied, which is represented by $$Dbend1 > (E1f + E1r)/2. \quad (1a)$$

Supplementary Note 16

The zoom lens according to Supplementary Note 12, wherein Conditional Expression (2a) is satisfied, which is represented by $$Dbend2 > (E2f + E2r)/2. \quad (2a)$$

Supplementary Note 17

The zoom lens according to any one of Supplementary Notes 1 to 16, wherein the intermediate image is positioned within an air spacing in an entire zoom range.

Supplementary Note 18

A projection type display device comprising the zoom lens according to any one of Supplementary Notes 1 to 17.

Supplementary Note 19

An imaging apparatus comprising the zoom lens according to any one of Supplementary Notes 1 to 17.

What is claimed is:

1. A zoom lens consisting of, in order from a magnification side to a reduction side along an optical path:

a first optical system that includes at least one lens; and a second optical system that includes a plurality of lenses, wherein the first optical system includes an intermediate image, which is formed at a position conjugate to a magnification side image formation plane, inside the first optical system, the first optical system includes a reduction side movable lens group, which moves during zooming, at a position closest to the reduction side, the second optical system remains stationary with respect to the magnification side image formation plane during zooming, and a lens adjacent to the magnification side of the intermediate image moves, a lens adjacent to the reduction side of the intermediate image moves, and the intermediate image moves, during zooming, wherein the first optical system consists of a first A optical system and a first B optical system, in order from the magnification side to the reduction side along the optical path, the first A optical system remains stationary with respect to the magnification side image formation plane during zooming, and the first B optical system includes a lens group, which moves during zooming, at a position closest to the magnification side, wherein a first optical path deflecting member, which deflects the optical path, is disposed in the first A optical system, and wherein assuming that a minimum distance on an optical axis between a surface adjacent to the magnification side of the first optical path deflecting member and a surface adjacent to the reduction side of the first optical path deflecting member in an entire zoom range is Dbend1, an effective diameter of the surface adjacent to the magnification side of the first optical path deflecting member is E1f, and an effective diameter of the surface adjacent to the reduction side of the first optical path deflecting member is E1r, Conditional Expression (1) is satisfied, which is represented by $$Dbend1 > (E1f + E1r)/4. \quad (1)$$

2. The zoom lens according to claim 1, wherein the second optical system includes a stop.

3. The zoom lens according to claim 1, wherein the intermediate image is positioned inside a lens group which moves during zooming, and in a case where a group, of which spacing to an adjacent group in an optical axis direction changes during zooming, is one lens group, the zoom lens includes one or more lens groups, which move during zooming, at a position closer to the magnification side than the lens group in which the intermediate image is positioned.

4. The zoom lens according to claim 3, wherein the zoom lens includes one or more lens groups, which move during zooming, at a position closer to the reduction side than the lens group in which the intermediate image is positioned.

5. The zoom lens according to claim 1, wherein in a case where a group, of which spacing to an adjacent group in an optical axis direction changes during zooming, is one lens group, the first optical system includes three or more lens groups which move during zooming, including the reduction side movable lens group.

6. The zoom lens according to claim 1, wherein a lens surface adjacent to the reduction side of the intermediate image is a surface having a convex shape facing toward the magnification side.

7. The zoom lens according to claim 1, comprising a focusing group that moves during focusing, wherein the focusing group is disposed closer to the magnification side than the first optical path deflecting member.

8. The zoom lens according to claim 1, wherein a second optical path deflecting member, which deflects the optical path, is disposed closer to the reduction side than the first optical system.

9. The zoom lens according to claim 8, wherein all lens groups, which move during zooming, are disposed on the optical path between the first optical path deflecting member and the second optical path deflecting member.

10. The zoom lens according to claim 1, wherein Conditional Expression (1a) is satisfied, which is represented by $$Dbend1 > (E1f + E1r)/2. \quad (1a)$$

11. A zoom lens consisting of, in order from a magnification side to a reduction side along an optical path:

a first optical system that includes at least one lens; and a second optical system that includes a plurality of lenses, wherein the first optical system includes an intermediate image, which is formed at a position conjugate to a magnification side image formation plane, inside the first optical system, the first optical system includes a reduction side movable lens group, which moves during zooming, at a position closest to the reduction side, the second optical system remains stationary with respect to the magnification side image formation plane during zooming, and a lens adjacent to the magnification side of the intermediate image moves, a lens adjacent to the reduction side of the intermediate image moves, and the intermediate image moves, during zooming, wherein a second optical path deflecting member, which deflects the optical path, is disposed closer to the reduction side than the first optical system, and wherein assuming that a minimum distance on an optical axis between a surface adjacent to the magnification side of the second optical path deflecting member and a surface adjacent to the reduction side of the second optical path deflecting member in an entire zoom range is Dbend2, an effective diameter of the surface adjacent to the magnification side of the second optical path deflecting member is E2f, and an effective diameter of the surface adjacent to the reduction side of the second optical path deflecting member is E2r, Conditional Expression (2) is satisfied, which is represented by $$Dbend2 > (E2f + E2r)/4. \quad (2)$$

12. The zoom lens according to claim 1, wherein the intermediate image is positioned within an air spacing in an entire zoom range.

13. A projection type display device comprising the zoom lens according to claim 1.

14. An imaging apparatus comprising the zoom lens according to claim 1.

15. The zoom lens according to claim 11, wherein Conditional Expression (2a) is satisfied, which is represented by $$Dbend2 > (E2f + E2r)/2. \quad (2a)$$

16. The zoom lens according to claim 11, wherein the intermediate image is positioned within an air spacing in an entire zoom range.

17. A projection type display device comprising the zoom lens according to claim 11.

18. An imaging apparatus comprising the zoom lens according to claim 11.

* * * * *